United States Patent
Hogg et al.

(10) Patent No.: US 12,496,420 B2
(45) Date of Patent: Dec. 16, 2025

(54) VENT FOR A RESPIRATORY PRESSURE THERAPY SYSTEM

(71) Applicant: ResMed Pty Ltd, Bella Vista (AU)

(72) Inventors: Michael Christopher Hogg, Sydney (AU); Sabine Konzack, Sydney (AU); Hongjiang Yu, Sydney (AU); Jie Yuan, Sydney (AU)

(73) Assignee: ResMed Pty Ltd, Bella Vista (AU)

( * ) Notice: Subject to any disclaimer, the term of this patent is extended or adjusted under 35 U.S.C. 154(b) by 860 days.

(21) Appl. No.: 17/775,163

(22) PCT Filed: Nov. 6, 2020

(86) PCT No.: PCT/AU2020/051211
§ 371 (c)(1),
(2) Date: May 6, 2022

(87) PCT Pub. No.: WO2021/087570
PCT Pub. Date: May 14, 2021

(65) Prior Publication Data
US 2023/0277797 A1    Sep. 7, 2023

(30) Foreign Application Priority Data
Nov. 7, 2019   (AU) ................................ 2019904195

(51) Int. Cl.
*A61M 16/08*  (2006.01)
*A61M 16/06*  (2006.01)

(52) U.S. Cl.
CPC .... *A61M 16/0816* (2013.01); *A61M 16/0622* (2014.02); *A61M 16/0683* (2013.01); *A61M 16/0875* (2013.01)

(58) Field of Classification Search
CPC .......... A61M 16/0816; A61M 2205/42; A61M 16/0875; A61M 16/06; A61M 16/0683;
(Continued)

(56) References Cited

U.S. PATENT DOCUMENTS

| 4,782,832 A | 11/1988 | Trimble et al. |
| 4,944,310 A | 7/1990 | Sullivan |

(Continued)

FOREIGN PATENT DOCUMENTS

| WO | 98/004310 | 2/1998 |
| WO | 98/034665 | 8/1998 |

(Continued)

OTHER PUBLICATIONS

Extended European Search Report dated Oct. 30, 2023 issued in European Application No. 20885351.5 (7 pages).
(Continued)

*Primary Examiner* — Brandy S Lee
*Assistant Examiner* — Sydney Reyes Russell
(74) *Attorney, Agent, or Firm* — Nixon & Vanderhye P.C.

(57) ABSTRACT

A respiratory therapy system may include a vent structure. In one form the vent structure includes a vent housing, and a plurality of partitions inside the vent housing forming therebetween a plurality of vent slots. The vent slots include a vent inlet configured to receive an air flow, and a vent outlet configured to allow the air flow to exit into the surrounding ambient air. The partitions may be formed such that each vent slot has a smaller cross-sectional area at a first region closer to the vent inlet than a second region. The vent structure may include a plurality of deflectors configured to deflect the air flow through each vent slot towards a part of the vent housing and/or another component in the respiratory system. The vent structure may include a projecting portion extending outwardly from the vent outlet to inhibit generation of flow layer instabilities.

20 Claims, 59 Drawing Sheets

(58) Field of Classification Search
CPC .......... A61M 16/0622; A61M 16/0825; A61M 16/0833; A61M 16/0841; A61M 16/085; A61M 16/0858; F16L 55/02; F16L 55/02727
See application file for complete search history.

(56) References Cited

U.S. PATENT DOCUMENTS

| | | | |
|---|---|---|---|
| 5,687,715 | A | 11/1997 | Landis |
| 6,532,959 | B1 | 3/2003 | Berthon-Jones |
| 6,581,594 | B1 | 6/2003 | Drew et al. |
| 7,866,944 | B2 | 1/2011 | Kenyon et al. |
| 8,636,479 | B2 | 1/2014 | Kenyon et al. |
| 8,638,014 | B2 | 1/2014 | Sears et al. |
| 8,733,349 | B2 | 5/2014 | Bath et al. |
| 10,029,058 | B2 * | 7/2018 | Foote .................... A61M 16/20 |
| 10,086,160 | B2 * | 10/2018 | Burnham ............... A61M 16/06 |
| 10,272,223 | B2 * | 4/2019 | Hallett ............... A61M 16/1045 |
| 2009/0044808 | A1 | 2/2009 | Guney et al. |
| 2009/0050156 | A1 | 2/2009 | Ng et al. |
| 2010/0000534 | A1 | 1/2010 | Kooij et al. |
| 2014/0366882 | A1 | 12/2014 | Ng et al. |
| 2015/0151071 | A1 * | 6/2015 | Von Moger ....... A61M 16/0875 128/202.27 |
| 2017/0050011 | A1 * | 2/2017 | Zergiebel ........... A61B 17/3474 |
| 2018/0207389 | A1 | 7/2018 | Fyfe et al. |
| 2018/0264222 | A1 * | 9/2018 | Dantanarayana ............................ A61M 16/0616 |
| 2019/0160249 | A1 | 5/2019 | Rose et al. |
| 2019/0262571 | A1 | 8/2019 | Fong et al. |

FOREIGN PATENT DOCUMENTS

| | | |
|---|---|---|
| WO | 2000/078381 | 12/2000 |
| WO | 2004/073778 | 9/2004 |
| WO | 2005/063328 | 7/2005 |
| WO | 2006/074513 | 7/2006 |
| WO | 2006/074516 | 7/2006 |
| WO | 2006/130903 | 12/2006 |
| WO | 2009/052560 | 4/2009 |
| WO | 2010/067237 A2 | 6/2010 |
| WO | 2010/135785 | 12/2010 |
| WO | 2010/139014 | 12/2010 |
| WO | 2011/142678 A1 | 11/2011 |
| WO | 2012/109704 A1 | 8/2012 |
| WO | 2012/171072 | 12/2012 |
| WO | 2013/006899 | 1/2013 |
| WO | 2013/020167 | 2/2013 |
| WO | 2013/040198 A2 | 3/2013 |
| WO | 2016/119018 | 8/2016 |

OTHER PUBLICATIONS

"*Respiratory Physiology*", by John B. West, Lippincott Williams & Wilkins, 9$^{th}$ edition published 2012 (8 pages).
International Search Report issued in PCT/AU2020/051211 dated Feb. 9, 2021 (13 pages).
Written Opinion of the International Searching Authority for PCT/AU2020/051211 dated Feb. 9, 2021 (7 pages).
Written Opinion of the International Preliminary Examining Authority issued in PCT/AU2020/051211 dated Oct. 15, 2021(7 pages).
International Preliminary Report on Patentability issued in PCT/AU2020/051211 dated Feb. 23, 2022 (32 pages).

* cited by examiner

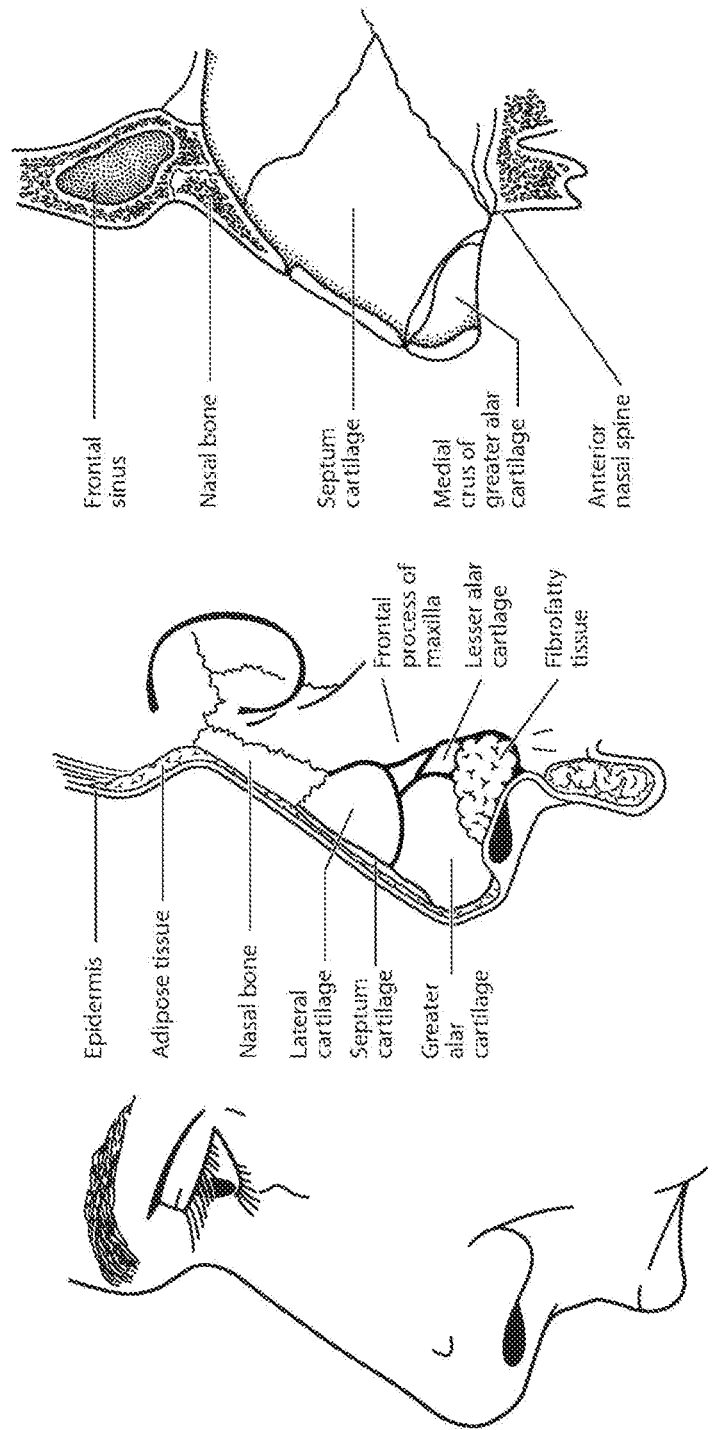

Relatively Large Positive Curvature

Relatively Small Positive Curvature

Zero Curvature

Relatively Small Negative Curvature

Relatively Large Negative Curvature

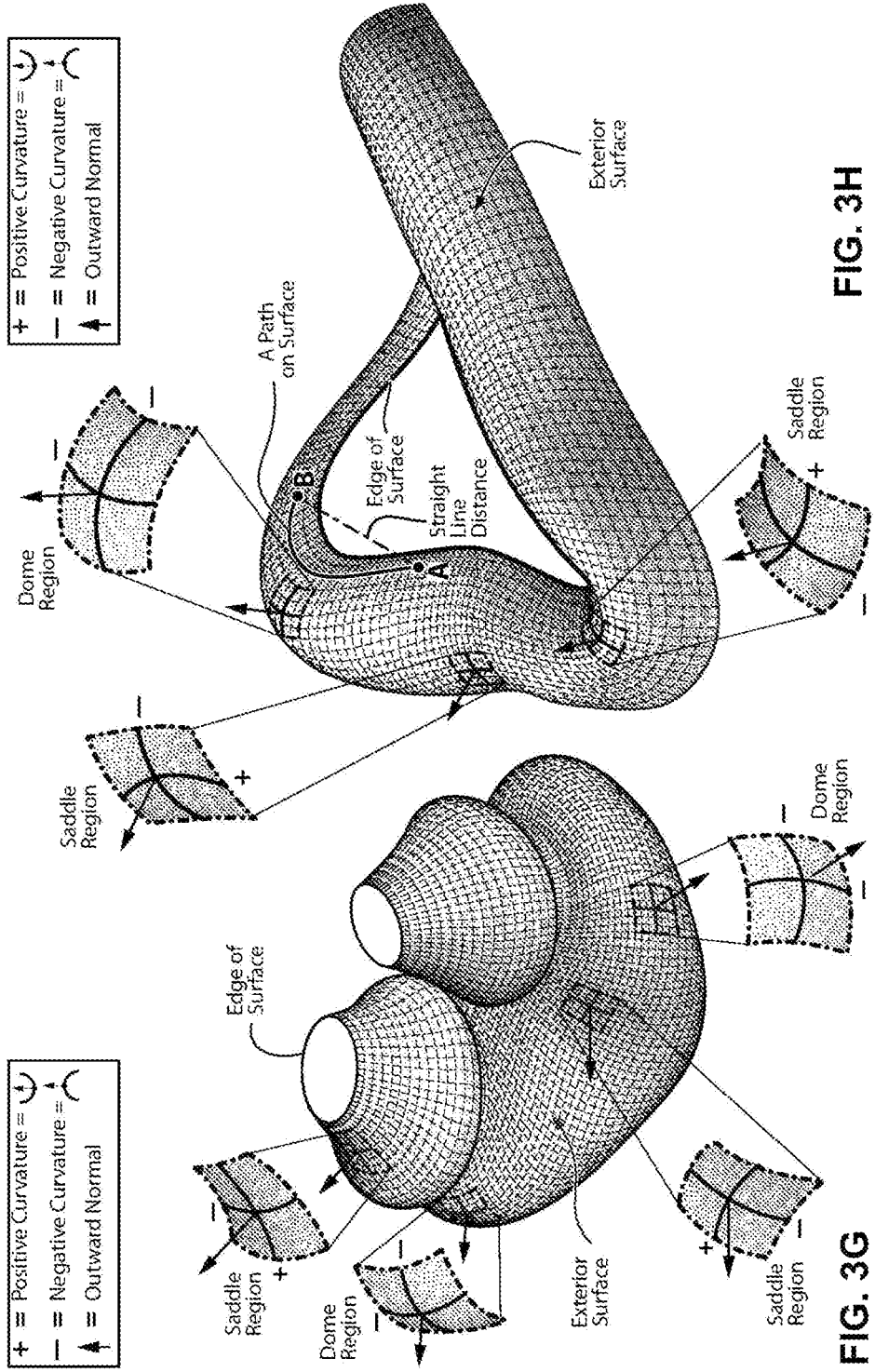

Copyright 2015 ResMed Limited

Left ear helix

Right-hand helix
Right-hand positive

Right ear helix

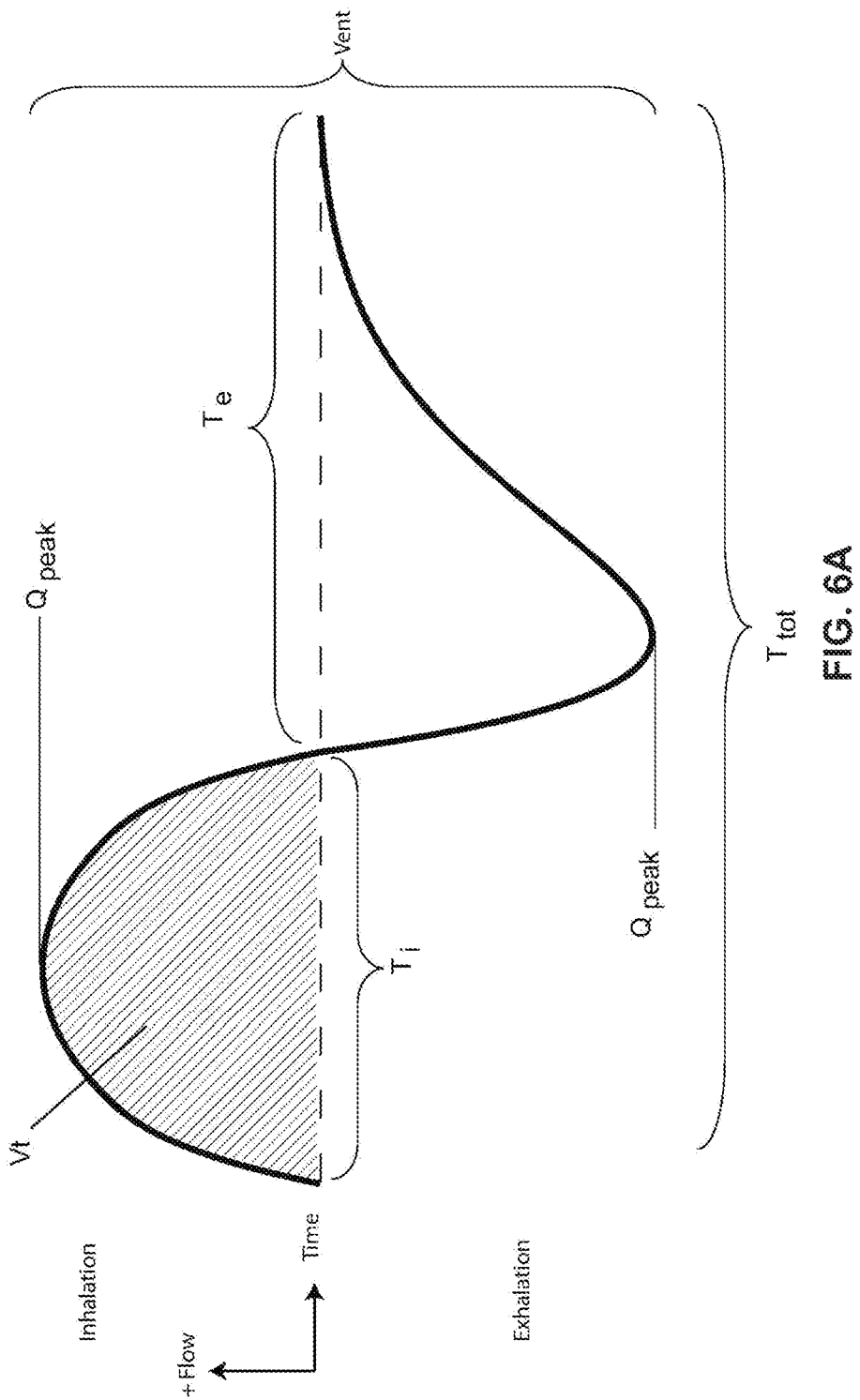

VENT FOR A RESPIRATORY PRESSURE THERAPY SYSTEM

1 CROSS-REFERENCE TO RELATED APPLICATIONS

This application is the U.S. national phase of International Application No. PCT/AU2020/051211 filed Nov. 6, 2020, which designated the U.S. and claims priority to AU 2019904195 filed Nov. 7, 2019, the entire contents of each of which are hereby incorporated by reference.

2 BACKGROUND OF THE TECHNOLOGY

2.1 Field of the Technology

The present technology relates to one or more of the screening, diagnosis, monitoring, treatment, prevention and amelioration of respiratory-related disorders. The present technology also relates to medical devices or apparatus, and their use.

2.2 Description of the Related Art 2.2.1 Human Respiratory System and its Disorders The respiratory system of the body facilitates gas exchange. The nose and mouth form the entrance to the airways of a patient.

The airways include a series of branching tubes, which become narrower, shorter and more numerous as they penetrate deeper into the lung. The prime function of the lung is gas exchange, allowing oxygen to move from the inhaled air into the venous blood and carbon dioxide to move in the opposite direction. The trachea divides into right and left main bronchi, which further divide eventually into terminal bronchioles. The bronchi make up the conducting airways, and do not take part in gas exchange. Further divisions of the airways lead to the respiratory bronchioles, and eventually to the alveoli. The alveolated region of the lung is where the gas exchange takes place and is referred to as the respiratory zone. See "*Respiratory Physiology*", by John B. West, Lippincott Williams & Wilkins, 9th edition published 2012.

A range of respiratory disorders exist. Certain disorders may be characterised by particular events, e.g. apneas, hypopneas, and hyperpneas.

Examples of respiratory disorders include Obstructive Sleep Apnea (OSA), Cheyne-Stokes Respiration (CSR), respiratory insufficiency, Obesity Hyperventilation Syndrome (OHS), Chronic Obstructive Pulmonary Disease (COPD), Neuromuscular Disease (NMD) and Chest wall disorders.

Obstructive Sleep Apnea (OSA), a form of Sleep Disordered Breathing (SDB), is characterised by events including occlusion or obstruction of the upper air passage during sleep. It results from a combination of an abnormally small upper airway and the normal loss of muscle tone in the region of the tongue, soft palate and posterior oropharyngeal wall during sleep. The condition causes the affected patient to stop breathing for periods typically of 30 to 120 seconds in duration, sometimes 200 to 300 times per night. It often causes excessive daytime somnolence, and it may cause cardiovascular disease and brain damage. The syndrome is a common disorder, particularly in middle aged overweight males, although a person affected may have no awareness of the problem. See U.S. Pat. No. 4,944,310 (Sullivan).

Cheyne-Stokes Respiration (CSR) is another form of sleep disordered breathing. CSR is a disorder of a patient's respiratory controller in which there are rhythmic alternating periods of waxing and waning ventilation known as CSR cycles. CSR is characterised by repetitive de-oxygenation and re-oxygenation of the arterial blood. It is possible that CSR is harmful because of the repetitive hypoxia. In some patients CSR is associated with repetitive arousal from sleep, which causes severe sleep disruption, increased sympathetic activity, and increased afterload. See U.S. Pat. No. 6,532,959 (Berthon-Jones).

Respiratory failure is an umbrella term for respiratory disorders in which the lungs are unable to inspire sufficient oxygen or exhale sufficient $CO_2$ to meet the patient's needs. Respiratory failure may encompass some or all of the following disorders.

A patient with respiratory insufficiency (a form of respiratory failure) may experience abnormal shortness of breath on exercise.

Obesity Hyperventilation Syndrome (OHS) is defined as the combination of severe obesity and awake chronic hypercapnia, in the absence of other known causes for hypoventilation. Symptoms include dyspnea, morning headache and excessive daytime sleepiness.

Chronic Obstructive Pulmonary Disease (COPD) encompasses any of a group of lower airway diseases that have certain characteristics in common. These include increased resistance to air movement, extended expiratory phase of respiration, and loss of the normal elasticity of the lung. Examples of COPD are emphysema and chronic bronchitis. COPD is caused by chronic tobacco smoking (primary risk factor), occupational exposures, air pollution and genetic factors. Symptoms include: dyspnea on exertion, chronic cough and sputum production.

Neuromuscular Disease (NMD) is a broad term that encompasses many diseases and ailments that impair the functioning of the muscles either directly via intrinsic muscle pathology, or indirectly via nerve pathology. Some NMD patients are characterised by progressive muscular impairment leading to loss of ambulation, being wheelchair-bound, swallowing difficulties, respiratory muscle weakness and, eventually, death from respiratory failure. Neuromuscular disorders can be divided into rapidly progressive and slowly progressive: (i) Rapidly progressive disorders: Characterised by muscle impairment that worsens over months and results in death within a few years (e.g. Amyotrophic lateral sclerosis (ALS) and Duchenne muscular dystrophy (DMD) in teenagers); (ii) Variable or slowly progressive disorders: Characterised by muscle impairment that worsens over years and only mildly reduces life expectancy (e.g. Limb girdle, Facioscapulohumeral and Myotonic muscular dystrophy). Symptoms of respiratory failure in NMD include: increasing generalised weakness, dysphagia, dyspnea on exertion and at rest, fatigue, sleepiness, morning headache, and difficulties with concentration and mood changes.

Chest wall disorders are a group of thoracic deformities that result in inefficient coupling between the respiratory muscles and the thoracic cage. The disorders are usually characterised by a restrictive defect and share the potential of long term hypercapnic respiratory failure. Scoliosis and/or kyphoscoliosis may cause severe respiratory failure. Symptoms of respiratory failure include: dyspnea on exertion, peripheral oedema, orthopnea, repeated chest infections, morning headaches, fatigue, poor sleep quality and loss of appetite.

A range of therapies have been used to treat or ameliorate such conditions. Furthermore, otherwise healthy individuals may take advantage of such therapies to prevent respiratory disorders from arising. However, these have a number of shortcomings.

2.2.2 Therapies

Various respiratory therapies, such as Continuous Positive Airway Pressure (CPAP) therapy, Non-invasive ventilation (NIV), Invasive ventilation (IV), and High Flow Therapy (HFT) have been used to treat one or more of the above respiratory disorders.

2.2.2.1 Respiratory Pressure Therapies

Respiratory pressure therapy is the application of a supply of air to an entrance to the airways at a controlled target pressure that is nominally positive with respect to atmosphere throughout the patient's breathing cycle (in contrast to negative pressure therapies such as the tank ventilator or cuirass).

Continuous Positive Airway Pressure (CPAP) therapy has been used to treat Obstructive Sleep Apnea (OSA). The mechanism of action is that continuous positive airway pressure acts as a pneumatic splint and may prevent upper airway occlusion, such as by pushing the soft palate and tongue forward and away from the posterior oropharyngeal wall. Treatment of OSA by CPAP therapy may be voluntary, and hence patients may elect not to comply with therapy if they find devices used to provide such therapy one or more of: uncomfortable, difficult to use, expensive and aesthetically unappealing.

Non-invasive ventilation (NIV) provides ventilatory support to a patient through the upper airways to assist the patient breathing and/or maintain adequate oxygen levels in the body by doing some or all of the work of breathing. The ventilatory support is provided via a non-invasive patient interface. NIV has been used to treat CSR and respiratory failure, in forms such as OHS, COPD, NMD and Chest Wall disorders. In some forms, the comfort and effectiveness of these therapies may be improved.

Invasive ventilation (IV) provides ventilatory support to patients that are no longer able to effectively breathe themselves and may be provided using a tracheostomy tube. In some forms, the comfort and effectiveness of these therapies may be improved.

2.2.2.2 Flow Therapies

Not all respiratory therapies aim to deliver a prescribed therapeutic pressure. Some respiratory therapies aim to deliver a prescribed respiratory volume, by delivering an inspiratory flow rate profile over a targeted duration, possibly superimposed on a positive baseline pressure. In other cases, the interface to the patient's airways is 'open' (unsealed) and the respiratory therapy may only supplement the patient's own spontaneous breathing with a flow of conditioned or enriched gas. In one example, High Flow therapy (HFT) is the provision of a continuous, heated, humidified flow of air to an entrance to the airway through an unsealed or open patient interface at a "treatment flow rate" that is held approximately constant throughout the respiratory cycle. The treatment flow rate is nominally set to exceed the patient's peak inspiratory flow rate. HFT has been used to treat OSA, CSR, respiratory failure, COPD, and other respiratory disorders. One mechanism of action is that the high flow rate of air at the airway entrance improves ventilation efficiency by flushing, or washing out, expired $CO_2$ from the patient's anatomical deadspace. Hence, HFT is thus sometimes referred to as a deadspace therapy (DST). Other benefits may include the elevated warmth and humidification (possibly of benefit in secretion management) and the potential for modest elevation of airway pressures. As an alternative to constant flow rate, the treatment flow rate may follow a profile that varies over the respiratory cycle.

Another form of flow therapy is long-term oxygen therapy (LTOT) or supplemental oxygen therapy. Doctors may prescribe a continuous flow of oxygen enriched gas at a specified oxygen concentration (from 21%, the oxygen fraction in ambient air, to 100%) at a specified flow rate (e.g., 1 litre per minute (LPM), 2 LPM, 3 LPM, etc.) to be delivered to the patient's airway.

2.2.3 Respiratory Therapy Systems

These respiratory therapies may be provided by a respiratory therapy system or device. Such systems and devices may also be used to screen, diagnose, or monitor a condition without treating it.

A respiratory therapy system may comprise a Respiratory Pressure Therapy Device (RPT device), an air circuit, a humidifier, a patient interface, an oxygen source, and data management.

2.2.3.1 Patient Interface

A patient interface may be used to interface respiratory equipment to its wearer, for example by providing a flow of air to an entrance to the airways. The flow of air may be provided via a mask to the nose and/or mouth, a tube to the mouth or a tracheostomy tube to the trachea of a patient. Depending upon the therapy to be applied, the patient interface may form a seal, e.g., with a region of the patient's face, to facilitate the delivery of gas at a pressure at sufficient variance with ambient pressure to effect therapy, e.g., at a positive pressure of about 10 $cmH_2O$ relative to ambient pressure. For other forms of therapy, such as the delivery of oxygen, the patient interface may not include a seal sufficient to facilitate delivery to the airways of a supply of gas at a positive pressure of about 10 $cmH_2O$. For flow therapies such as nasal HFT, the patient interface is configured to insufflate the nares but specifically to avoid a complete seal. One example of such a patient interface is a nasal cannula.

Certain other mask systems may be functionally unsuitable for the present field. For example, purely ornamental masks may be unable to maintain a suitable pressure. Mask systems used for underwater swimming or diving may be configured to guard against ingress of water from an external higher pressure, but not to maintain air internally at a higher pressure than ambient.

Certain masks may be clinically unfavourable for the present technology e.g. if they block airflow via the nose and only allow it via the mouth.

Certain masks may be uncomfortable or impractical for the present technology if they require a patient to insert a portion of a mask structure in their mouth to create and maintain a seal via their lips.

Certain masks may be impractical for use while sleeping, e.g. for sleeping while lying on one's side in bed with a head on a pillow.

The design of a patient interface presents a number of challenges. The face has a complex three-dimensional shape. The size and shape of noses and heads varies considerably between individuals. Since the head includes bone, cartilage and soft tissue, different regions of the face respond differently to mechanical forces. The jaw or mandible may move relative to other bones of the skull. The whole head may move during the course of a period of respiratory therapy.

As a consequence of these challenges, some masks suffer from being one or more of obtrusive, aesthetically undesirable, costly, poorly fitting, difficult to use, and uncomfortable especially when worn for long periods of time or when a patient is unfamiliar with a system. Wrongly sized masks can give rise to reduced compliance, reduced comfort and poorer patient outcomes. Masks designed solely for aviators, masks designed as part of personal protection equipment (e.g. filter masks), SCUBA masks, or for the administration of anaesthetics may be tolerable for their original application, but nevertheless such masks may be undesirably uncomfortable to be worn for extended periods of time, e.g., several hours. This discomfort may lead to a reduction in patient compliance with therapy. This is even more so if the mask is to be worn during sleep.

CPAP therapy is highly effective to treat certain respiratory disorders, provided patients comply with therapy. If a mask is uncomfortable, or difficult to use a patient may not comply with therapy. Since it is often recommended that a patient regularly wash their mask, if a mask is difficult to clean (e.g., difficult to assemble or disassemble), patients may not clean their mask, and this may impact on patient compliance.

While a mask for other applications (e.g. aviators) may not be suitable for use in treating sleep disordered breathing, a mask designed for use in treating sleep disordered breathing may be suitable for other applications.

For these reasons, patient interfaces for delivery of CPAP during sleep form a distinct field.

2.2.3.2 Respiratory Pressure Therapy (RPT) Device

A respiratory pressure therapy (RPT) device may be used individually or as part of a system to deliver one or more of a number of therapies described above, such as by operating the device to generate a flow of air for delivery to an interface to the airways. The flow of air may be pressure-controlled (for respiratory pressure therapies) or flow-controlled (for flow therapies such as HFT). Thus, RPT devices may also act as flow therapy devices. Examples of RPT devices include a CPAP device and a ventilator.

2.2.3.3 Air Circuit

An air circuit is a conduit, or a tube constructed and arranged to allow, in use, a flow of air to travel between two components of a respiratory therapy system such as the RPT device and the patient interface. In some cases, there may be separate limbs of the air circuit for inhalation and exhalation. In other cases, a single limb air circuit is used for both inhalation and exhalation.

2.2.3.4 Humidifier

Delivery of a flow of air without humidification may cause drying of airways. The use of a humidifier with an RPT device and the patient interface produces humidified gas that minimizes drying of the nasal mucosa and increases patient airway comfort. In addition, in cooler climates, warm air applied generally to the face area in and about the patient interface is more comfortable than cold air. Humidifiers therefore often have the capacity to heat the flow of air was well as humidifying it.

2.2.3.5 Vent Technologies

Some forms of treatment systems may include a vent to allow the washout of exhaled carbon dioxide. The vent may allow a flow of gas from an interior space of a patient interface, e.g., the plenum chamber, to an exterior of the patient interface, e.g., to ambient.

The vent may comprise an orifice and gas may flow through the orifice in use of the mask. Many such vents are noisy. Others may become blocked in use and thus provide insufficient washout. Some vents may be disruptive of the sleep of a bed partner 1100 of the patient 1000, e.g. through noise or focussed airflow.

ResMed Limited has developed a number of improved mask vent technologies. See International Patent Application Publication No. WO 1998/034,665; International Patent Application Publication No. WO 2000/078,381; U.S. Pat. No. 6,581,594; US Patent Application Publication No. US 2009/0050156; US Patent Application Publication No. 2009/0044808.

Table of noise of prior masks (ISO 17510-2:2007, 10 cmH$_2$O pressure at 1 m)

| Mask name | Mask type | A-weighted sound power level dB(A) (uncertainty) | A-weighted sound pressure dB(A) (uncertainty) | Year (approx.) |
|---|---|---|---|---|
| Glue-on (*) | nasal | 50.9 | 42.9 | 1981 |
| ResCare standard (*) | nasal | 31.5 | 23.5 | 1993 |
| ResMed Mirage ™ (*) | nasal | 29.5 | 21.5 | 1998 |
| ResMed UltraMirage ™ | nasal | 36 (3) | 28 (3) | 2000 |
| ResMed Mirage Activa ™ | nasal | 32 (3) | 24 (3) | 2002 |
| ResMed Mirage Micro ™ | nasal | 30 (3) | 22 (3) | 2008 |
| ResMed Mirage ™ SoftGel | nasal | 29 (3) | 22 (3) | 2008 |
| ResMed Mirage ™ FX | nasal | 26 (3) | 18 (3) | 2010 |
| ResMed Mirage Swift ™ | nasal pillows | 37 | 29 | 2004 |
| ResMed (*) Mirage Swift ™ II | nasal pillows | 28 (3) | 20 (3) | 2005 |
| ResMed Mirage Swift ™ LT | nasal pillows | 25 (3) | 17 (3) | 2008 |
| ResMed AirFit P10 | nasal pillows | 21 (3) | 13 (3) | 2014 |

(* one specimen only, measured using test method specified in ISO 3744 in CPAP mode at 10 cmH$_2$O)

Sound pressure values of a variety of objects are listed below

| Object | A-weighted sound pressure dB(A) | Notes |
|---|---|---|
| Vacuum cleaner: Nilfisk Walter Broadly Litter Hog: B+ Grade | 68 | ISO 3744 at 1 m distance |
| Conversational speech | 60 | 1 m distance |
| Average home | 50 | |
| Quiet library | 40 | |
| Quiet bedroom at night | 30 | |
| Background in TV studio | 20 | |

3 BRIEF SUMMARY OF THE TECHNOLOGY

The present technology is directed towards providing medical devices used in the screening, diagnosis, monitoring, amelioration, treatment, or prevention of respiratory disorders having one or more of improved comfort, cost, efficacy, ease of use and manufacturability.

A first aspect of the present technology relates to apparatus used in the screening, diagnosis, monitoring, amelioration, treatment or prevention of a respiratory disorder.

Another aspect of the present technology relates to methods used in the screening, diagnosis, monitoring, amelioration, treatment or prevention of a respiratory disorder.

An aspect of certain forms of the present technology is to provide methods and/or apparatus that improve the compliance of patients with respiratory therapy.

One form of the present technology comprises a vent structure which is quieter during use compared to prior art vents.

Another aspect of one form of the present technology is the reduction of jets of air exiting the respiratory system during use that disturb the patient and/or bed partner.

An aspect of one form of the present technology comprises a vent structure for a respiratory therapy system, the vent structure comprising:

a vent housing; and
a plurality of partitions inside the vent housing, the plurality of partitions forming therebetween a plurality of vent slots, wherein the vent slots comprise:
a vent inlet configured to receive an air flow; and
a vent outlet configured to allow the air flow to exit into the surrounding ambient air,
wherein the partitions are formed such that each vent slot has a cross-sectional area at a first region of the vent slots that is smaller than a cross-sectional area at a second region of the vent slots, wherein the first region is closer to the vent inlet than the second region.

In examples: a) the partitions are formed such that the second region of each vent slot has a larger width compared to the first region of the respective vent slot; b) each of the partitions comprises an angled straight wall portion between the first region and the second region, the angled straight wall portion being oriented at an angle to a longitudinal axis along a length of the respective vent slot; c) each of the partitions comprises a negatively curved portion between the first region and the second region; d) each of the partitions comprises a positively curved portion between the first region and the second region; e) the straight wall portion of each of the partitions is located between the negatively curved portion and the positively curved portion; f) each of the partitions comprises a parallel straight wall portion proximate the vent outlet, the parallel straight wall portion being substantially parallel to a longitudinal axis along a length of the respective vent slot; g) the second region is proximate the vent outlet; h) the first region is proximate the vent inlet; i) the vent housing is formed such that the second region of each vent slot has a greater height compared to the first region of the respective vent slot; j) each vent slot comprises an expanding height portion having an upstream end and a downstream end, wherein the upstream end of the expanding height portion has a lesser height than the downstream end of the expanding height portion, and wherein the expanding height portion is located at or proximate a region of minimum width of the respective vent slot; k) the vent structure is formed such that each vent slot comprises a chamber arranged to, in use, reflect sound waves and attenuate the sound of a flow of air through the respective vent slot; l) the vent structure further comprises a plurality of deflectors configured to deflect the flow of air through each vent slot towards a part of the vent housing and/or another component in the respiratory system; m) each of the plurality of deflectors is formed on an inner surface of the vent housing; n) each deflector is located at a longitudinal position within one of the vent slots where the respective vent slot has minimum width; o) each deflector is positioned to cause the exiting air flow to flow against a component downstream of the vent outlet; p) the vent structure further comprises a projecting portion structured and arranged to inhibit generation of flow layer instabilities, the projecting portion extending outwardly from the vent outlet; q) the projecting portion extends in a direction substantially parallel to a longitudinal axis of one of the vent slots; r) the projecting portion comprises one or more first portions extending at a first length from the vent outlet and one or more second portions extending at a second length from the vent outlet, the first length being less than the second length; s) a distal end of the projecting portion comprises a wave-shaped profile when viewed from a direction perpendicular to the plane in which the projecting portion extends from the vent outlet; t) the projecting portion comprises a negatively curved edge adjacent the exiting air flow; u) the vent housing and partitions are substantially rigid such that the vent slots are fixed in shape during use; v) an inlet to the chamber is offset from an outlet of the chamber; w) the inlet to the chamber is radially offset from the outlet of the chamber; x) the inlet to the chamber is circumferentially offset the outlet of the chamber; and/or y) the connection member further comprises a sealing member to form a seal between the partitions and the vent housing.

Another aspect of one form of the present technology comprises a vent structure for a respiratory therapy system, the vent structure comprising:

a vent housing defining a plurality of vent slots, the vent slots comprising:
a vent inlet configured to receive an air flow; and
a vent outlet configured to allow the air flow to exit into the surrounding ambient air; and
a plurality of deflectors configured to deflect the air flow through each vent slot towards a part of the vent housing and/or another component in the respiratory system.

In examples: a) each of the plurality of deflectors is formed on an inner surface of the vent housing; b) each deflector is located at a longitudinal position within one of the vent slots where the respective vent slot has minimum width; c) each deflector is positioned to cause the exiting air flow to flow against a component downstream of the vent outlet; d) the vent structure comprises a plurality of partitions inside the vent housing, the plurality of partitions forming therebetween the plurality of vent slots, wherein the partitions are formed such that each vent slot has a cross-sectional area at a first region of the vent slots that is smaller than a cross-sectional area at a second region of the vent slots, wherein the first region is closer to the vent inlet than the second region; and/or e) the vent structure further comprises a projecting portion structured and arranged to inhibit generation of flow layer instabilities, the projecting portion extending outwardly from the vent outlet.

Another aspect of one form of the present technology comprises a vent structure for a respiratory therapy system, the vent structure comprising:

a vent housing defining a plurality of vent slots, the vent slots comprising:
a vent inlet configured to receive an air flow; and
a vent outlet configured to allow the air flow to exit into the surrounding ambient air; and
a projecting portion structured and arranged to inhibit generation of flow layer instabilities, the projecting portion extending outwardly from the vent outlet.

In examples: a) the projecting portion extends in a direction substantially parallel to a longitudinal axis of one of the vent slots; b) the projecting portion comprises one or more first portions extending at a first length from the vent outlet and one or more second portions extending at a second length from the vent outlet, the first length being less than the second length; c) a distal end of the projecting portion comprises a wave-shaped profile when viewed from a direction perpendicular to the plane in which the projecting portion extends from the vent outlet; d) the projecting portion comprises a negatively curved edge adjacent the exiting air flow; e) the vent structure comprises a plurality of partitions inside the vent housing, the plurality of partitions forming therebetween the plurality of vent slots, wherein the partitions are formed such that each vent slot has a cross-sectional area at a first region of the vent slots that is smaller than a cross-sectional area at a second region of the vent slots, wherein the first region is closer to the vent inlet than the second region; and/or f) the vent structure further comprises a plurality of deflectors configured to deflect the flow of air through each vent slot towards a part of the vent housing and/or another component in the respiratory system.

Another aspect of one form of the present technology comprises a connection member configured to connect an air circuit to a patient interface, the connection member comprising:

a tube portion configured to fluidly connect the air circuit to the patient interface; and a vent structure as described in any one of the other aspects of the technology above.

In examples: a) the tube portion comprises: an outer tube portion configured to connect to the patient interface; and an inner tube portion configured to connect to the air circuit, wherein at least a portion of the inner tube portion is positioned inside at least a portion of the outer tube portion, and wherein the vent housing comprises the outer tube portion and the inner tube portion and the vent slots are located between the outer tube and the inner tube; b) the vent slots are arranged around an annular region between the outer tube portion and the inner tube portion; c) the inner tube portion defines a central axis of the connection member and the vent structure is formed such that a radial distance of the vent inlet from the central axis is greater than a radial distance of the vent outlet from the central axis; d) the outer surface of the inner tube portion comprises a radially inward step having an upstream end and a downstream end, wherein the upstream end of the radially inward step is a greater radial distance from the central axis than the downstream end of the radially inward step; e) the radially inward step is located at the same or similar longitudinal position along each vent slot as the expanding height portion; f) the plurality of deflectors are configured to deflect the air flow through each vent slot towards an outer surface of the inner tube portion; g) the plurality of deflectors are configured to deflect the air flow exiting each vent slot towards a portion of the outer surface of the inner tube portion in a downstream direction from the vent outlet; and/or h) the projecting portion comprises an annular projection extending outwardly from the outer tube portion.

Another aspect of one form of the present technology comprises an air circuit configured to fluidly connect a respiratory therapy device to a patient interface, the air circuit comprising a connection member as described in another aspect of the technology above.

Another aspect of one form of the present technology comprises a patient interface comprising:

a plenum chamber pressurisable to a therapeutic pressure of at least 6 cmH2O above ambient air pressure, said plenum chamber including a plenum chamber inlet port sized and structured to receive a flow of air at the therapeutic pressure for breathing by a patient;

a seal-forming structure constructed and arranged to form a seal with a region of the patient's face surrounding an entrance to the patient's airways, said seal-forming structure having a hole therein such that the flow of air at said therapeutic pressure is delivered to at least an entrance to the patient's nares, the seal-forming structure constructed and arranged to maintain said therapeutic pressure in the plenum chamber throughout the patient's respiratory cycle in use;

a vent structure as described in the first and second forms of the technology above, the vent structure to allow a continuous flow of gases exhaled by the patient from an interior of the plenum chamber to ambient, said vent structure being sized and shaped to maintain the therapeutic pressure in the plenum chamber in use;

wherein the patient interface is configured to allow the patient to breath from ambient through their mouth in the absence of a flow of pressurised air through the plenum chamber inlet port, or the patient interface is configured to leave the patient's mouth uncovered.

In examples: a) the vent structure is comprised as part of, or is provided to, the plenum chamber; b) the patient interface further comprises a connection member configured to connect the patient interface to an air circuit, the connection member comprising a tube portion configured to fluidly connect the air circuit to the patient interface, wherein the connection member comprises the vent structure; and/or c) the patient interface further comprises a positioning and stabilising structure to provide a force to hold the seal-forming structure in a therapeutically effective position on the patient's head.

Another aspect of one form of the present technology comprises a positioning and stabilising structure configured to provide a force to hold a seal-forming structure in a therapeutically effective position on a patient's head in use, the positioning and stabilising structure comprising:

at least one gas delivery tube being constructed and arranged to contact at least a region of the patient's head superior to an otobasion superior of the patient's head, wherein an end of the at least one gas delivery tube is configured to fluidly connect to a plenum chamber;

a connection port to receive a flow of air from an air circuit and to deliver the flow of air to the entrance of the patient's airways via the seal-forming structure, wherein the connection port is provided to a portion of the gas delivery tube superior to the otobasion superior of the patient's head; and a vent structure as described in the first and second forms of the technology above.

Another aspect of one form of the present technology is a connection member configured to directly or indirectly connect an air circuit to a patient interface, the connection member comprising:

a tube portion configured to fluidly connect the air circuit to the patient interface; and a vent structure for a respiratory therapy system, the vent structure comprising:

a vent housing; and a plurality of partitions inside the vent housing, the plurality of partitions forming therebetween a plurality of vent slots, wherein the vent slots comprise:

a vent inlet configured to receive an air flow; and a vent outlet configured to allow the air flow to exit into the surrounding ambient air, wherein the partitions are formed such that each vent slot has a cross-sectional area at a first region of the vent slots that is smaller than a cross-sectional area at a second region of the vent slots, wherein the first region is closer to the vent inlet than the second region.

In examples: a) the vent housing and partitions are substantially rigid such that the vent slots are fixed in shape during use; b) the partitions are formed such that the second region of each vent slot has a larger width compared to the first region of the respective vent slot; c) each of the partitions comprises an angled straight wall portion between the first region and the second region, the angled straight wall portion being oriented at an angle to a longitudinal axis along a length of the respective vent slot; d) each of the partitions comprises a negatively curved portion between the first region and the second region; e) each of the partitions comprises a positively curved portion between the first region and the second region; f) the straight wall portion of each of the partitions is located between the negatively curved portion and the positively curved portion; g) each of the partitions comprises a parallel straight wall portion proximate the vent outlet, the parallel straight wall portion being substantially parallel to a longitudinal axis along a length of the respective vent slot; h) the second region is proximate the vent outlet; i) the first region is proximate the vent inlet; j) the vent housing is formed such that the second region of each vent slot has a greater height compared to the first region of the respective vent slot; k) each vent slot comprises an expanding height portion having an upstream end and a downstream end, wherein the upstream end of the expanding height portion has a lesser height than the downstream end of the expanding height portion, and wherein the expanding height portion is located at or proximate a region of minimum width of the respective vent slot; l) the vent structure is formed such that each vent slot comprises a chamber arranged to, in use, reflect sound waves and attenuate the sound of a flow of air through the respective vent slot; m) an inlet to the chamber is offset from an outlet of the chamber; n) the inlet to the chamber is radially offset from the outlet of the chamber; o) the inlet to the chamber is circumferentially offset the outlet of the chamber; p) the vent structure further comprises a plurality of deflectors configured to deflect the flow of air through each vent slot towards a part of the vent housing and/or another component in the respiratory system; q) each of the plurality of deflectors is formed on an inner surface of the vent housing; r) each deflector is located at a longitudinal position within one of the vent slots where the respective vent slot has minimum width; s) each deflector is positioned to cause the exiting air flow to flow against a component downstream of the vent outlet; t) the vent structure further comprises a projecting portion structured and arranged to inhibit generation of shear layer instabilities, the projecting portion extending outwardly from the vent outlet; u) the projecting portion extends in a direction substantially parallel to a longitudinal axis of one of the vent slots; v) the projecting portion comprises one or more first portions extending at a first length from the vent outlet and one or more second portions extending at a second length from the vent outlet, the first length being less than the second length; w) a distal end of the projecting portion comprises a wave-shaped profile when viewed from a direction perpendicular to the plane in which the projecting portion extends from the vent outlet; and/or x) the projecting portion comprises a negatively curved edge adjacent the exiting air flow.

Another aspect of one form of the present technology is a connection member configured to directly or indirectly connect an air circuit to a patient interface, the connection member comprising:

a tube portion configured to fluidly connect the air circuit to the patient interface; and
a vent structure for a respiratory therapy system, the vent structure comprising:
  a vent housing defining a plurality of vent slots, the vent slots comprising:
    a vent inlet configured to receive an air flow; and
    a vent outlet configured to allow the air flow to exit into the surrounding ambient air; and
  a plurality of deflectors configured to deflect the air flow through each vent slot towards a part of the vent housing and/or another component in the respiratory system.

In examples: a) each of the plurality of deflectors is formed on an inner surface of the vent housing; b) each deflector is located at a longitudinal position within one of the vent slots where the respective vent slot has minimum width; c) each deflector is positioned to cause the exiting air flow to flow against a component downstream of the vent outlet; d) the vent structure comprises a plurality of partitions inside the vent housing, the plurality of partitions forming therebetween the plurality of vent slots; e) the vent housing and partitions are substantially rigid such that the vent slots are fixed in shape during use; f) the partitions are formed such that each vent slot has a cross-sectional area at a first region of the vent slots that is smaller than a cross-sectional area at a second region of the vent slots, and wherein the first region is closer to the vent inlet than the second region; and/or g) the vent structure further comprises a projecting portion structured and arranged to inhibit generation of flow layer instabilities, the projecting portion extending outwardly from the vent outlet.

Another aspect of one form of the present technology is a connection member configured to directly or indirectly connect an air circuit to a patient interface, the connection member comprising:

a tube portion configured to fluidly connect the air circuit to the patient interface; and
a vent structure for a respiratory therapy system, the vent structure comprising:
  a vent housing defining a plurality of vent slots, the vent slots comprising:
    a vent inlet configured to receive an air flow; and
    a vent outlet configured to allow the air flow to exit into the surrounding ambient air; and
  a projecting portion structured and arranged to inhibit generation of shear layer instabilities, the projecting portion extending outwardly from the vent outlet.

In examples: a) the projecting portion extends in a direction substantially parallel to a longitudinal axis of one of the vent slots; b) the projecting portion comprises one or more first portions extending at a first length from the vent outlet and one or more second portions extending at a second length from the vent outlet, the first length being less than the second length; c) a distal end of the projecting portion comprises a wave-shaped profile when viewed from a direction perpendicular to the plane in which the projecting portion extends from the vent outlet; d) the projecting portion comprises a negatively curved edge adjacent the exiting air flow; e) the vent structure comprises a plurality of partitions inside the vent housing, the plurality of partitions forming therebetween the plurality of vent slots; f) the vent housing and partitions are substantially rigid such that the vent slots are fixed in shape during use; g) the partitions are formed such that each vent slot has a cross-sectional area at a first region of the vent slots that is smaller than a cross-sectional area at a second region of the vent slots, and wherein the first region is closer to the vent inlet than the second region; h) the vent structure further comprises a plurality of deflectors configured to deflect the flow of air through each vent slot towards a part of the vent housing and/or another component in the respiratory system; and/or i) the connection member further comprises a sealing member to form a seal between the partitions and the vent housing.

Another aspect of one form of the present technology is a connection member according to one of the aspects as described above, wherein the tube portion comprises:

an outer tube portion configured to directly or indirectly connect to the patient interface; and an inner tube portion configured to directly or indirectly connect to the air circuit, wherein at least a portion of the inner tube portion is positioned inside at least a portion of the outer tube portion, and wherein the vent housing comprises the outer tube portion and the inner tube portion and the vent slots are located between the outer tube and the inner tube.

In examples: a) the vent slots are arranged around an annular region between the outer tube portion and the inner tube portion; b) the inner tube portion defines a central axis of the connection member and the vent structure is formed such that a radial distance of the vent inlet from the central axis is greater than a radial distance of the vent outlet from the central axis; c) the outer surface of the inner tube portion comprises a radially inward step having an upstream end and a downstream end, wherein the upstream end of the radially inward step is a greater radial distance from the central axis than the downstream end of the radially inward step; d) the radially inward step is located at the same or similar longitudinal position along each vent slot as the expanding height portion; e) the plurality of deflectors are configured to deflect the air flow through each vent slot towards an outer surface of the inner tube portion; f) the plurality of deflectors are configured to deflect the air flow exiting each vent slot towards a portion of the outer surface of the inner tube portion in a downstream direction from the vent outlet; and/or g) the projecting portion comprises an annular projection extending outwardly from the outer tube portion.

Another aspect of one form of the technology is an air circuit configured to fluidly connect a respiratory therapy device to a patient interface, the air circuit comprising the connection member of any one of the aspects as described above.

Another aspect of one form of the technology is a patient interface comprising:

a plenum chamber pressurisable to a therapeutic pressure of at least 6 cmH2O above ambient air pressure, said plenum chamber including a plenum chamber inlet port sized and structured to receive a flow of air at the therapeutic pressure for breathing by a patient;

a seal-forming structure constructed and arranged to form a seal with a region of the patient's face surrounding an entrance to the patient's airways, said seal-forming structure having a hole therein such that the flow of air at said therapeutic pressure is delivered to at least an entrance to the patient's nares, the seal-forming structure constructed and arranged to maintain said therapeutic pressure in the plenum chamber throughout the patient's respiratory cycle in use;

a connection member according to any one of the aspects as described above, the vent structure to allow a continuous flow of gases exhaled by the patient from an interior of the plenum chamber to ambient, said vent structure being sized and shaped to maintain the therapeutic pressure in the plenum chamber in use;

wherein the patient interface is configured to allow the patient to breath from ambient through their mouth in the absence of a flow of pressurised air through the plenum chamber inlet port, or the patient interface is configured to leave the patient's mouth uncovered.

In examples: a) the vent structure is comprised as part of, or is provided to, the plenum chamber; and/or b) the patient interface further comprises a positioning and stabilising structure to provide a force to hold the seal-forming structure in a therapeutically effective position on the patient's head.

Another aspect of one form of the present technology is a positioning and stabilising structure configured to provide a force to hold a seal-forming structure in a therapeutically effective position on a patient's head in use, the positioning and stabilising structure comprising:

at least one gas delivery tube being constructed and arranged to contact at least a region of the patient's head superior to an otobasion superior of the patient's head, wherein an end of the at least one gas delivery tube is configured to fluidly connect to a plenum chamber;

a connection port to receive a flow of air from an air circuit and to deliver the flow of air to the entrance of the patient's airways via the seal-forming structure, wherein the connection port is provided to a portion of the gas delivery tube superior to the otobasion superior of the patient's head; and a connection member according to any one of the aspects as described above.

Another aspect of one form of the present technology is a patient interface that is moulded or otherwise constructed with a perimeter shape which is complementary to that of an intended wearer.

An aspect of one form of the present technology is a method of manufacturing apparatus.

An aspect of certain forms of the present technology is a medical device that is easy to use, e.g. by a person who does not have medical training, by a person who has limited dexterity, vision or by a person with limited experience in using this type of medical device.

An aspect of one form of the present technology is a patient interface that may be washed in a home of a patient, e.g., in soapy water, without requiring specialised cleaning equipment. An aspect of one form of the present technology is a humidifier tank that may be washed in a home of a patient, e.g., in soapy water, without requiring specialised cleaning equipment.

Of course, portions of the aspects may form sub-aspects of the present technology. Also, various ones of the sub-aspects and/or aspects may be combined in various manners and also constitute additional aspects or sub-aspects of the present technology.

Other features of the technology will be apparent from consideration of the information contained in the following detailed description, abstract, drawings and claims.

4 BRIEF DESCRIPTION OF THE DRAWINGS

The present technology is illustrated by way of example, and not by way of limitation, in the figures of the accompanying drawings, in which like reference numerals refer to similar elements including:

4.1 Respiratory Therapy Systems

FIG. 1A shows a system including a patient 1000 wearing a patient interface 3000, in the form of nasal pillows, receiving a supply of air at positive pressure from an RPT device 4000. Air from the RPT device 4000 is conditioned in a humidifier 5000 and passes along an air circuit 4170 to the patient 1000. A bed partner 1100 is also shown. The patient is sleeping in a supine sleeping position.

FIG. 1B shows a system including a patient 1000 wearing a patient interface 3000, in the form of a nasal mask, receiving a supply of air at positive pressure from an RPT device 4000. Air from the RPT device is humidified in a humidifier 5000 and passes along an air circuit 4170 to the patient 1000.

FIG. 1C shows a system including a patient 1000 wearing a patient interface 3000, in the form of a full-face mask, receiving a supply of air at positive pressure from an RPT device 4000. Air from the RPT device is humidified in a humidifier 5000 and passes along an air circuit 4170 to the patient 1000. The patient is sleeping in a side sleeping position.

4.2 Respiratory System and Facial Anatomy

Figure 1A:
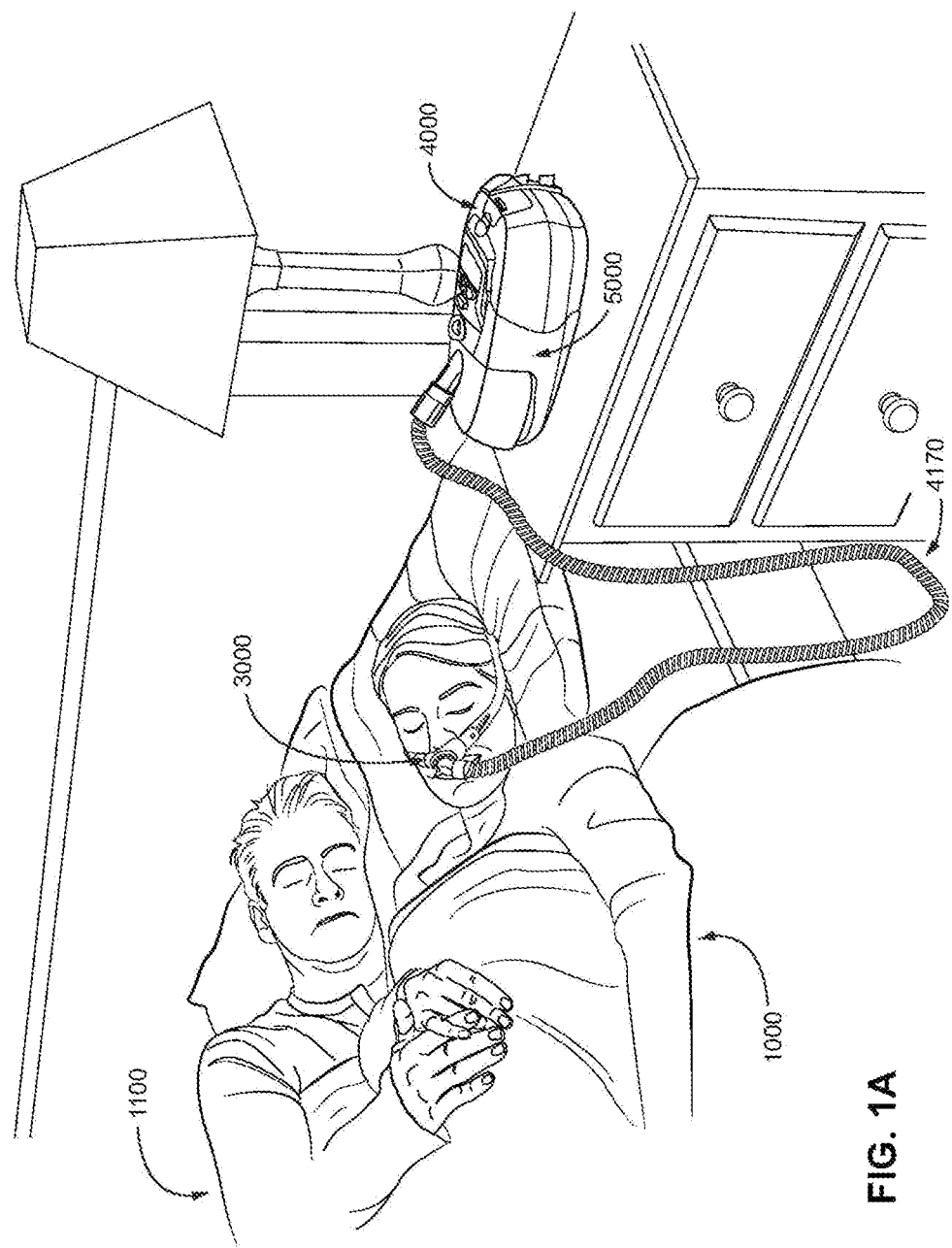
Figure 1B:
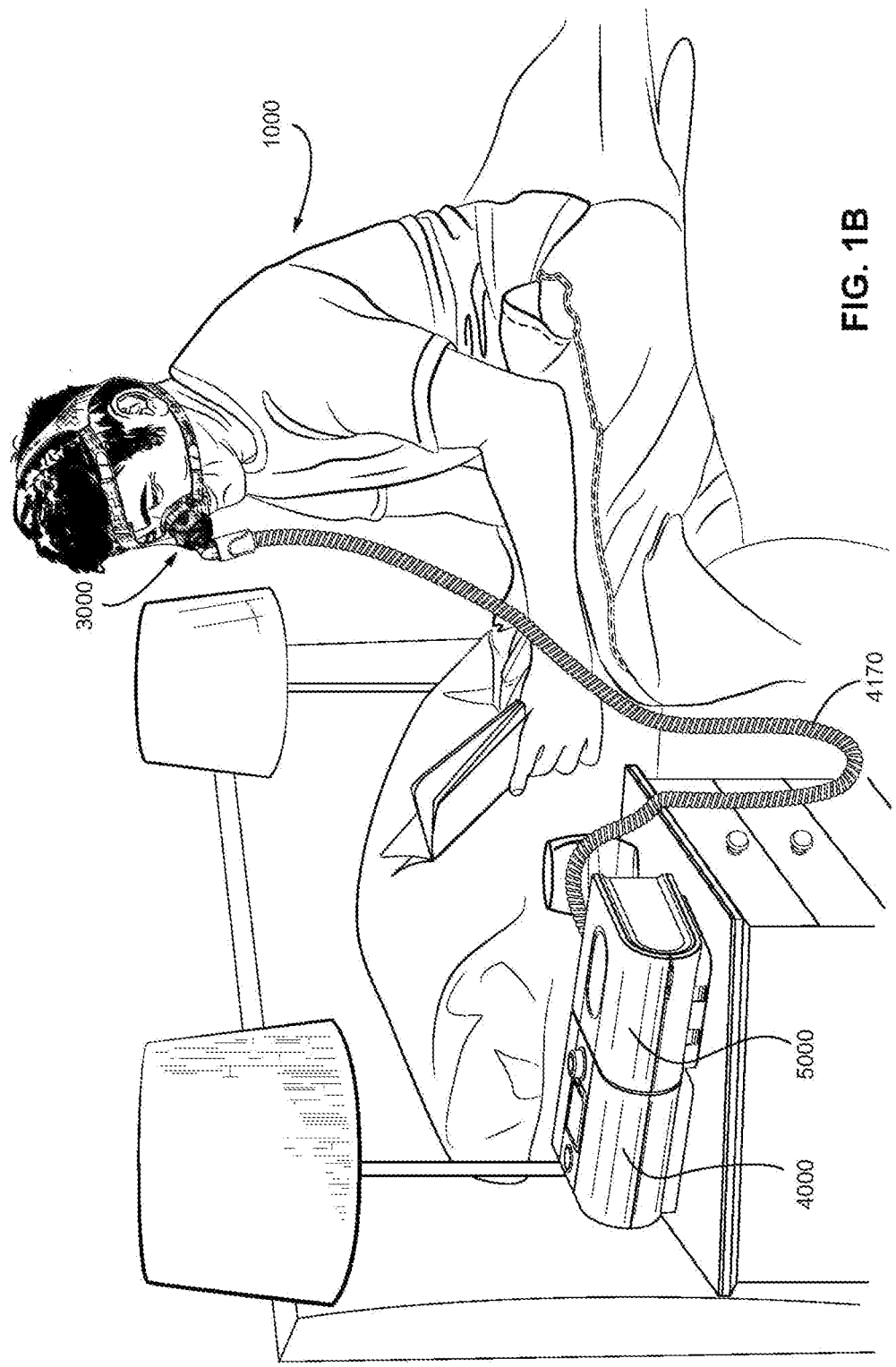
Figure 1C:
Figure 2A:
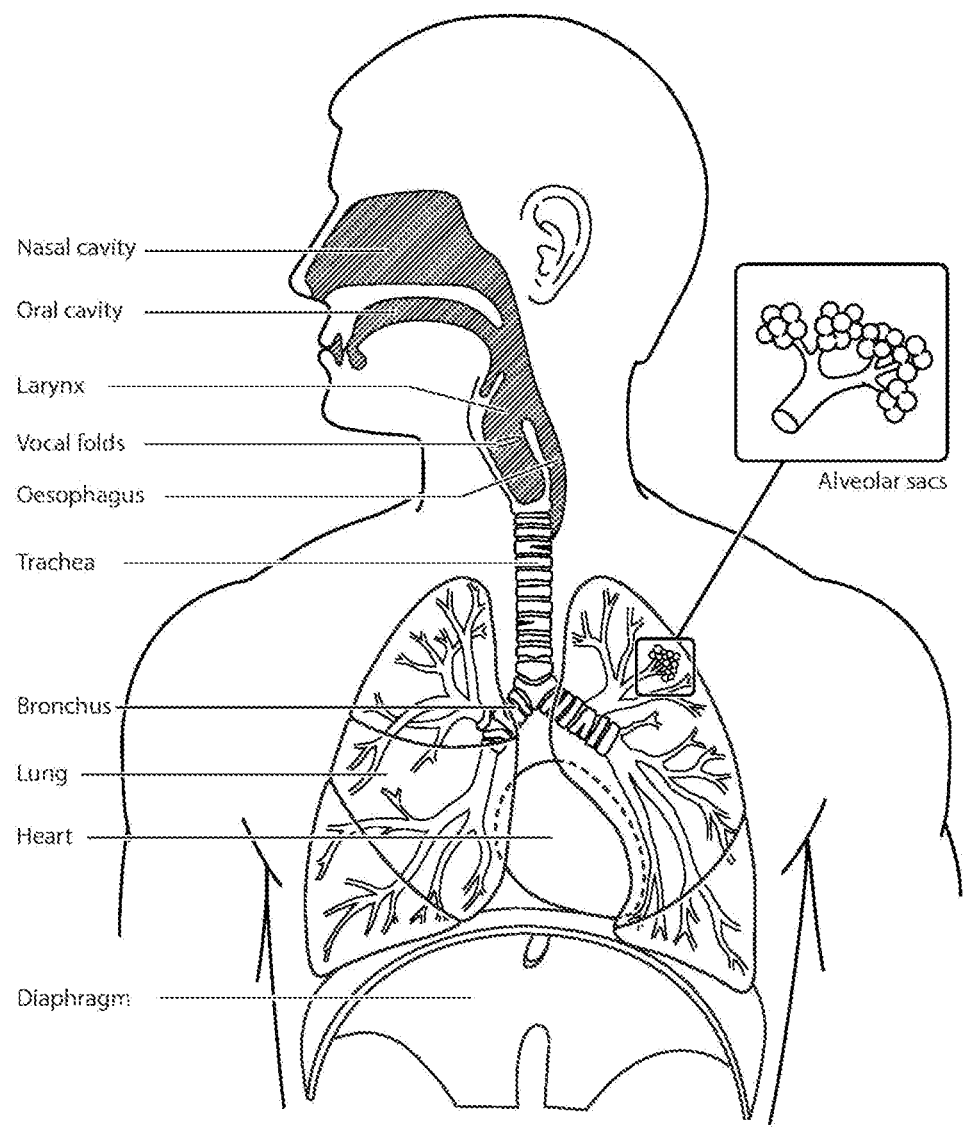
FIG. 2A shows an overview of a human respiratory system including the nasal and oral cavities, the larynx, vocal folds, oesophagus, trachea, bronchus, lung, alveolar sacs, heart and diaphragm.
Figure 2B:
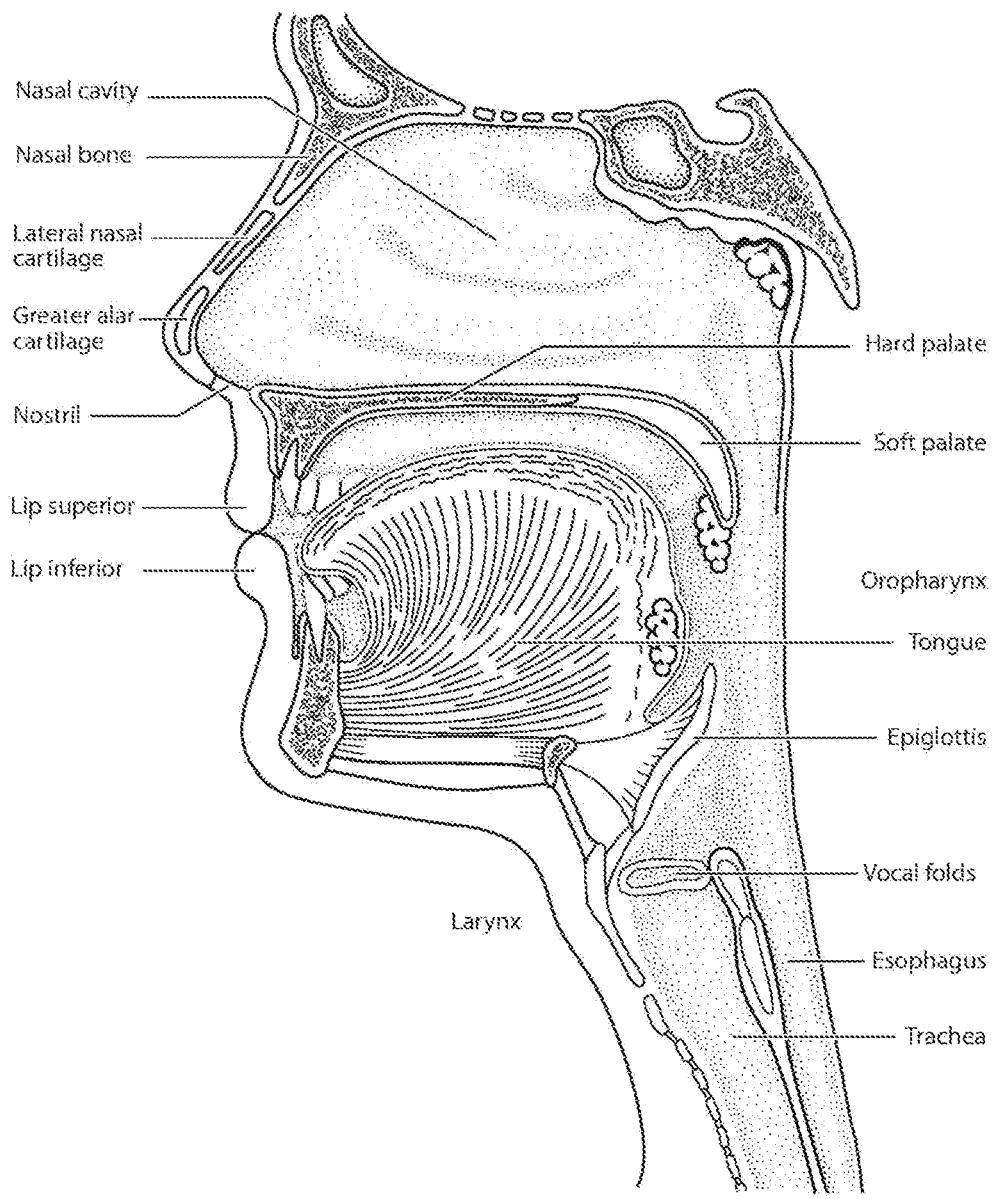
FIG. 2B shows a view of a human upper airway including the nasal cavity, nasal bone, lateral nasal cartilage, greater alar cartilage, nostril, lip superior, lip inferior, larynx, hard palate, soft palate, oropharynx, tongue, epiglottis, vocal folds, oesophagus and trachea.
Figure 2C:
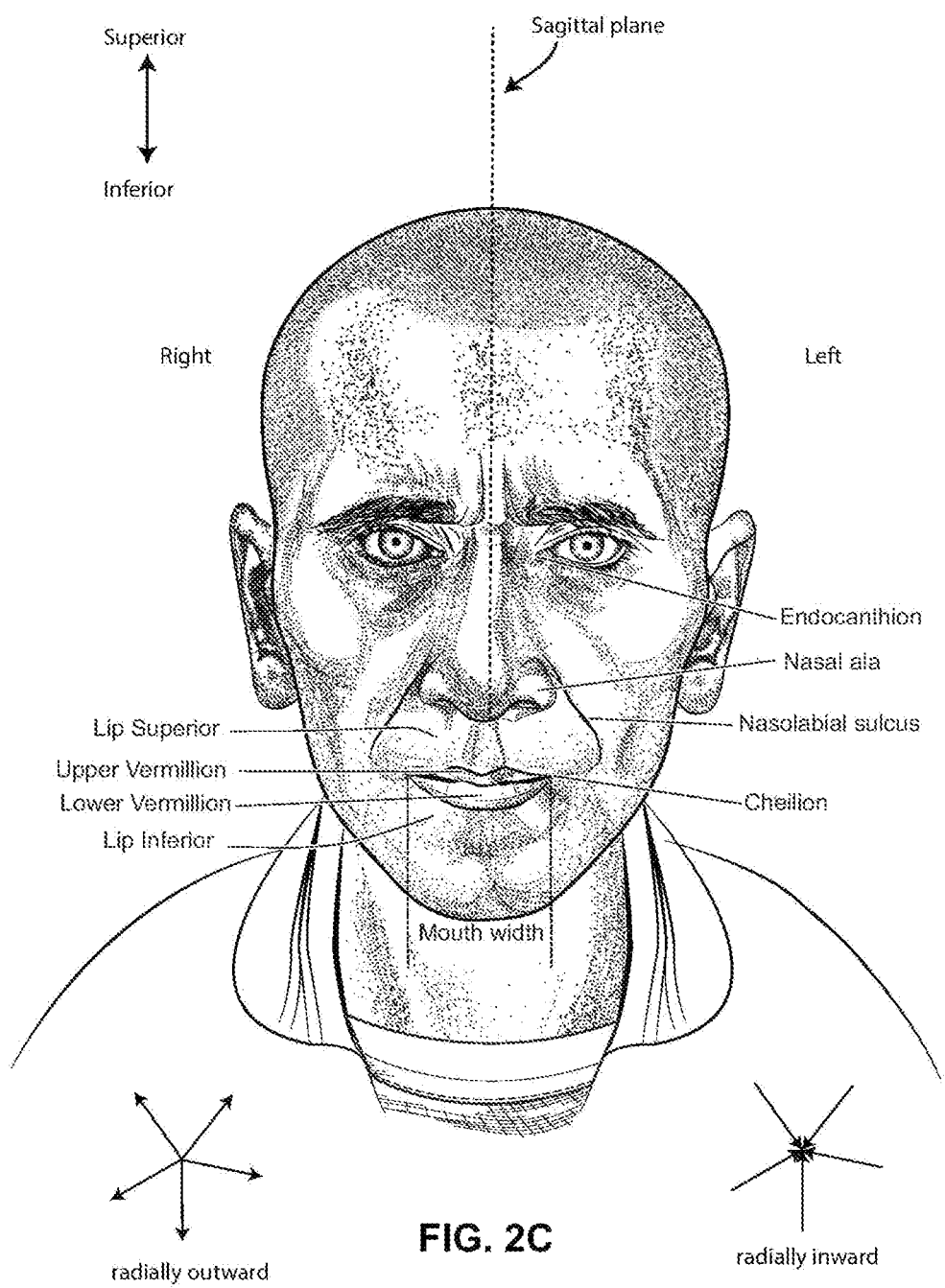
FIG. 2C is a front view of a face with several features of surface anatomy identified including the lip superior, upper vermilion, lower vermilion, lip inferior, mouth width, endocanthion, a nasal ala, nasolabial sulcus and cheilion. Also indicated are the directions superior, inferior, radially inward and radially outward.
Figure 2D:
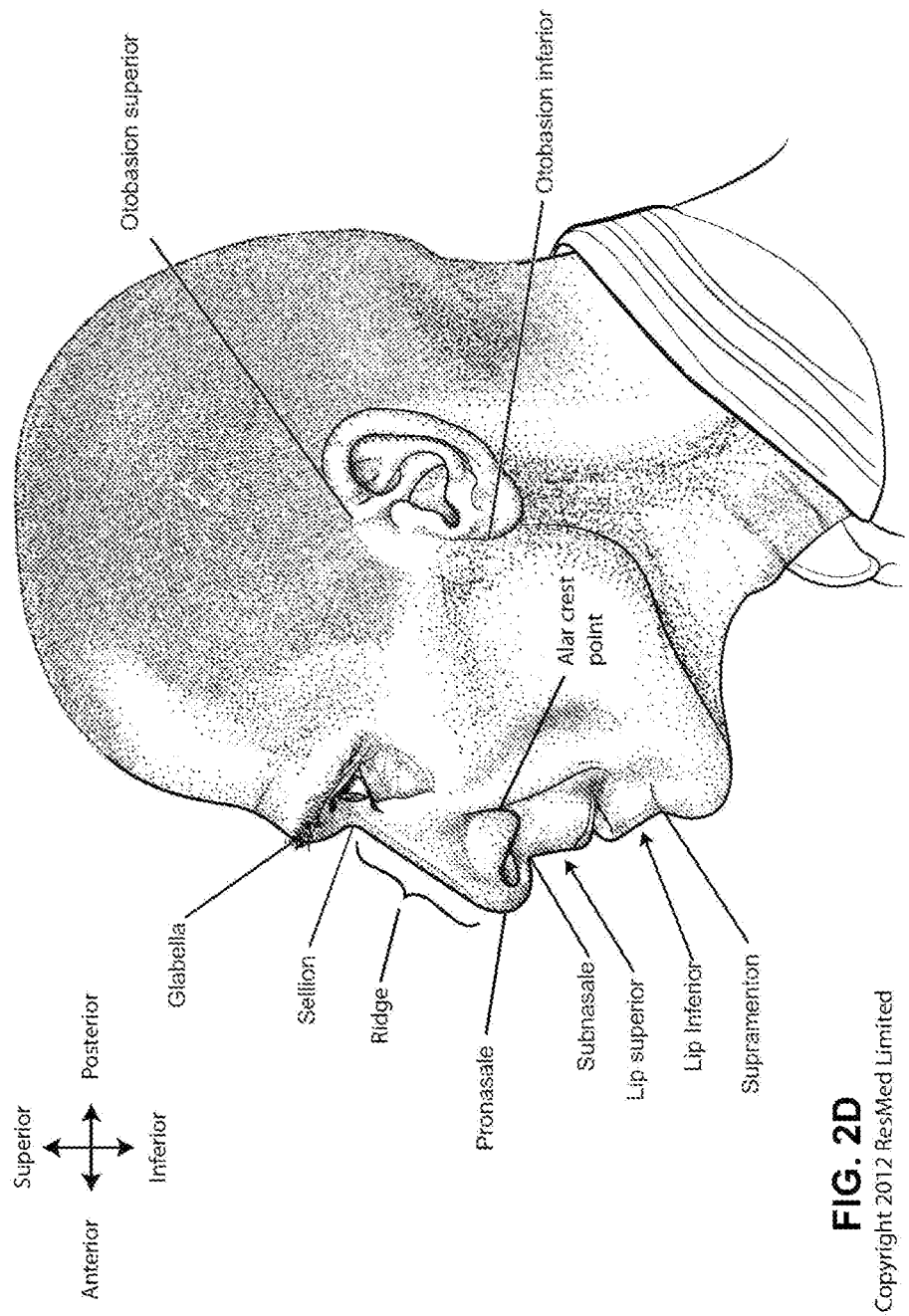
FIG. 2D is a side view of a head with several features of surface anatomy identified including glabella, sellion, pronasale, subnasale, lip superior, lip inferior, supramenton, nasal ridge, alar crest point, otobasion superior and otobasion inferior. Also indicated are the directions superior & inferior, and anterior & posterior.
Figure 2E:
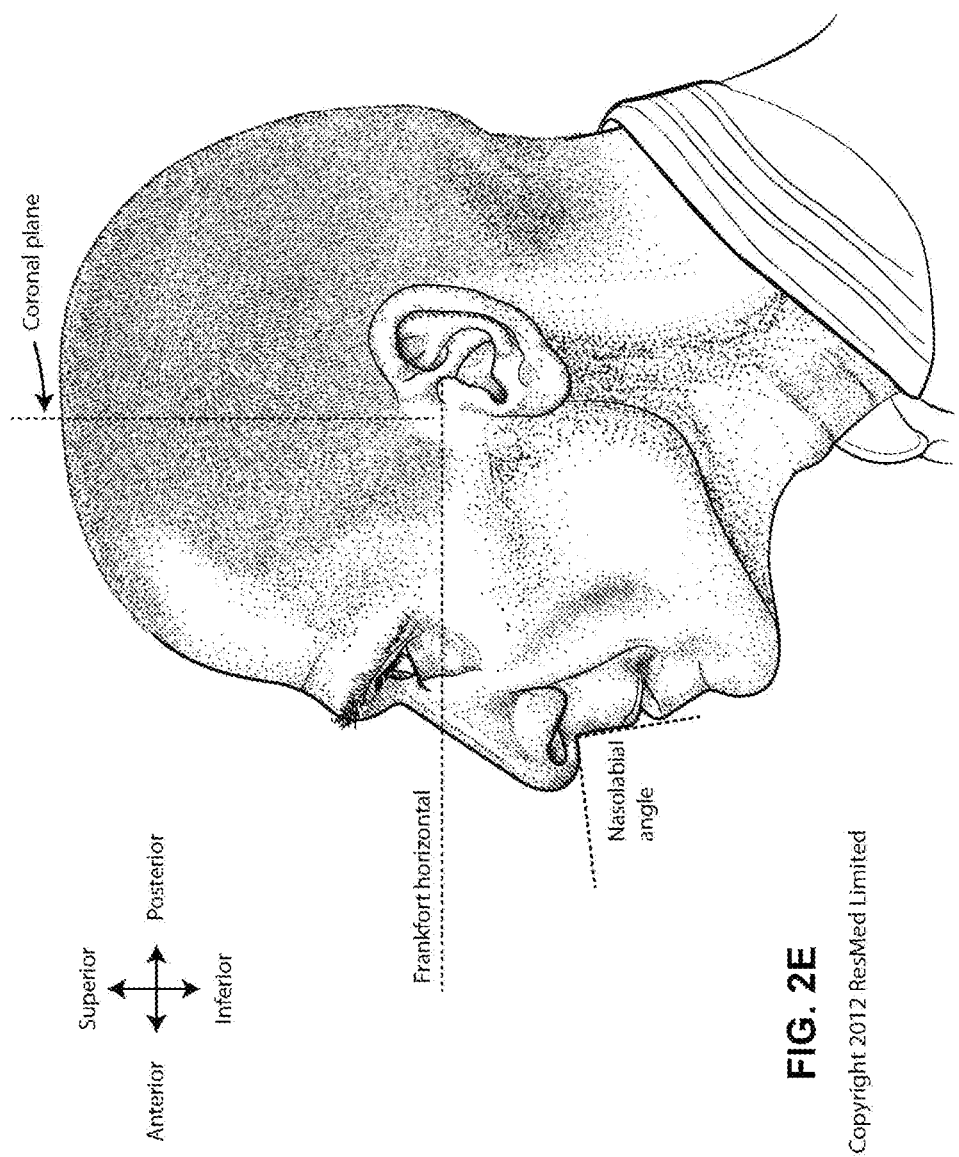

FIG. 2E is a further side view of a head. The approximate locations of the Frankfort horizontal and nasolabial angle are indicated. The coronal plane is also indicated.

Figure 2F:
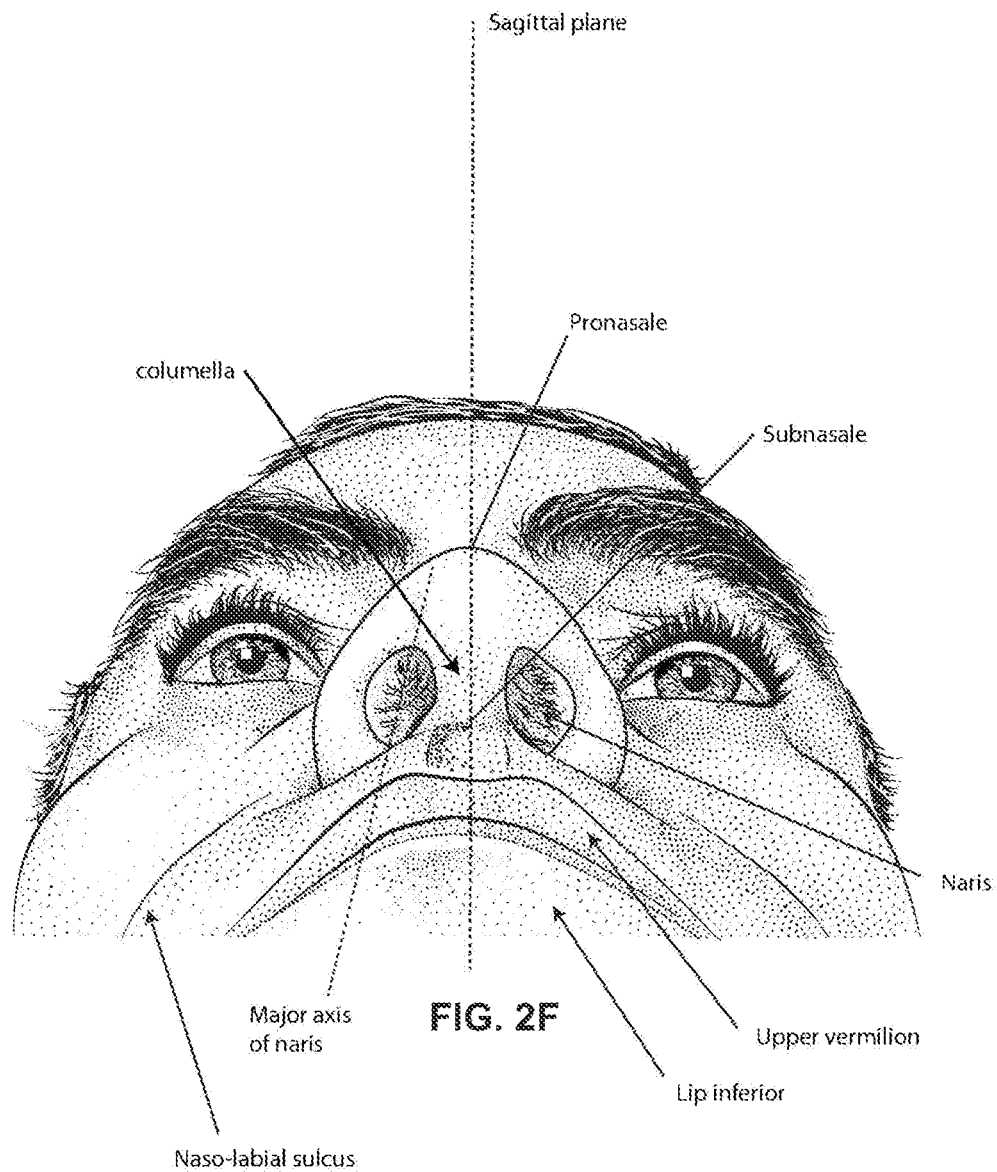

FIG. 2F shows a base view of a nose with several features identified including naso-labial sulcus, lip inferior, upper Vermilion, naris, subnasale, columella, pronasale, the major axis of a naris and the midsagittal plane.

FIG. 2G shows a side view of the superficial features of a nose.

FIG. 2H shows subcutaneal structures of the nose, including lateral cartilage, septum cartilage, greater alar cartilage, lesser alar cartilage, sesamoid cartilage, nasal bone, epidermis, adipose tissue, frontal process of the maxilla and fibrofatty tissue.

FIG. 2I shows a medial dissection of a nose, approximately several millimeters from the midsagittal plane, amongst other things showing the septum cartilage and medial crus of greater alar cartilage.

Figures 2J, 2K:
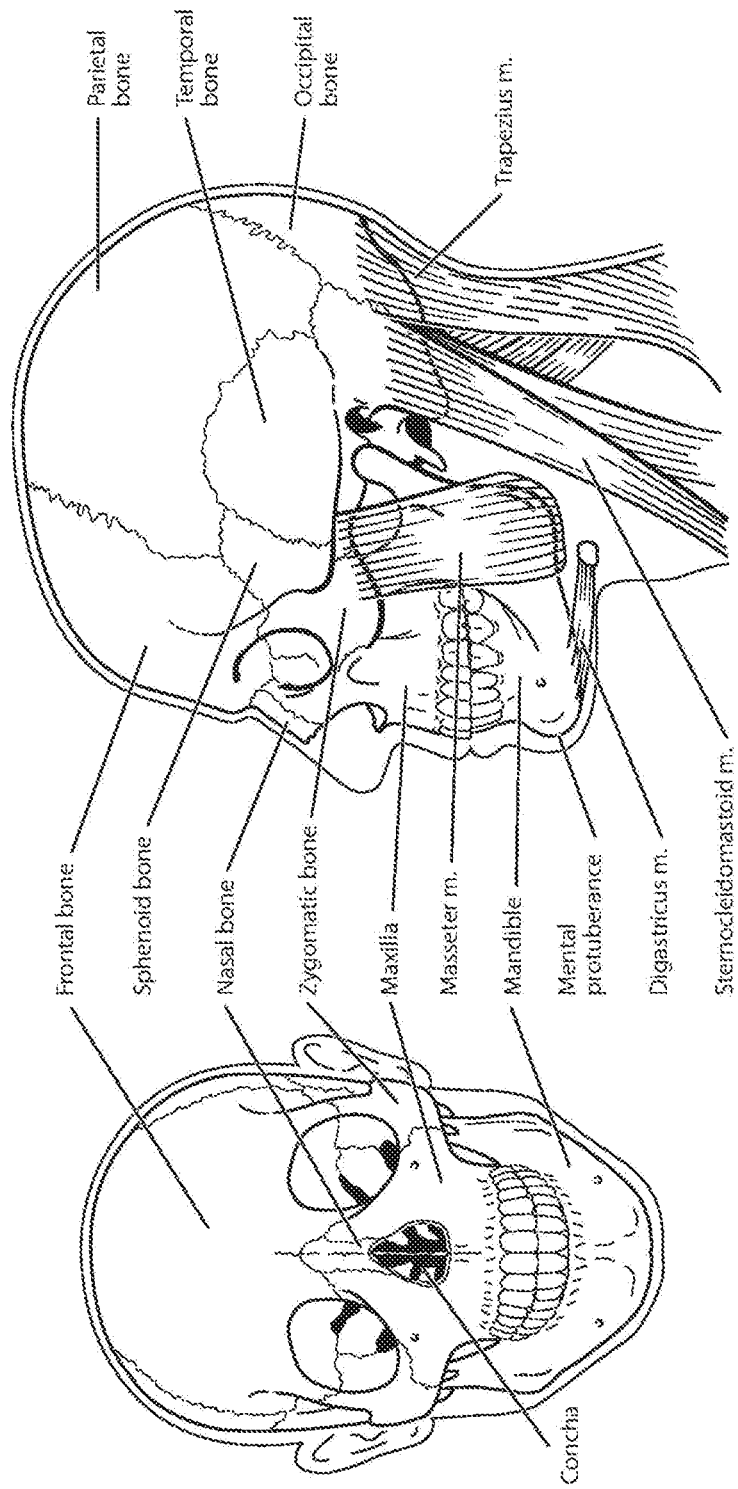

FIG. 2J shows a front view of the bones of a skull including the frontal, nasal and zygomatic bones. Nasal concha are indicated, as are the maxilla, and mandible.

FIG. 2K shows a lateral view of a skull with the outline of the surface of a head, as well as several muscles. The following bones are shown: frontal, sphenoid, nasal, zygomatic, maxilla, mandible, parietal, temporal and occipital. The mental protuberance is indicated. The following muscles are shown: digastricus, masseter, sternocleidomastoid and trapezius.

Figure 2L:
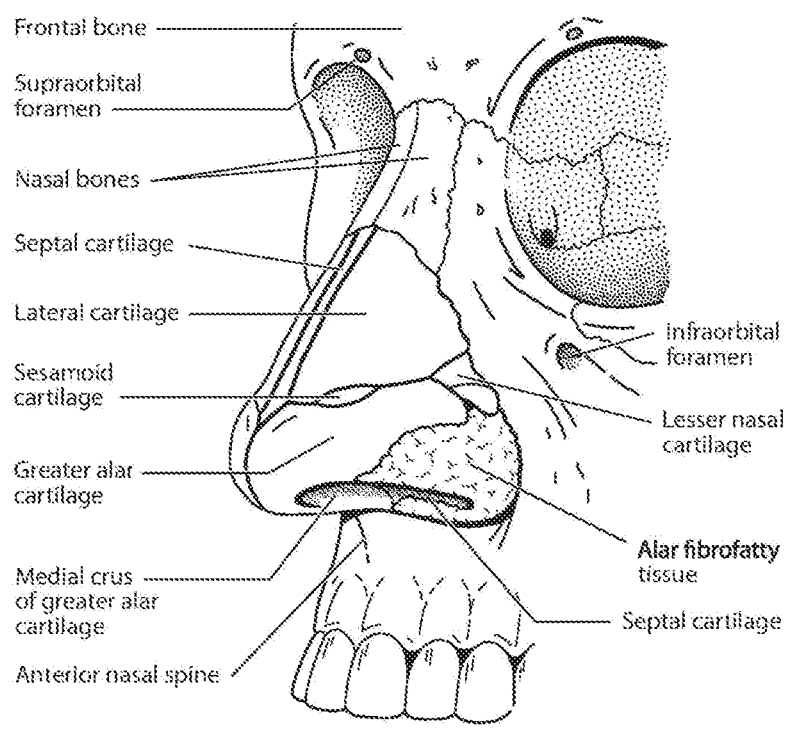

FIG. 2L shows an anterolateral view of a nose.

4.3 Patient Interface

Figure 3A:
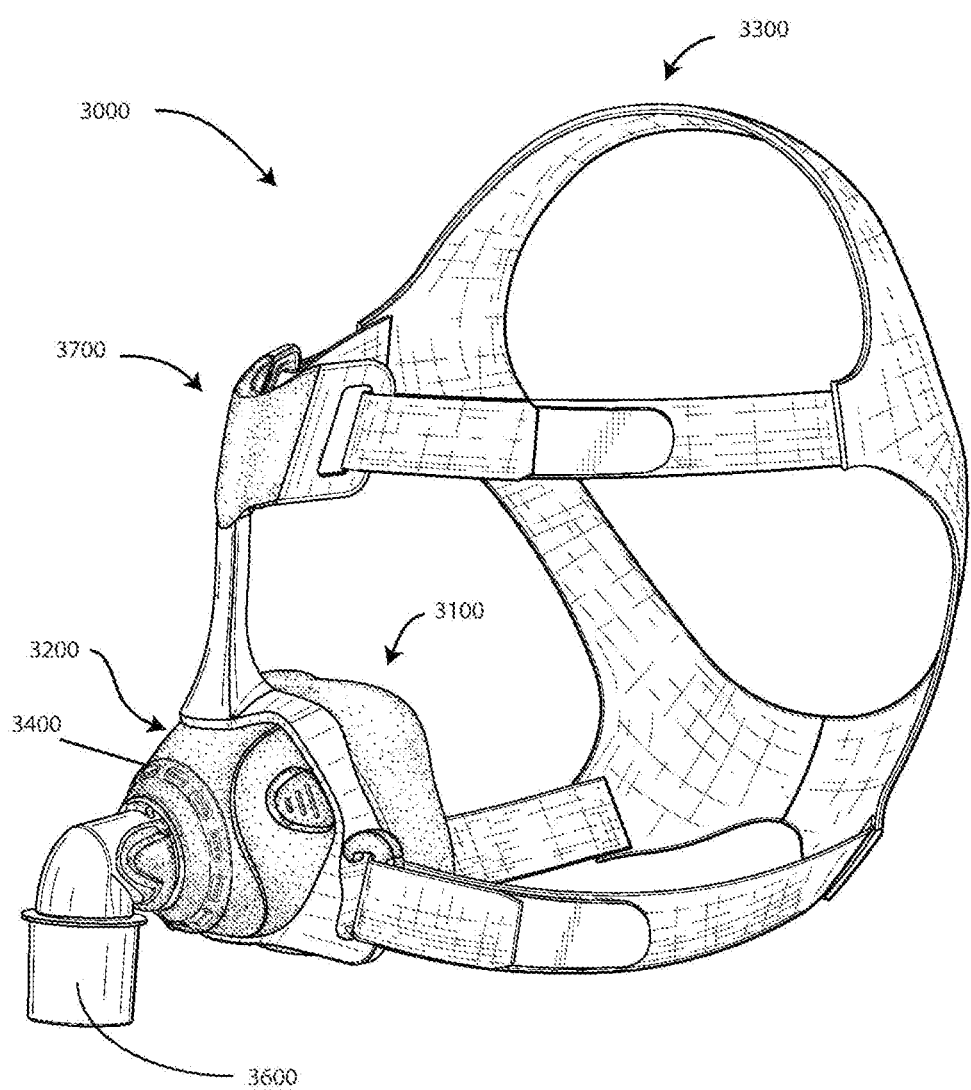

FIG. 3A shows a patient interface in the form of a nasal mask in accordance with one form of the present technology.

Figure 3B:
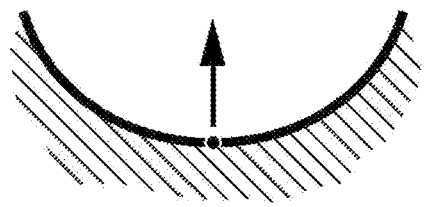

FIG. 3B shows a schematic of a cross-section through a structure at a point. An outward normal at the point is indicated. The curvature at the point has a positive sign, and a relatively large magnitude when compared to the magnitude of the curvature shown in FIG. 3C.

Figure 3C:
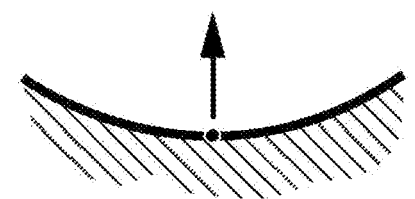

FIG. 3C shows a schematic of a cross-section through a structure at a point. An outward normal at the point is indicated. The curvature at the point has a positive sign, and a relatively small magnitude when compared to the magnitude of the curvature shown in FIG. 3B.

Figure 3D:
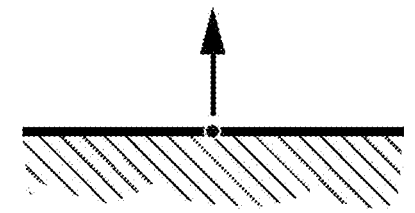

FIG. 3D shows a schematic of a cross-section through a structure at a point. An outward normal at the point is indicated. The curvature at the point has a value of zero.

Figure 3E:
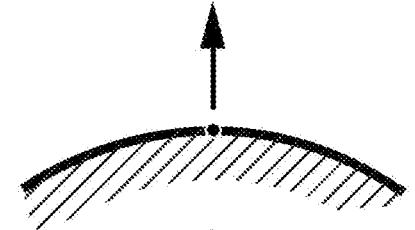

FIG. 3E shows a schematic of a cross-section through a structure at a point. An outward normal at the point is indicated. The curvature at the point has a negative sign, and a relatively small magnitude when compared to the magnitude of the curvature shown in FIG. 3F.

Figure 3F:
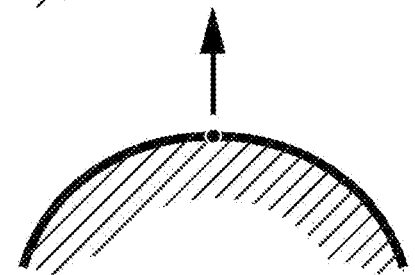

FIG. 3F shows a schematic of a cross-section through a structure at a point. An outward normal at the point is indicated. The curvature at the point has a negative sign, and a relatively large magnitude when compared to the magnitude of the curvature shown in FIG. 3E.

FIG. 3G shows a cushion for a mask that includes two pillows. An exterior surface of the cushion is indicated. An edge of the surface is indicated. Dome and saddle regions are indicated.

FIG. 3H shows a cushion for a mask. An exterior surface of the cushion is indicated. An edge of the surface is indicated. A path on the surface between points A and B is indicated. A straight line distance between A and B is indicated. Two saddle regions and a dome region are indicated.

Figure 3I:
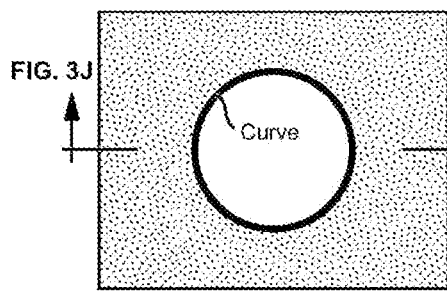

FIG. 3I shows the surface of a structure, with a one dimensional hole in the surface. The illustrated plane curve forms the boundary of a one dimensional hole.

Figure 3K:
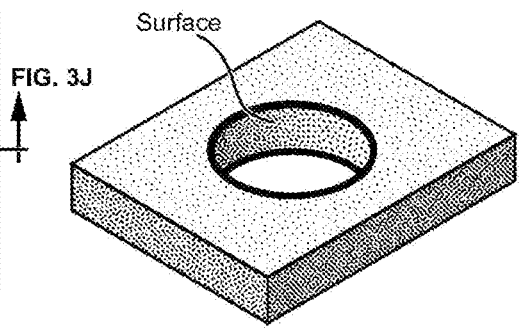
Figure 3J:
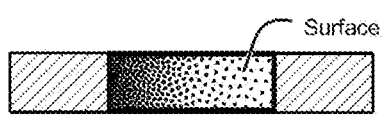

FIG. 3J shows a cross-section through the structure of FIG. 3I. The illustrated surface bounds a two dimensional hole in the structure of FIG. 3I.

FIG. 3K shows a perspective view of the structure of FIG. 3I, including the two dimensional hole and the one dimensional hole. Also shown is the surface that bounds a two dimensional hole in the structure of FIG. 3I.

Figure 3L:
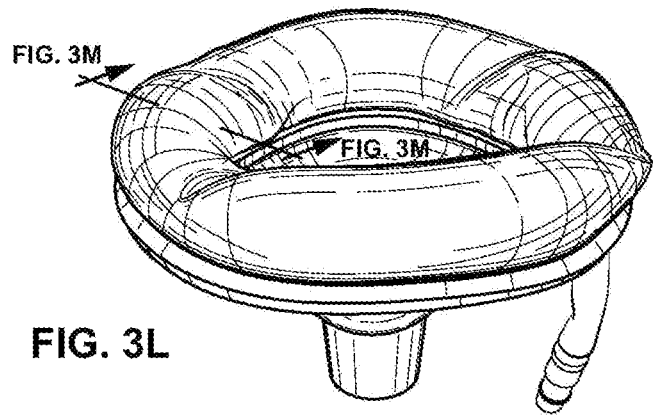

FIG. 3L shows a mask having an inflatable bladder as a cushion.

Figure 3M:
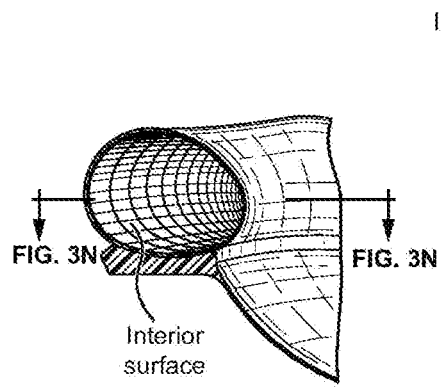

FIG. 3M shows a cross-section through the mask of FIG. 3L and shows the interior surface of the bladder. The interior surface bounds the two dimensional hole in the mask.

Figure 3N:
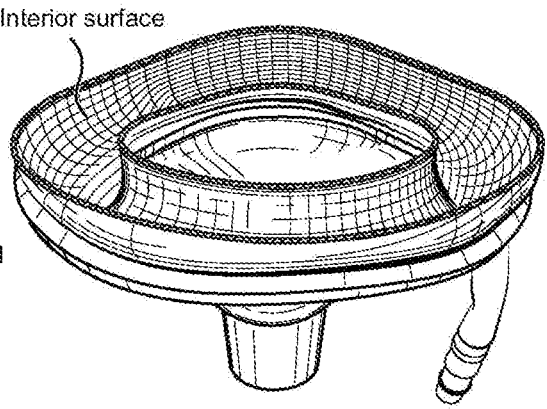

FIG. 3N shows a further cross-section through the mask of FIG. 3L. The interior surface is also indicated.

Figure 3O:
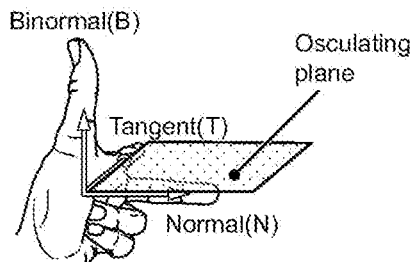

FIG. 3O illustrates a left-hand rule.

Figure 3P:
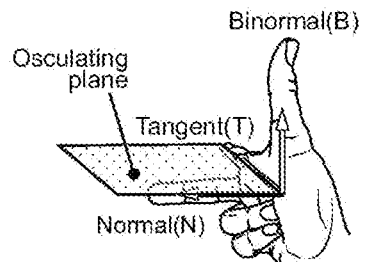

FIG. 3P illustrates a right-hand rule.

Figure 3Q:
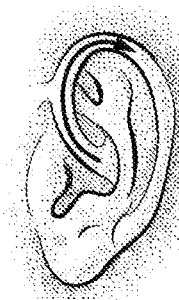

FIG. 3Q shows a left ear, including the left ear helix.

Figure 3S:
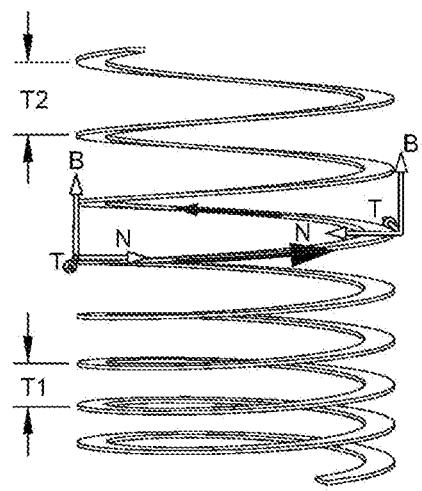
Figure 3R:
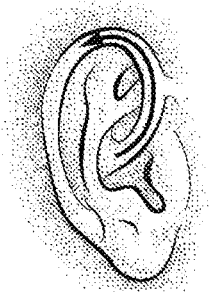

FIG. 3R shows a right ear, including the right ear helix.

FIG. 3S shows a right-hand helix.

Figure 3T:
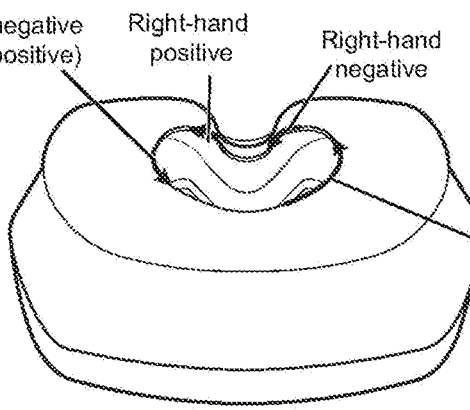

FIG. 3T shows a view of a mask, including the sign of the torsion of the space curve defined by the edge of the sealing membrane in different regions of the mask.

Figure 3U:
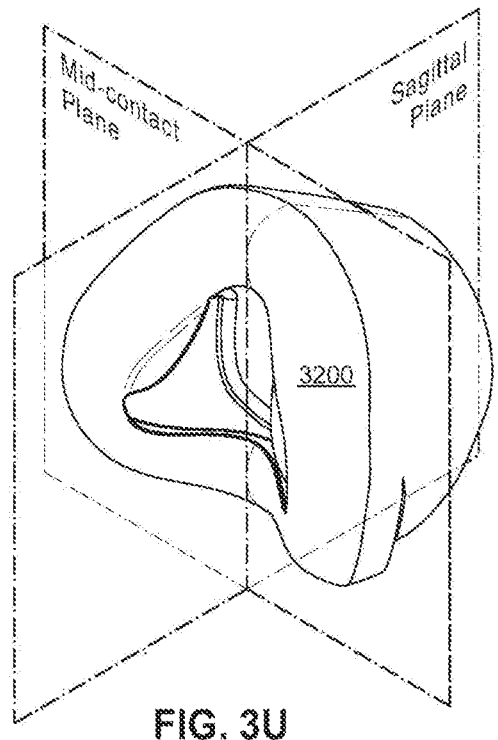

FIG. 3U shows a view of a plenum chamber 3200 showing a sagittal plane and a mid-contact plane.

Figure 3V:
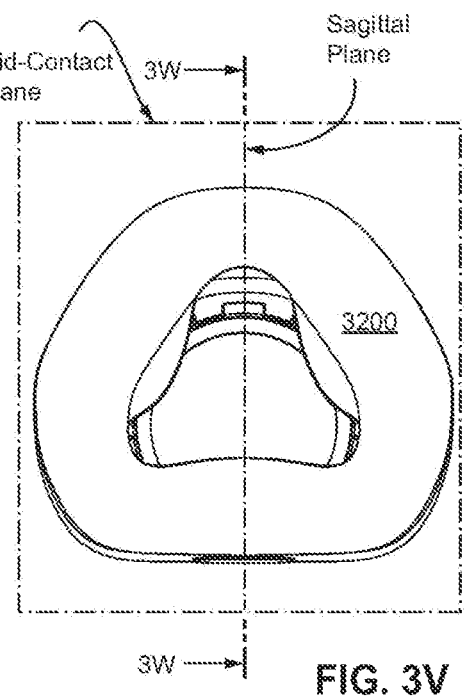

FIG. 3V shows a view of a posterior of the plenum chamber of FIG. 3U. The direction of the view is normal to the mid-contact plane. The sagittal plane in FIG. 3V bisects the plenum chamber into left-hand and right-hand sides.

Figure 3W:
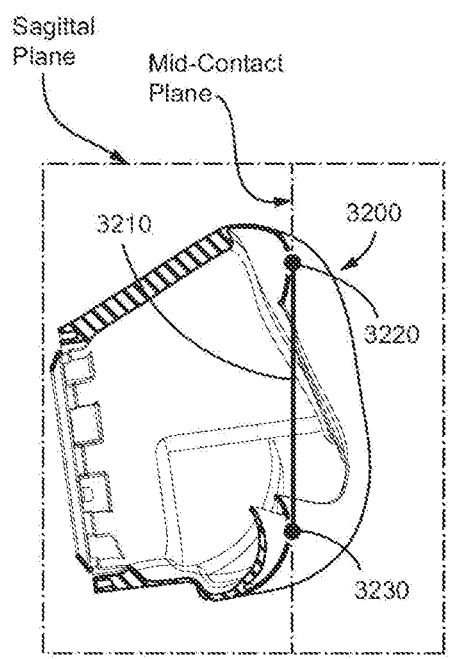

FIG. 3W shows a cross-section through the plenum chamber of FIG. 3V, the cross-section being taken at the sagittal plane shown in FIG. 3V. A 'mid-contact' plane is shown. The mid-contact plane is perpendicular to the sagittal plane. The orientation of the mid-contact plane corresponds to the orientation of a chord 3210 which lies on the sagittal plane and just touches the cushion of the plenum chamber at two points on the sagittal plane: a superior point 3220 and an inferior point 3230. Depending on the geometry of the cushion in this region, the mid-contact plane may be a tangent at both the superior and inferior points.

Figure 3X:
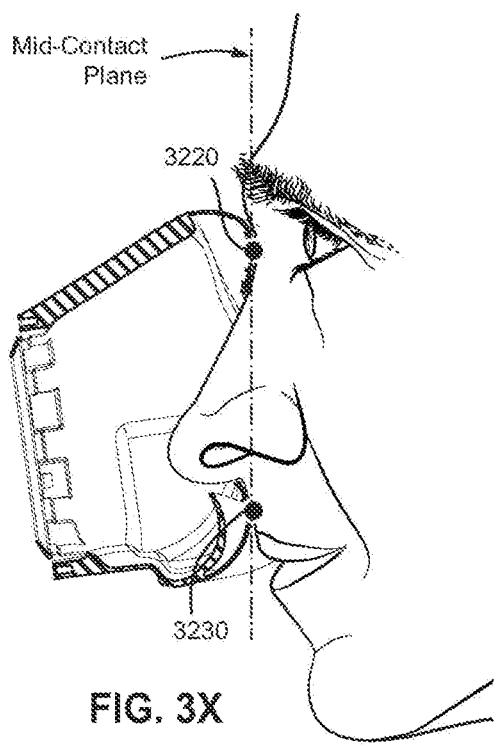

FIG. 3X shows the plenum chamber 3200 of FIG. 3U in position for use on a face. The sagittal plane of the plenum chamber 3200 generally coincides with the midsagittal plane of the face when the plenum chamber is in position for use. The mid-contact plane corresponds generally to the 'plane of the face' when the plenum chamber is in position for use. In FIG. 3X the plenum chamber 3200 is that of a nasal mask, and the superior point 3220 sits approximately on the sellion, while the inferior point 3230 sits on the lip superior.

4.4 RPT Device

Figure 4A:
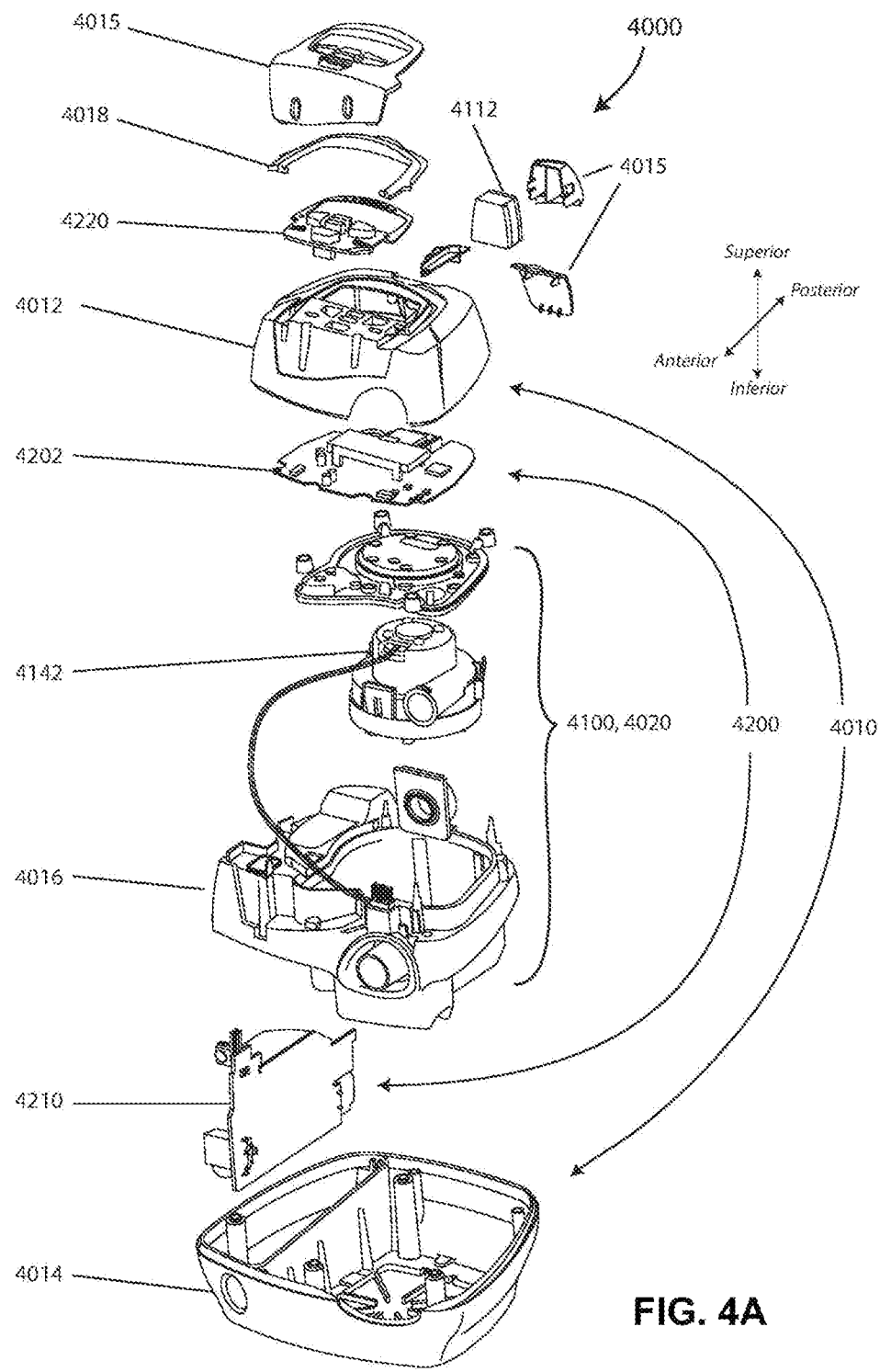

FIG. 4A shows an RPT device in accordance with one form of the present technology.

Figure 4B:
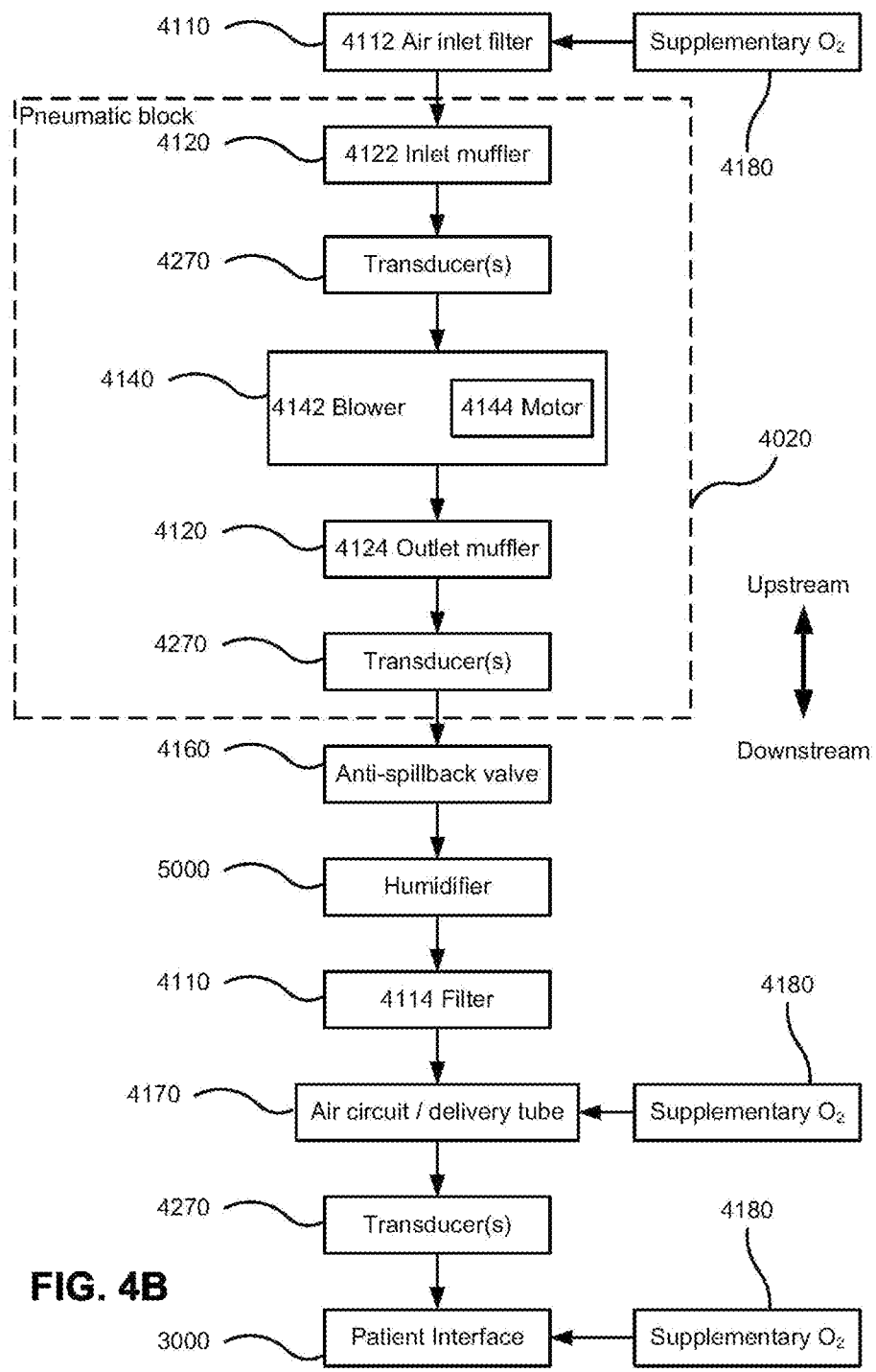

FIG. 4B is a schematic diagram of the pneumatic path of an RPT device in accordance with one form of the present technology. The directions of upstream and downstream are indicated with reference to the blower and the patient interface. The blower is defined to be upstream of the patient interface and the patient interface is defined to be downstream of the blower, regardless of the actual flow direction at any particular moment. Items which are located within the pneumatic path between the blower and the patient interface are downstream of the blower and upstream of the patient interface.

4.5 Humidifier

Figure 5A:
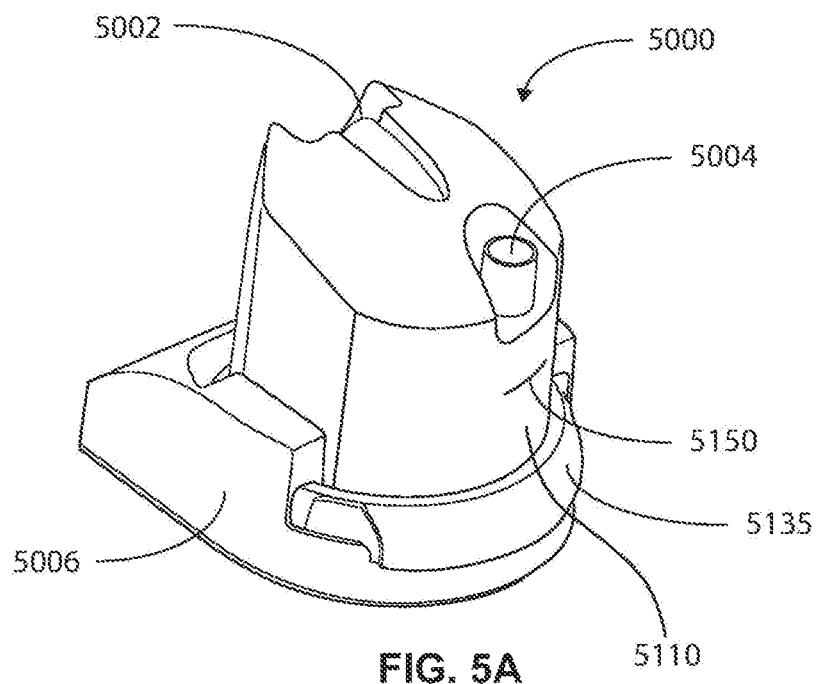

FIG. 5A shows an isometric view of a humidifier in accordance with one form of the present technology.

Figure 5B:
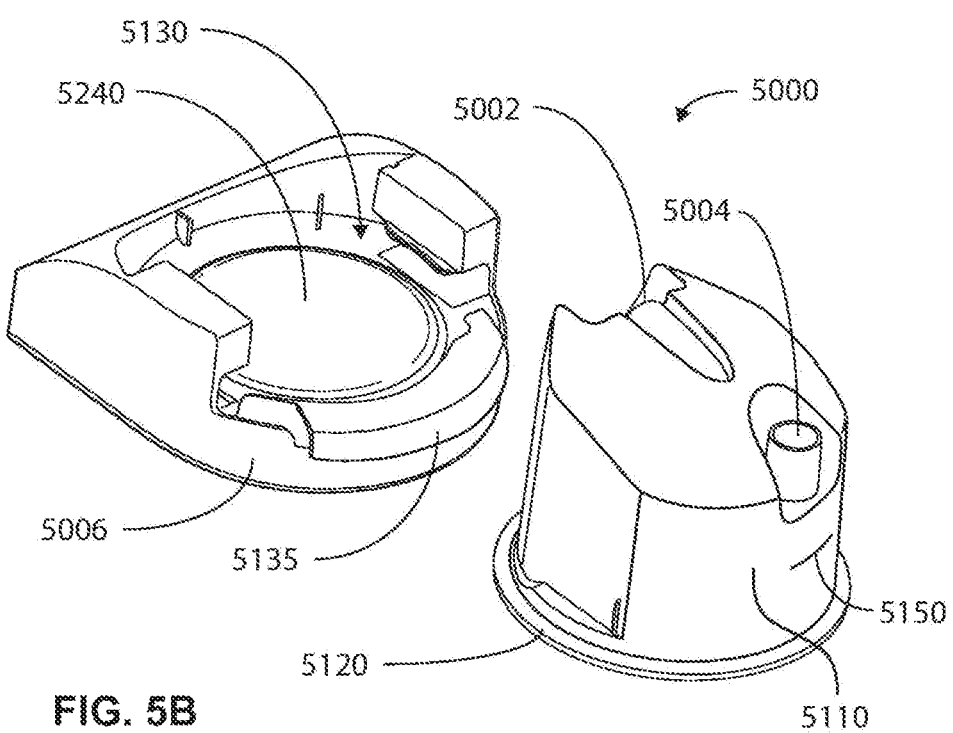

FIG. 5B shows an isometric view of a humidifier in accordance with one form of the present technology, showing a humidifier reservoir 5110 removed from the humidifier reservoir dock 5130.

4.6 Breathing Waveforms

FIG. 6A shows a model typical breath waveform of a person while sleeping.

4.7 Particular Examples of the Present Technology

Figure 7:
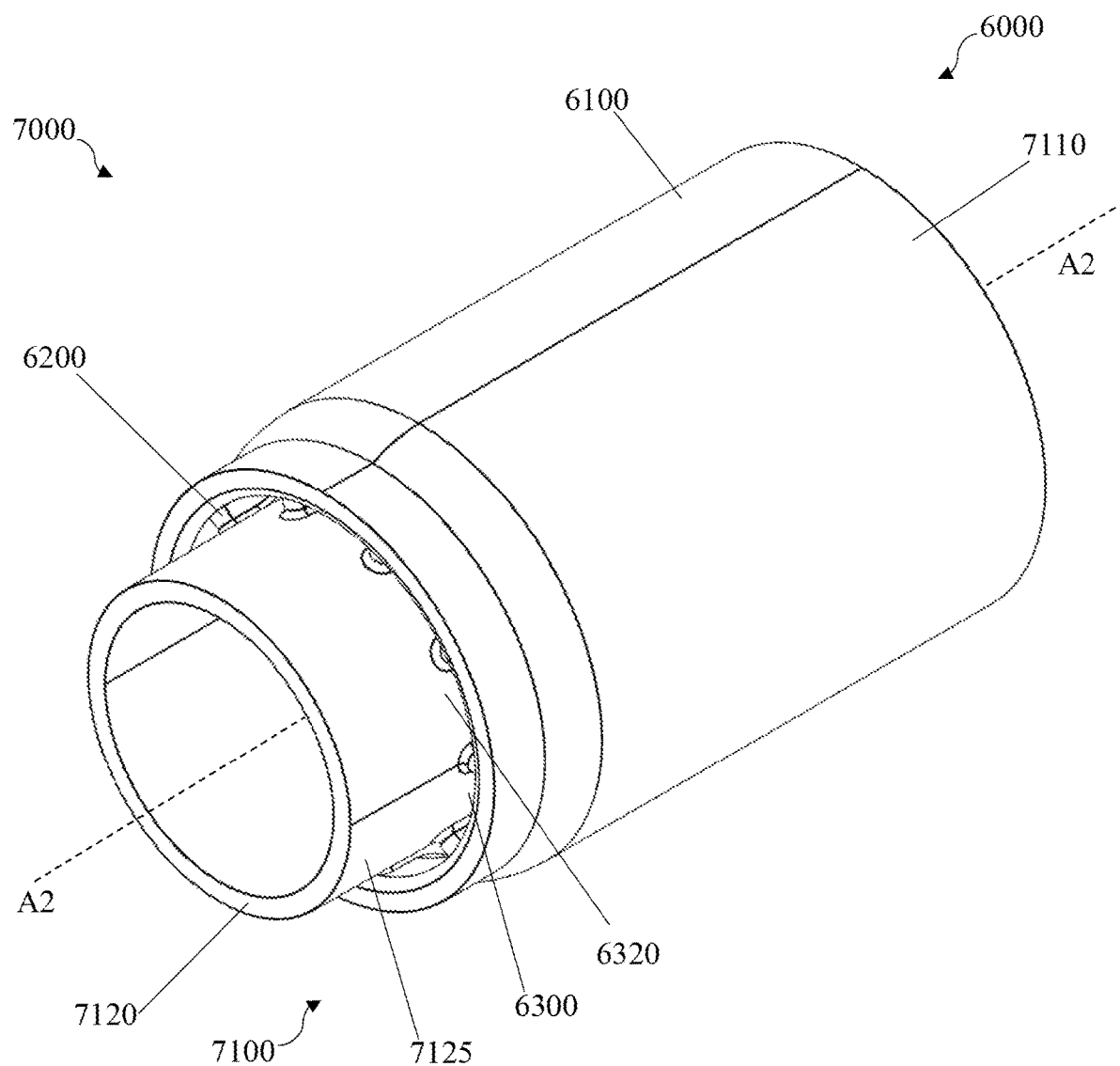

FIG. 7 shows a perspective view of a connection member according to one form of the present technology.

Figure 8:
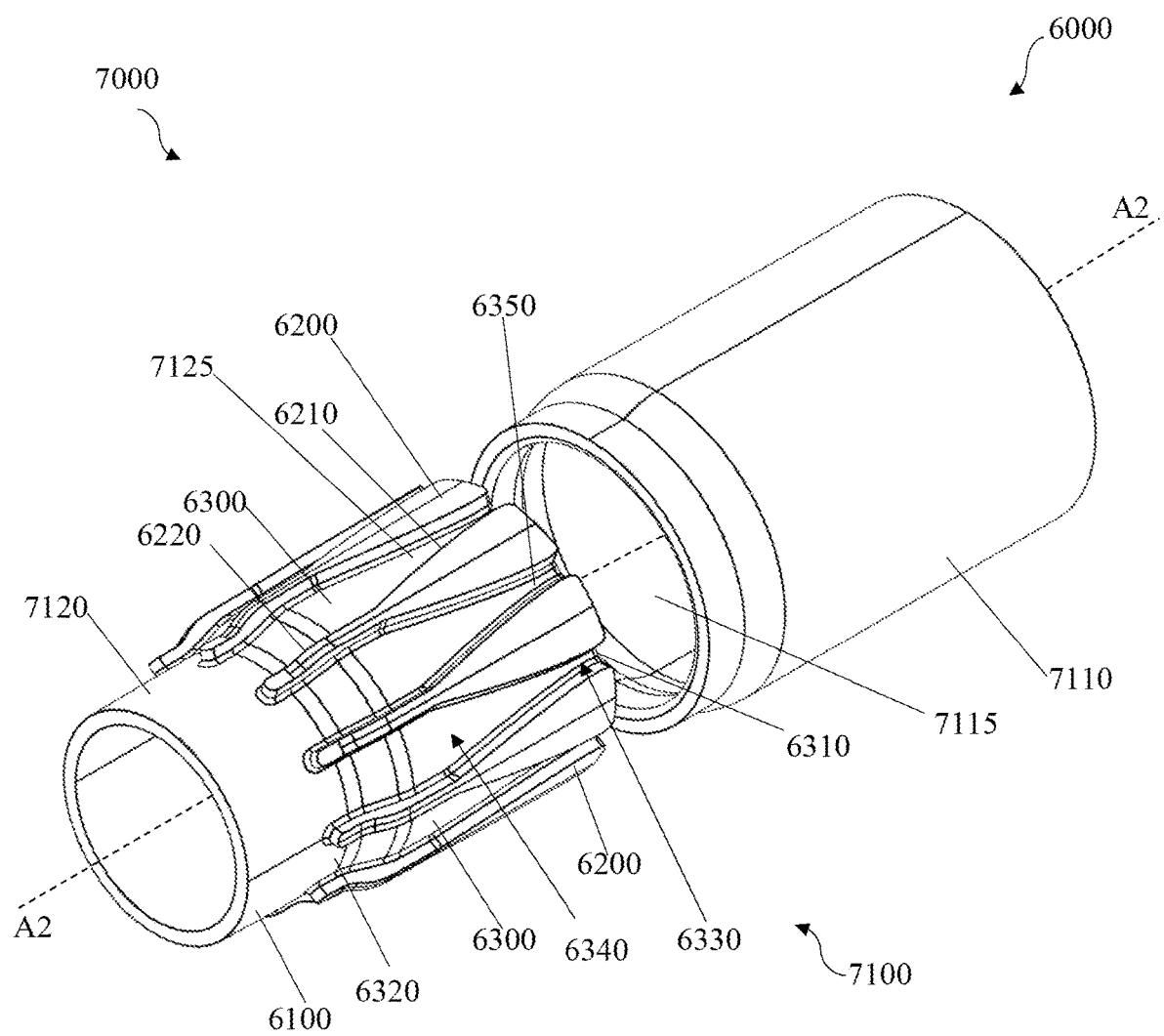

FIG. 8 shows an exploded perspective view of the connection member of FIG. 7.

Figure 9:
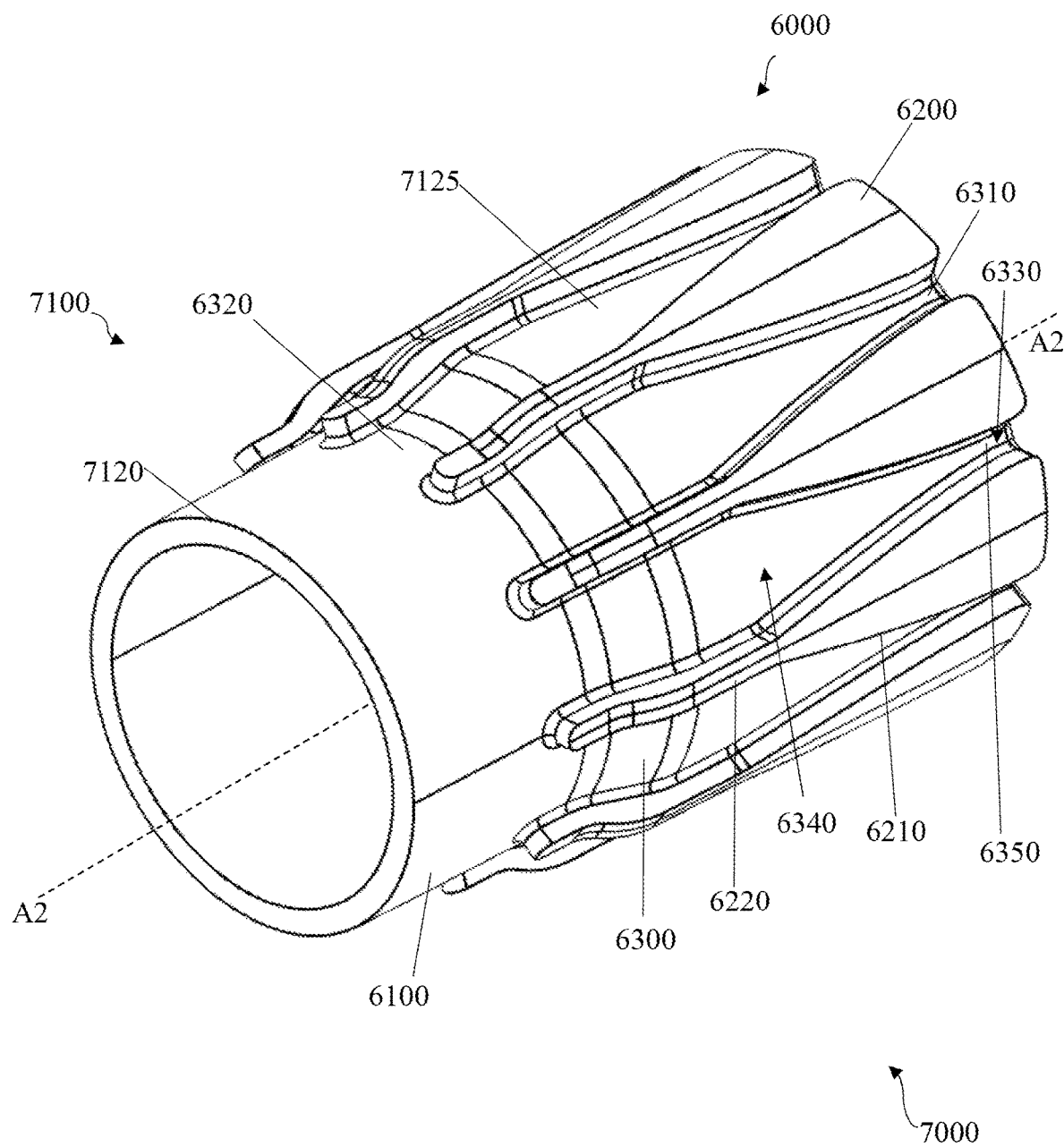

FIG. 9 shows a perspective view of part of the connection member of FIG. 7.

Figure 10:
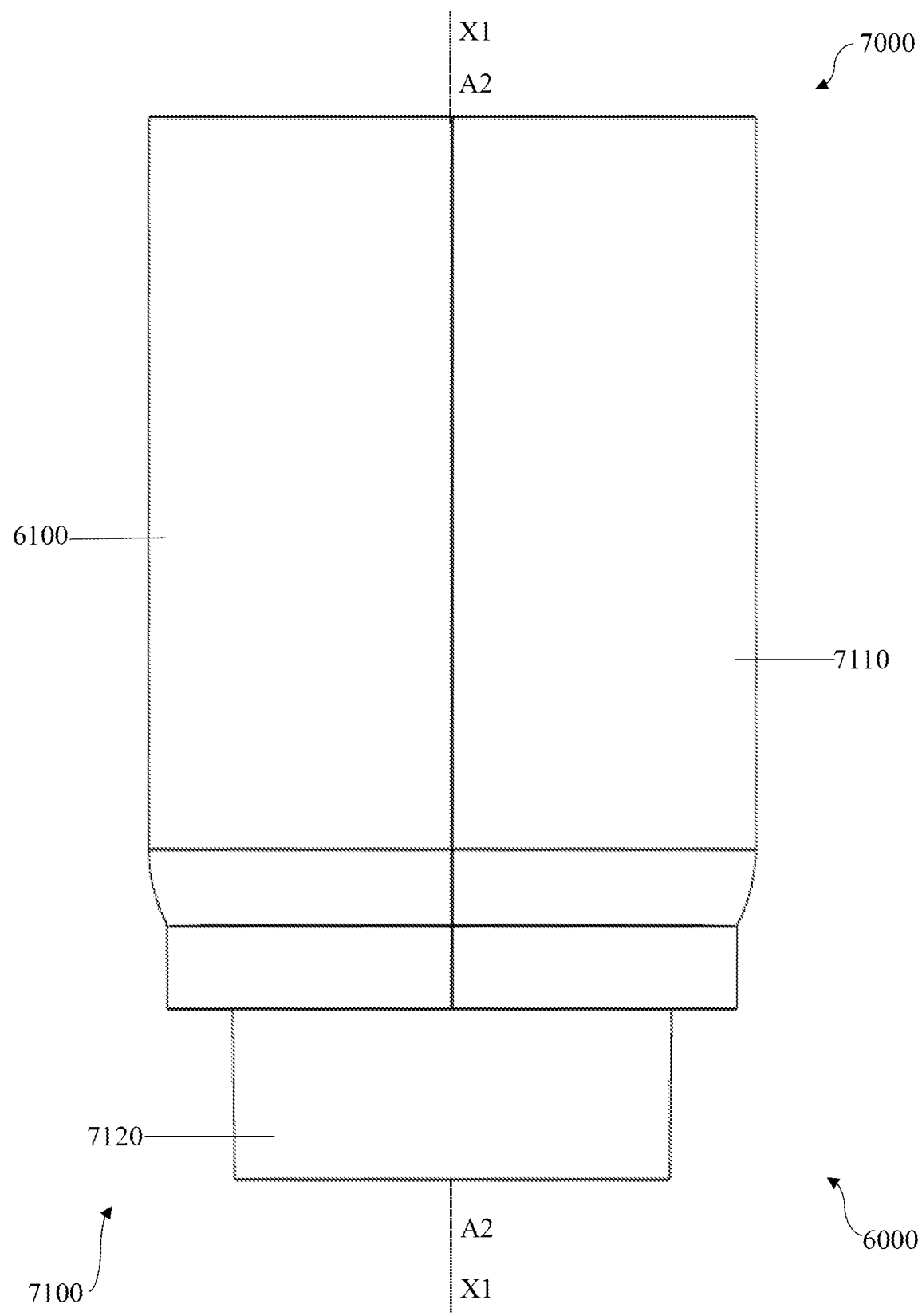

FIG. 10 shows a top view of the connection member of FIG. 7.

Figure 11:
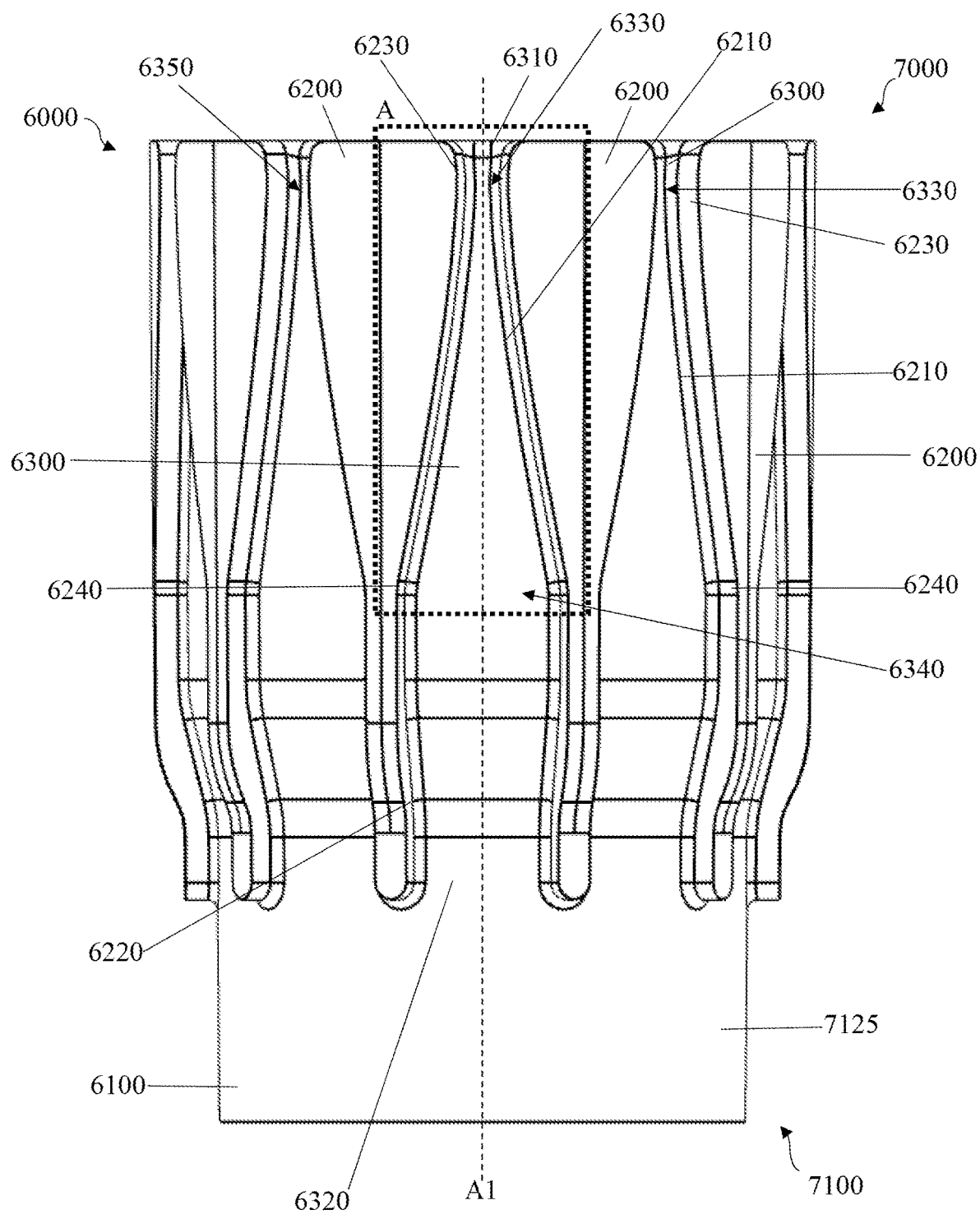

FIG. 11 shows a top view of part of the connection member of FIG. 7.

Figure 12:
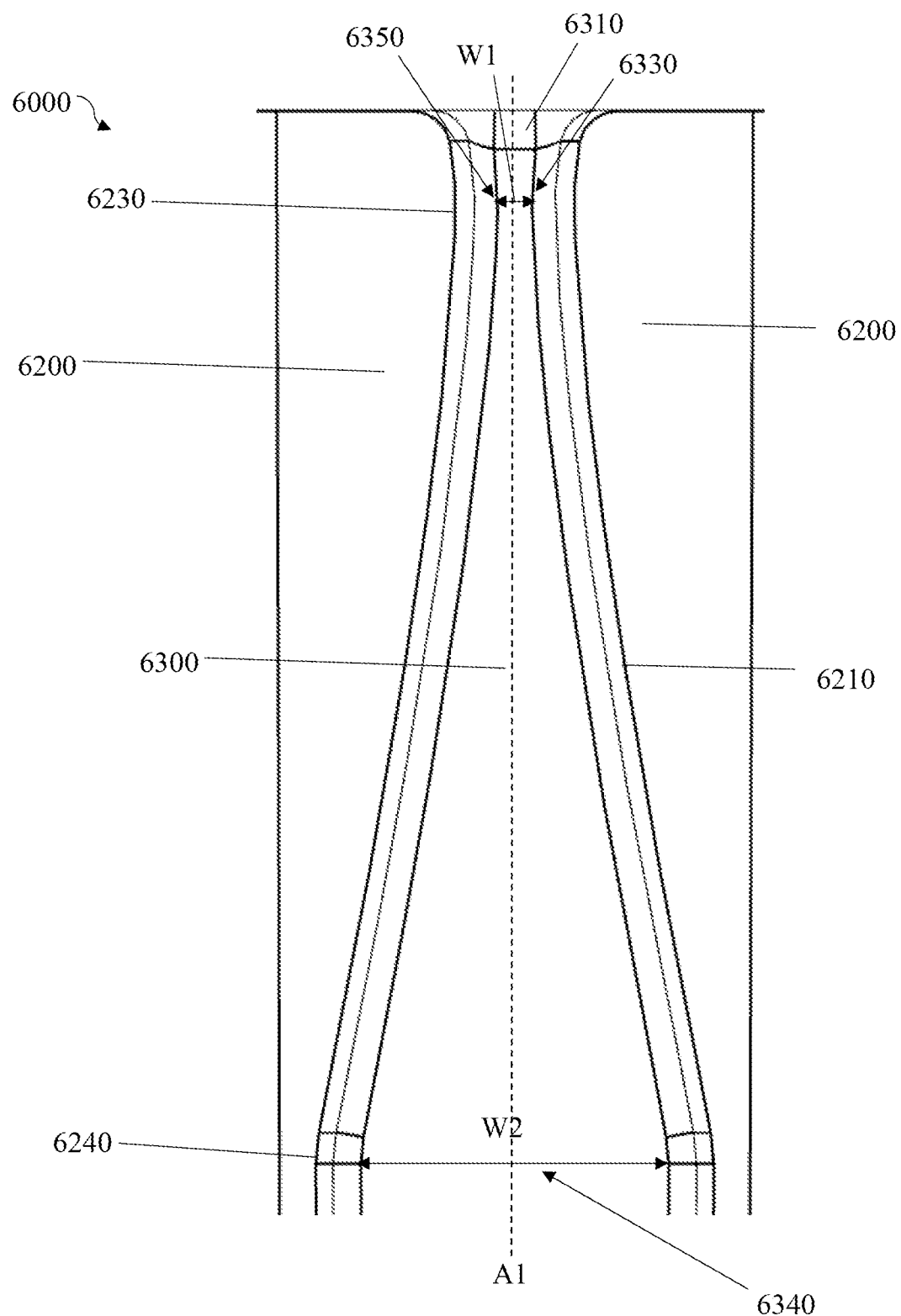

FIG. 12 shows an enlarged view of region A of the connection member of FIG. 11.

Figure 13:
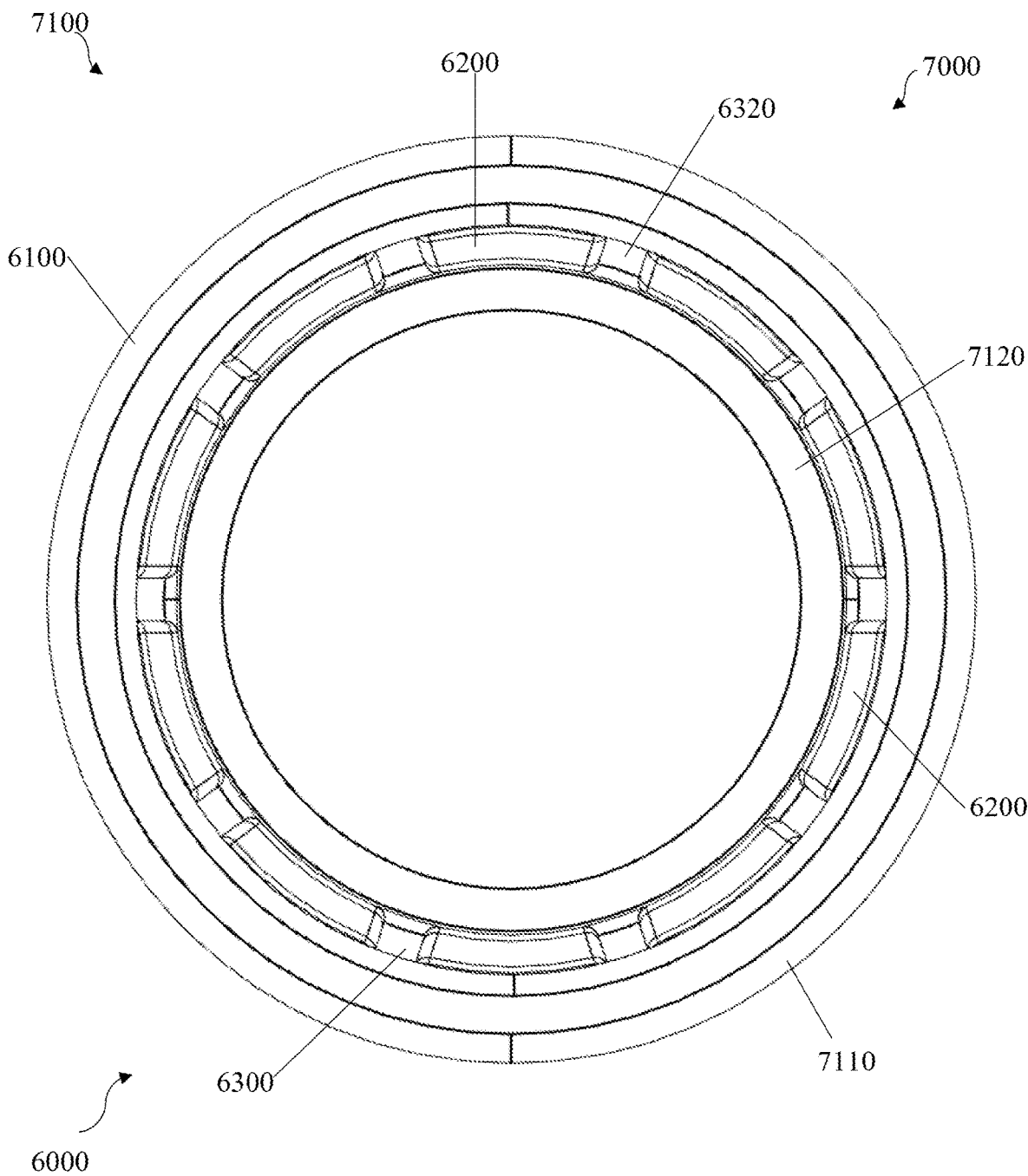

FIG. 13 shows a left side view of the connection member of FIG. 7.

Figure 14:
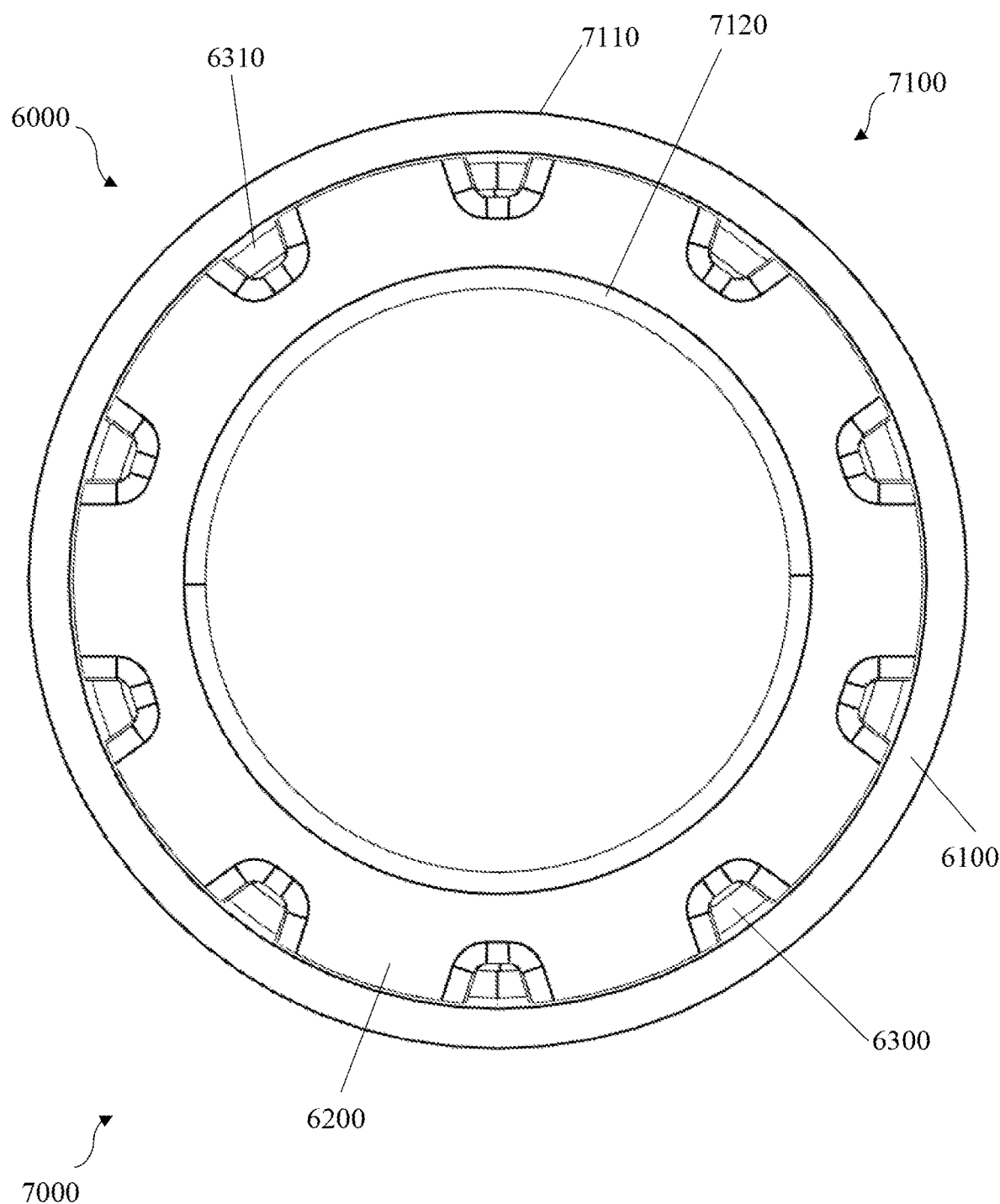

FIG. 14 shows a right side view of the connection member of FIG. 7.

Figure 15:
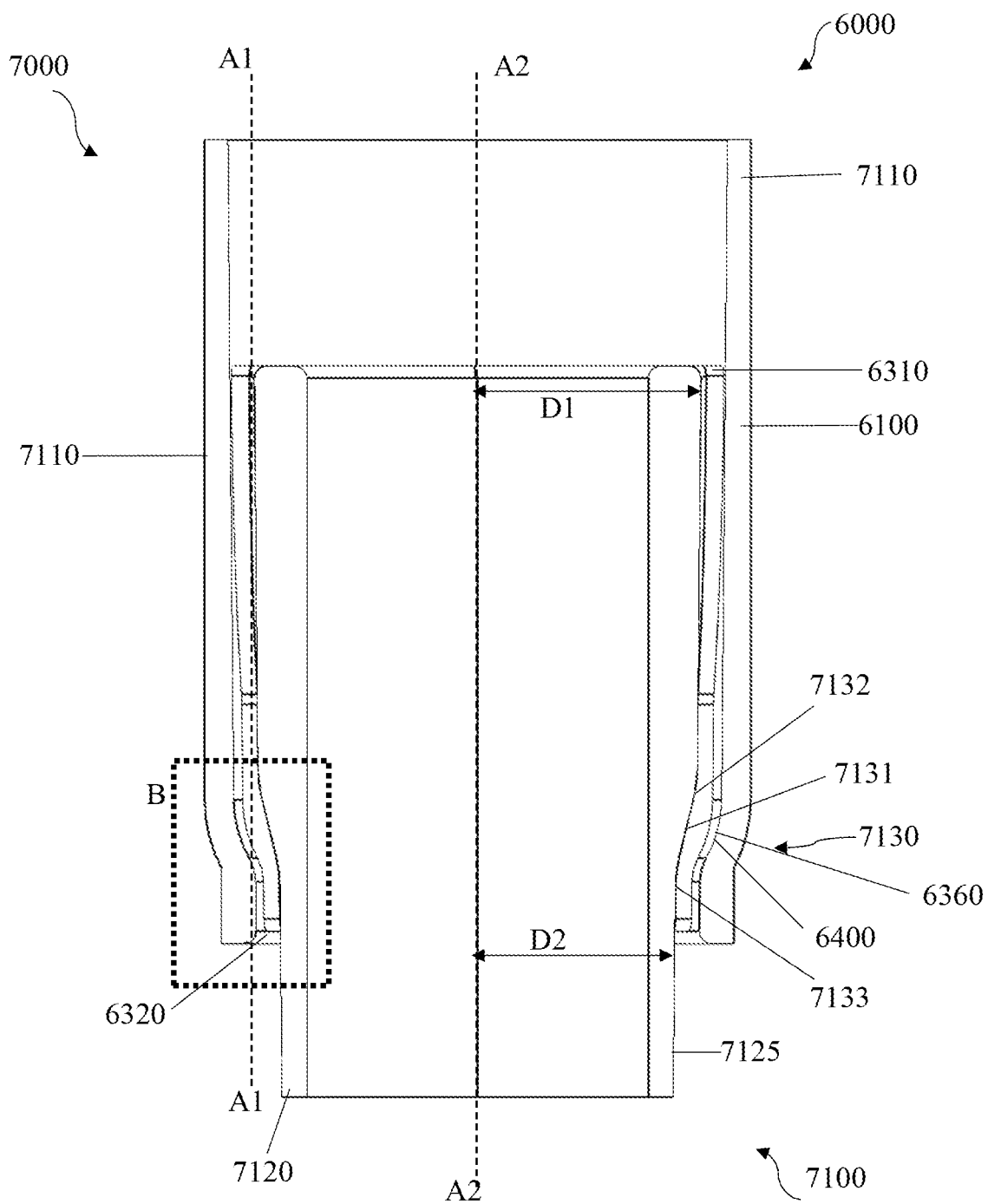

FIG. 15 shows a cross-sectional view along the plane X1-X1 of FIG. 10.

Figure 16:
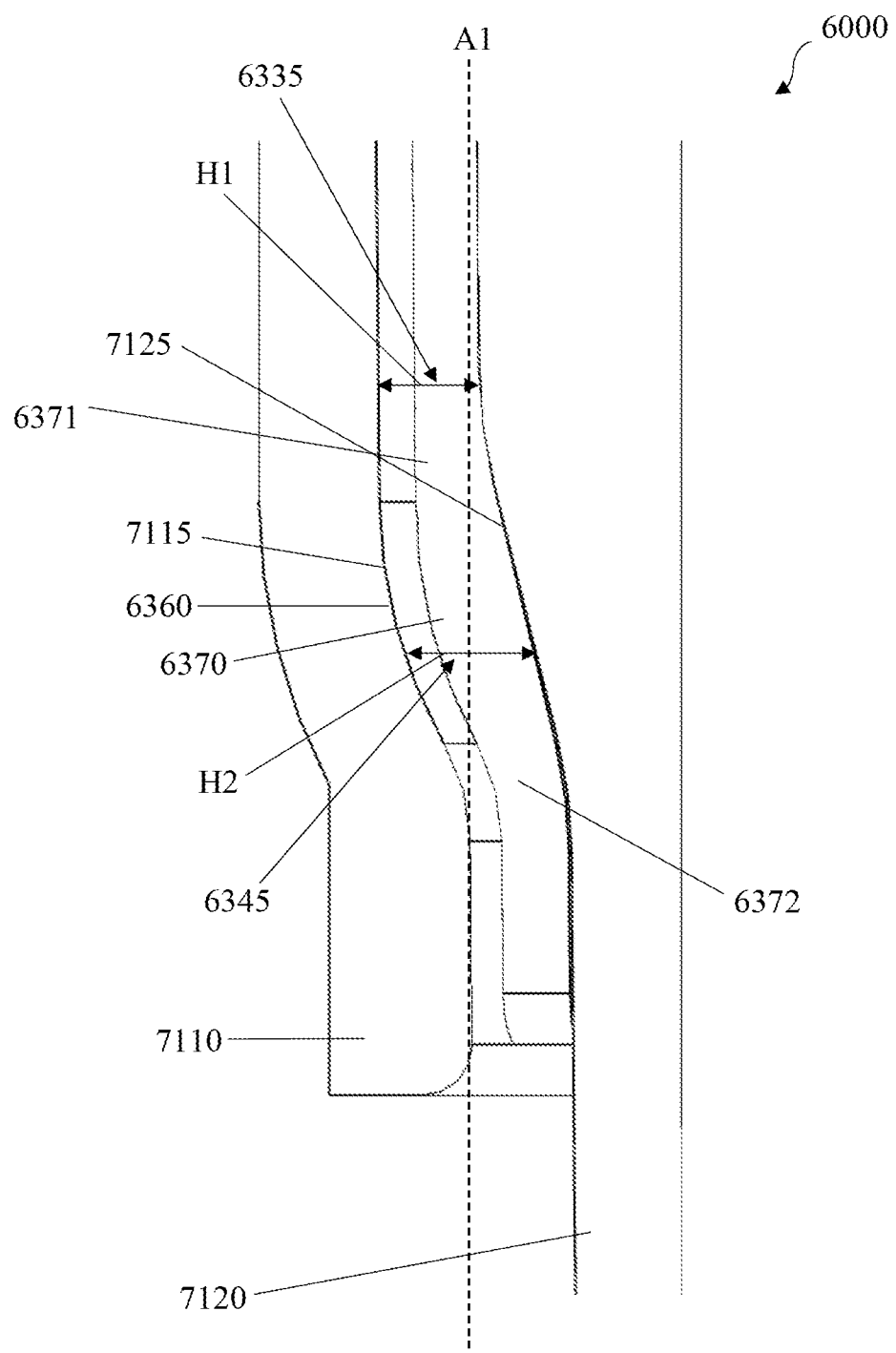

FIG. 16 shows an enlarged view of region B of the connection member of FIG. 15.

Figure 17:
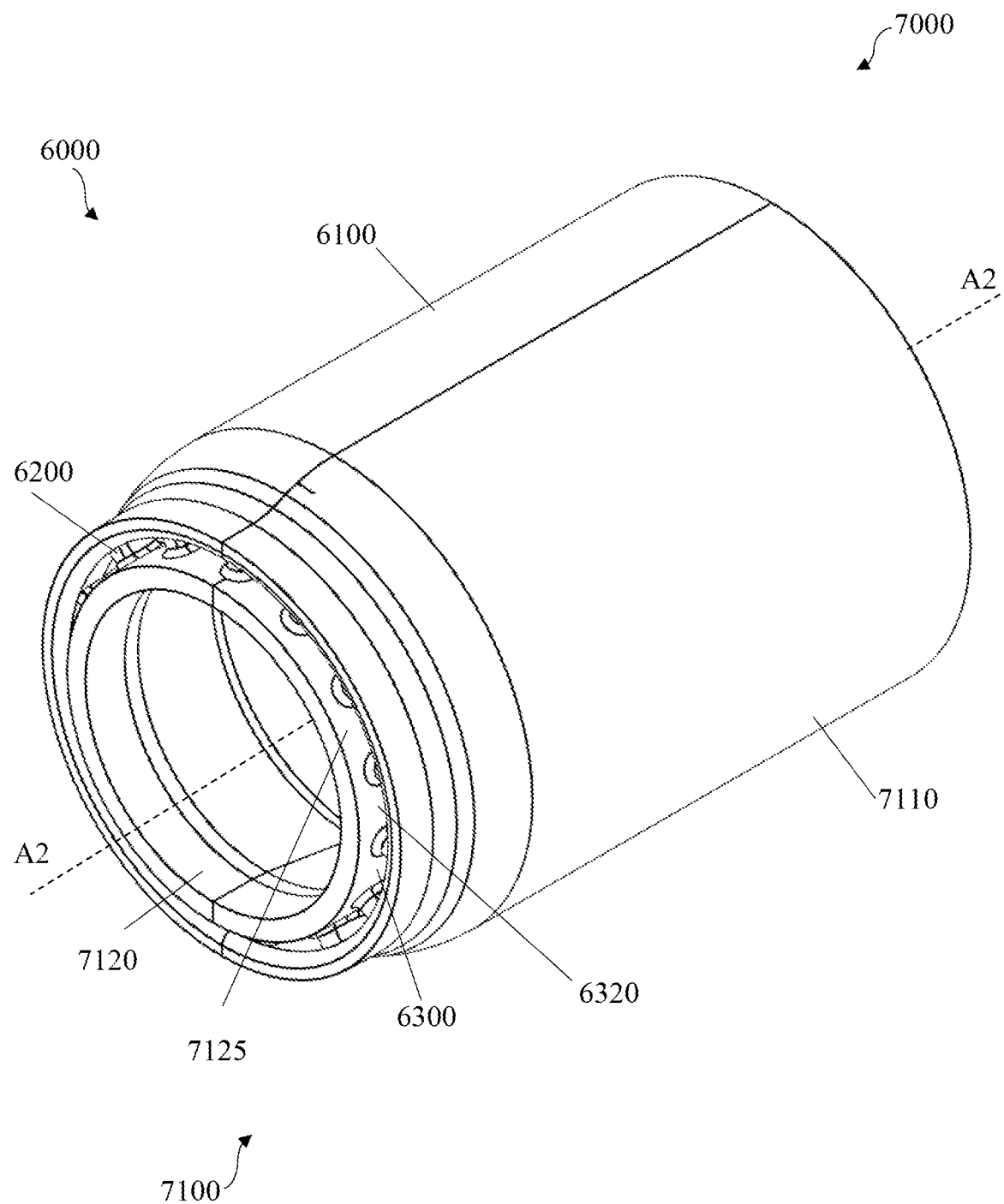

FIG. 17 shows a perspective view of a connection member according to another form of the present technology.

Figure 18:
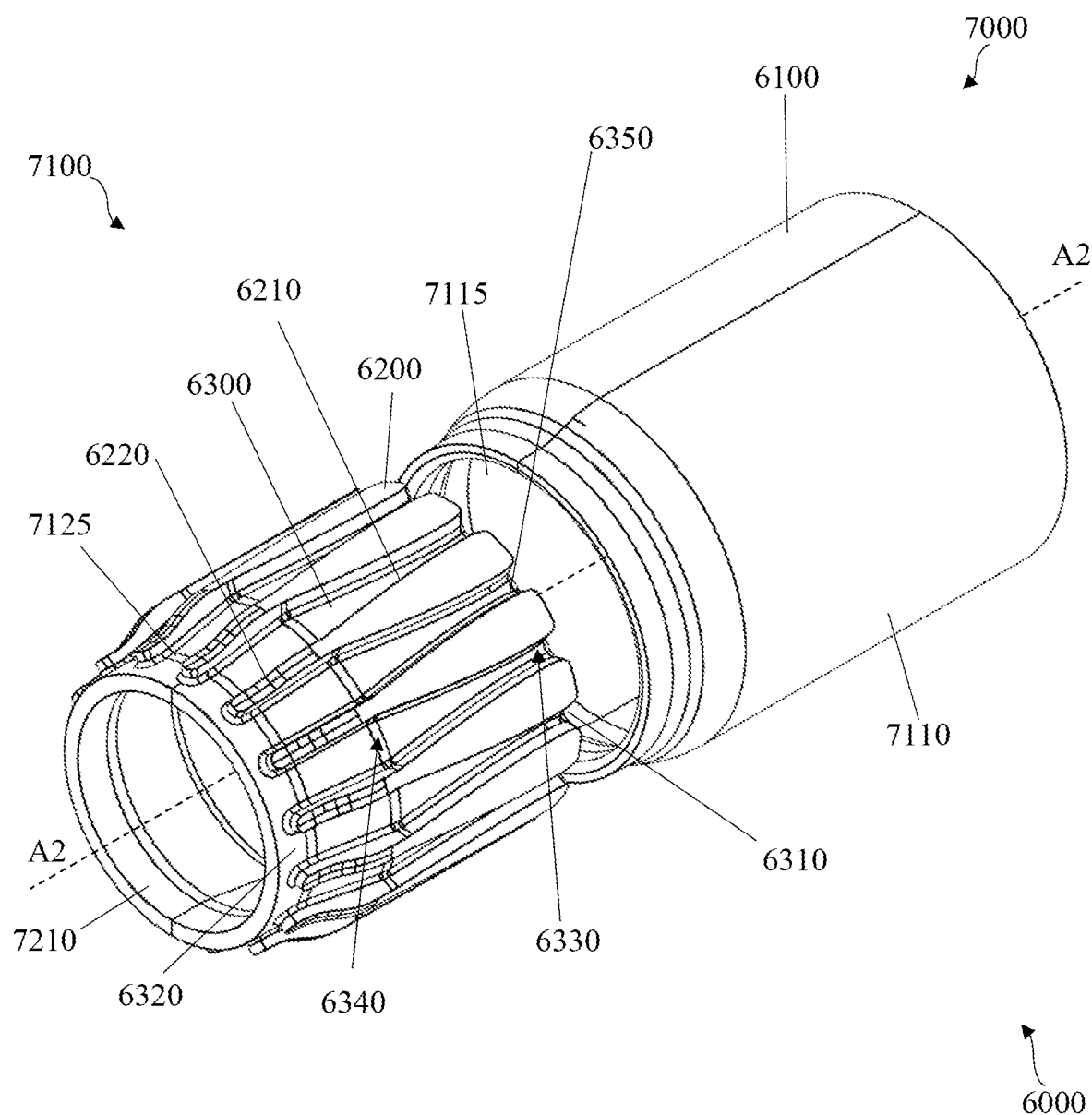

FIG. 18 shows an exploded perspective view of the connection member of FIG. 17.

Figure 19:
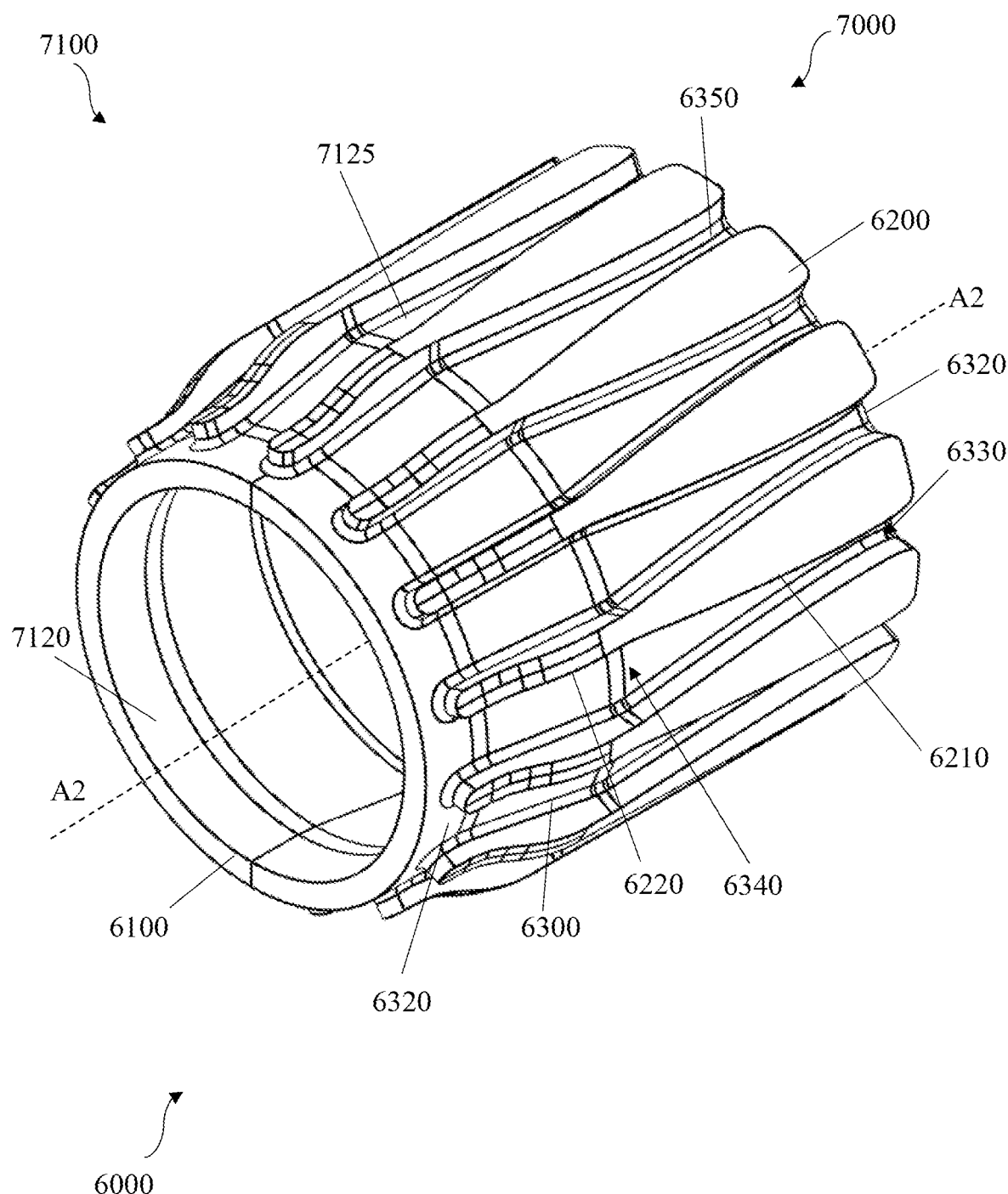

FIG. 19 shows a perspective view of part of the connection member of FIG. 17.

Figure 20:
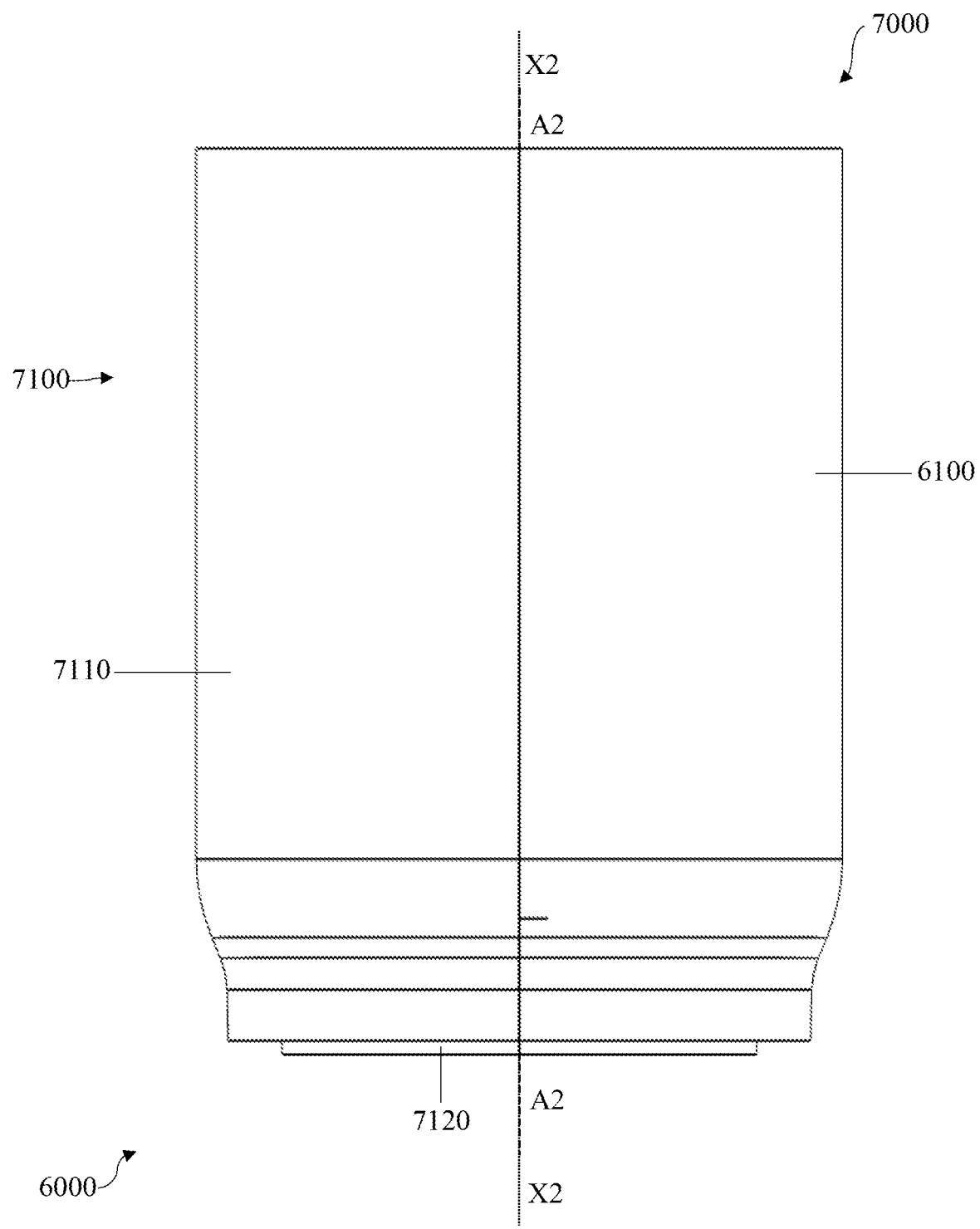

FIG. 20 shows a top view of the connection member of FIG. 17.

Figure 21:
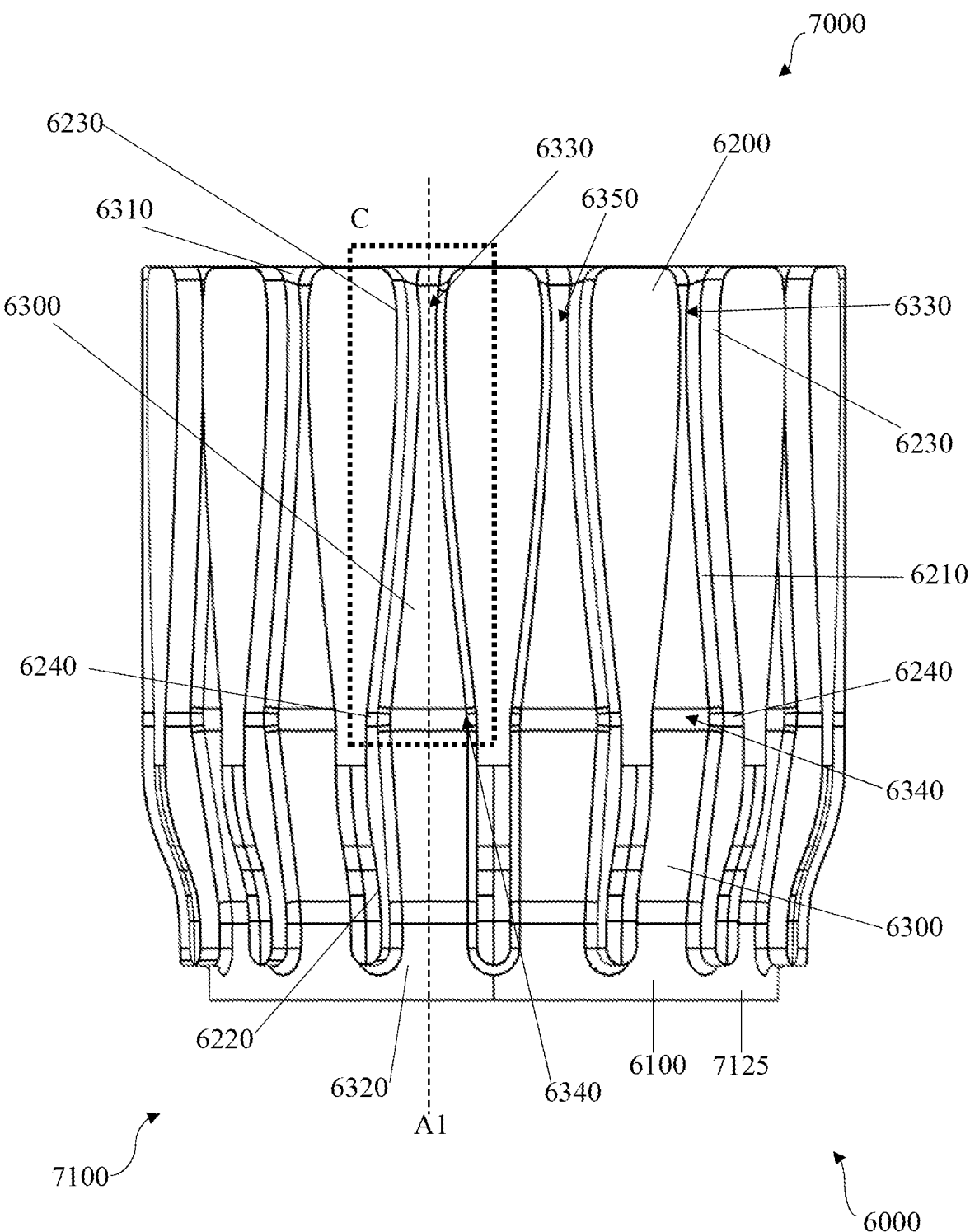

FIG. 21 shows a top view of part of the connection member of FIG. 17.

Figure 22:
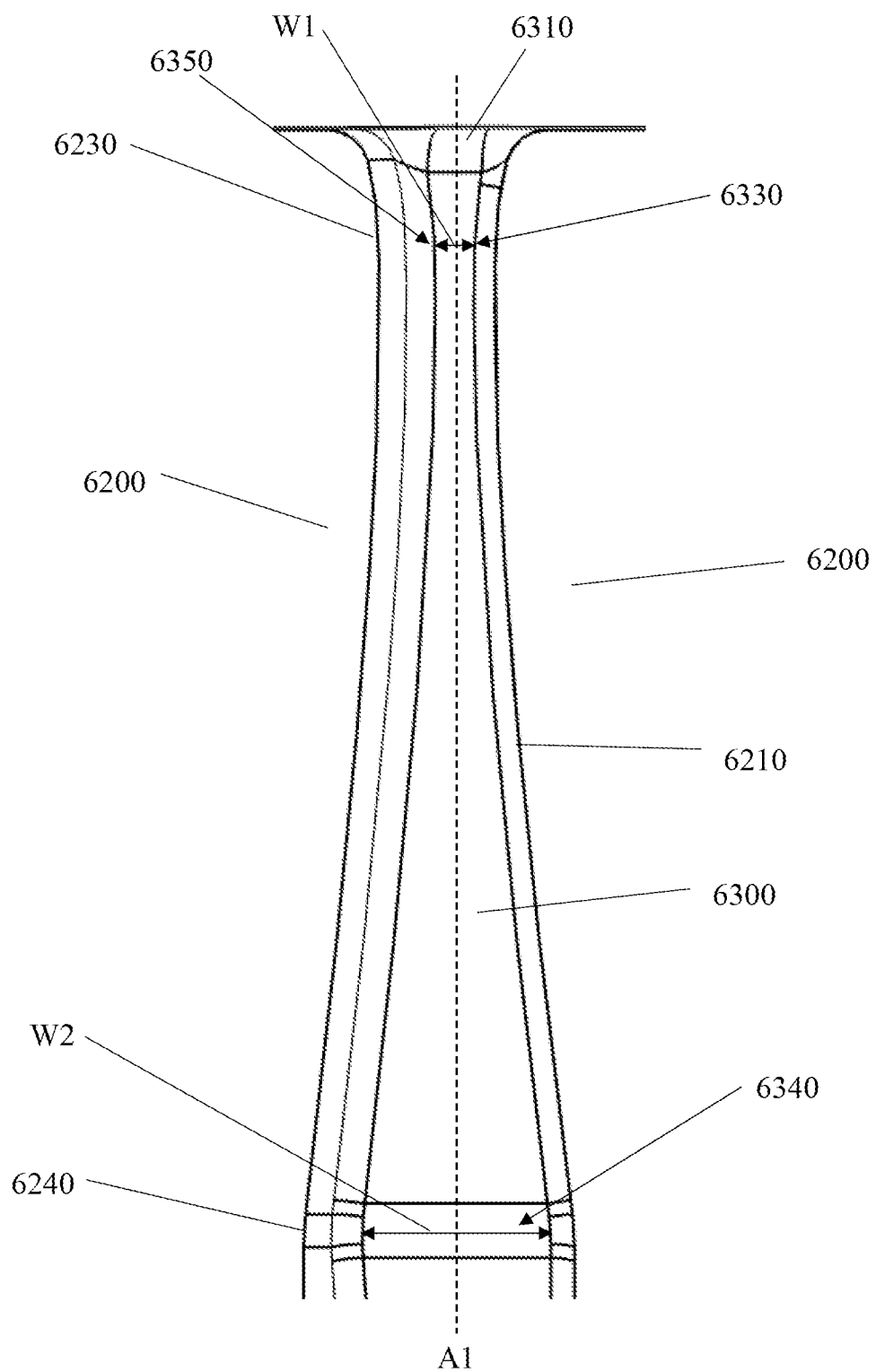

FIG. 22 shows an enlarged view of region C of the connection member of FIG. 21.

Figure 23:
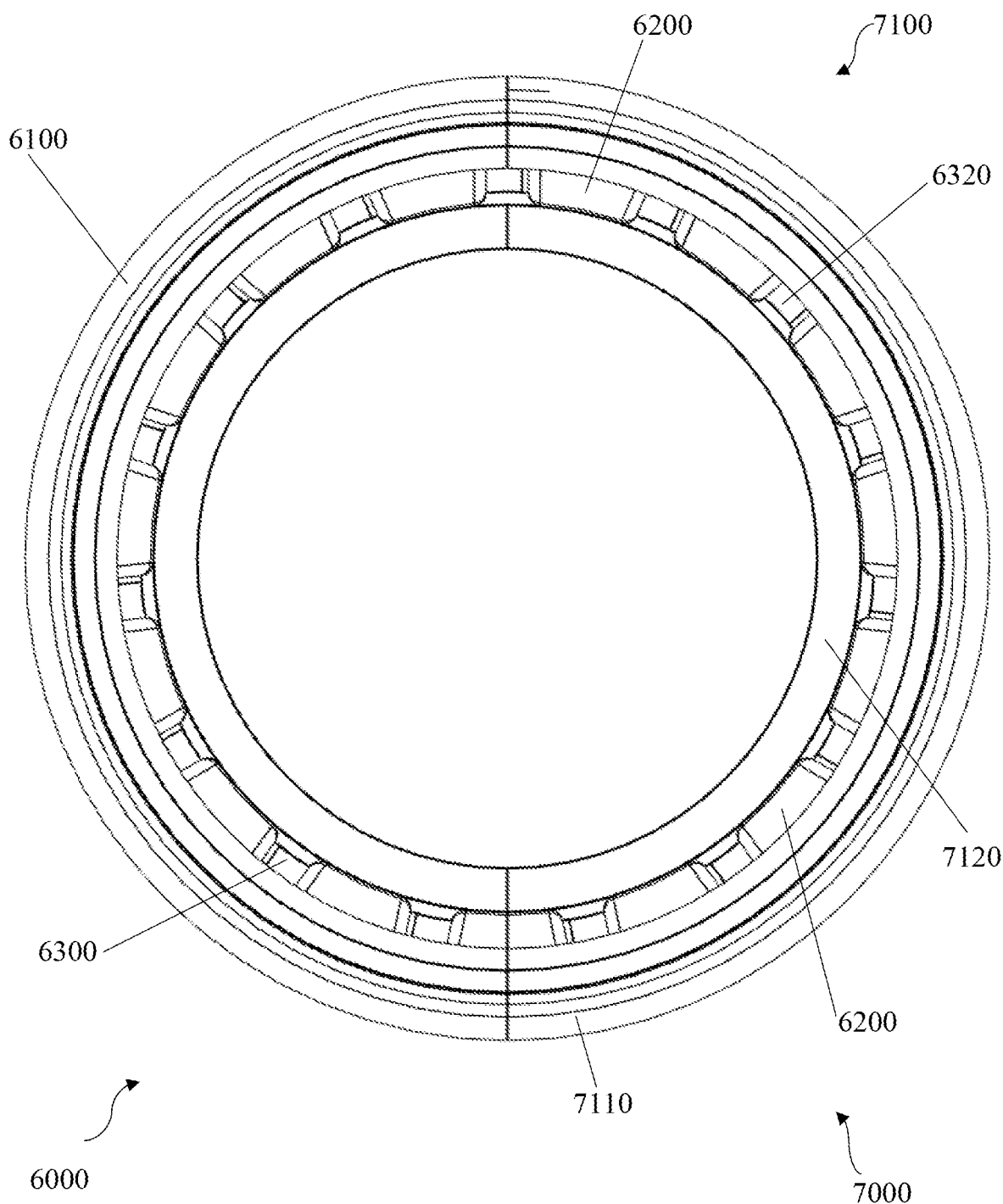

FIG. 23 shows a left side view of the connection member of FIG. 17.

Figure 24:
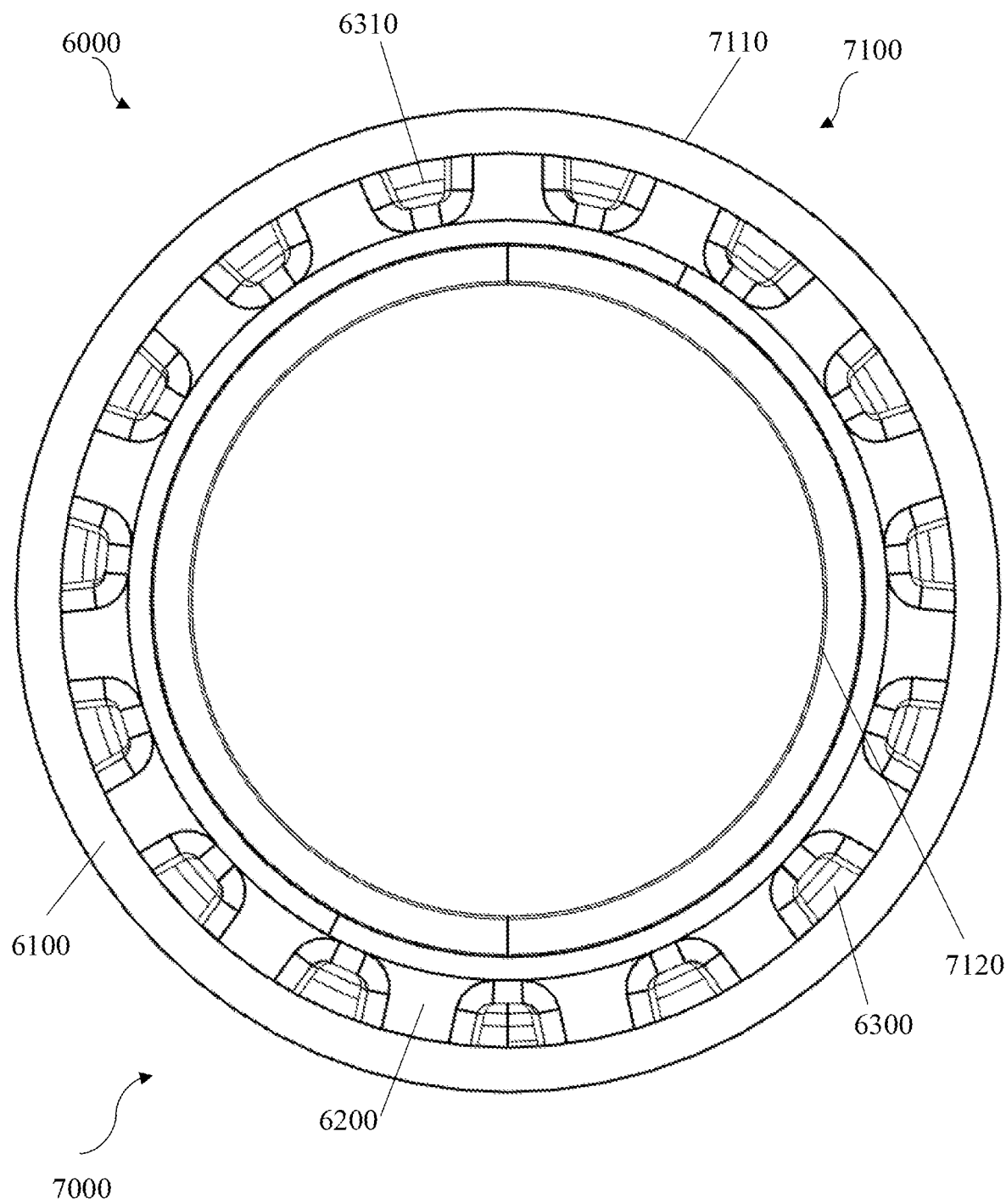

FIG. 24 shows a right side view of the connection member of FIG. 17.

Figure 25:
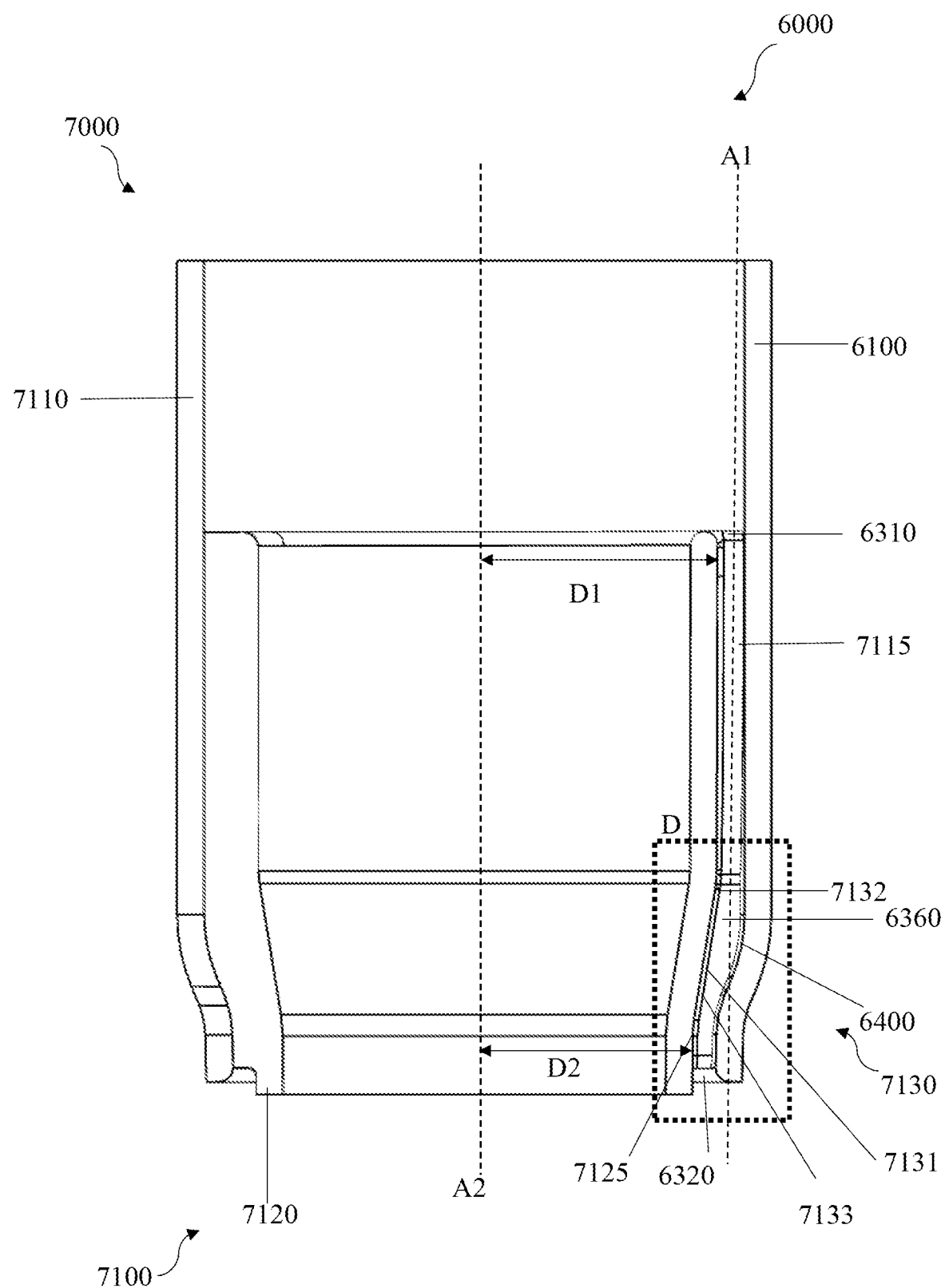

FIG. 25 shows a cross-sectional view along the plane X2-X2 of FIG. 20.

Figure 26:
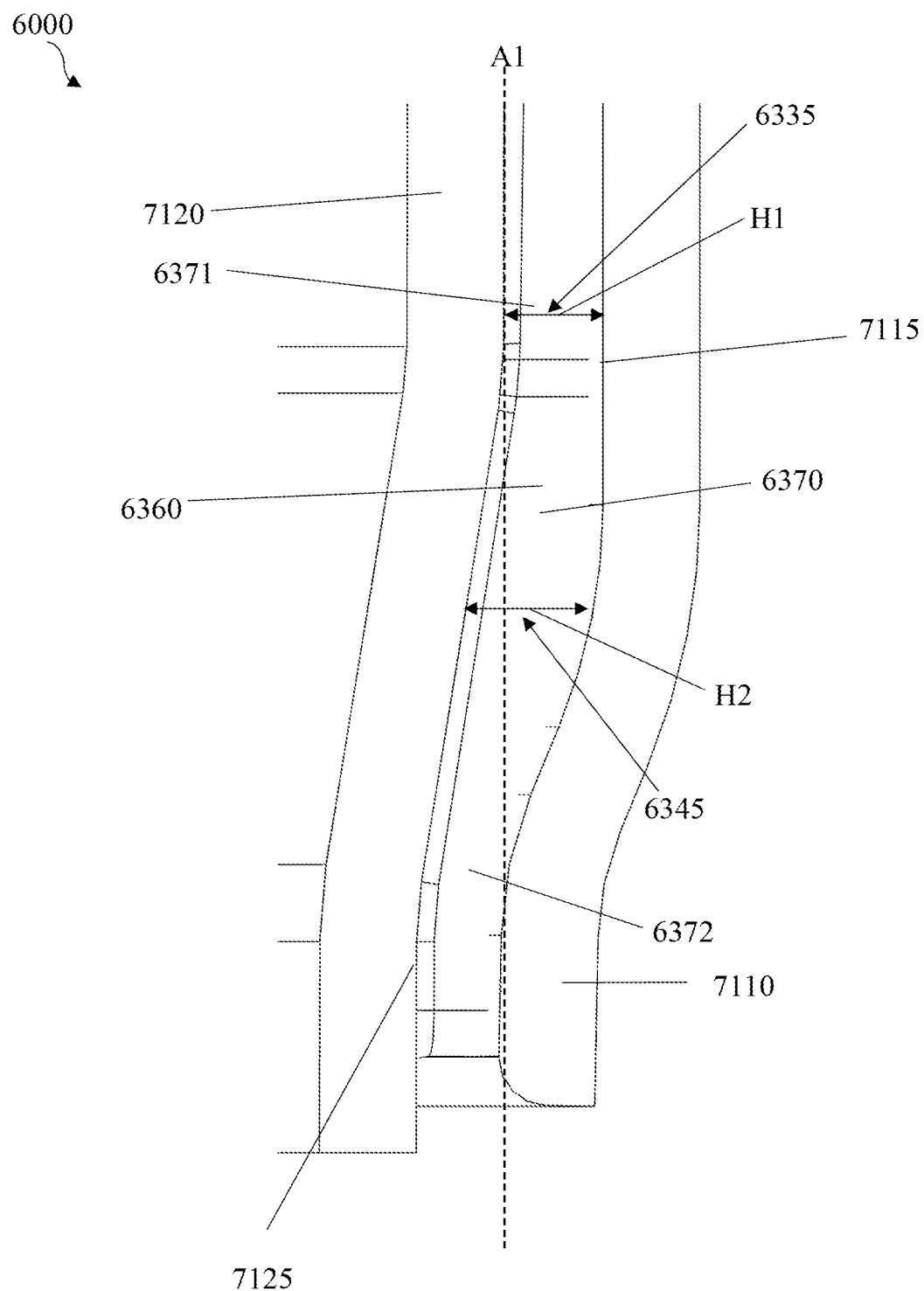
Figure 27:
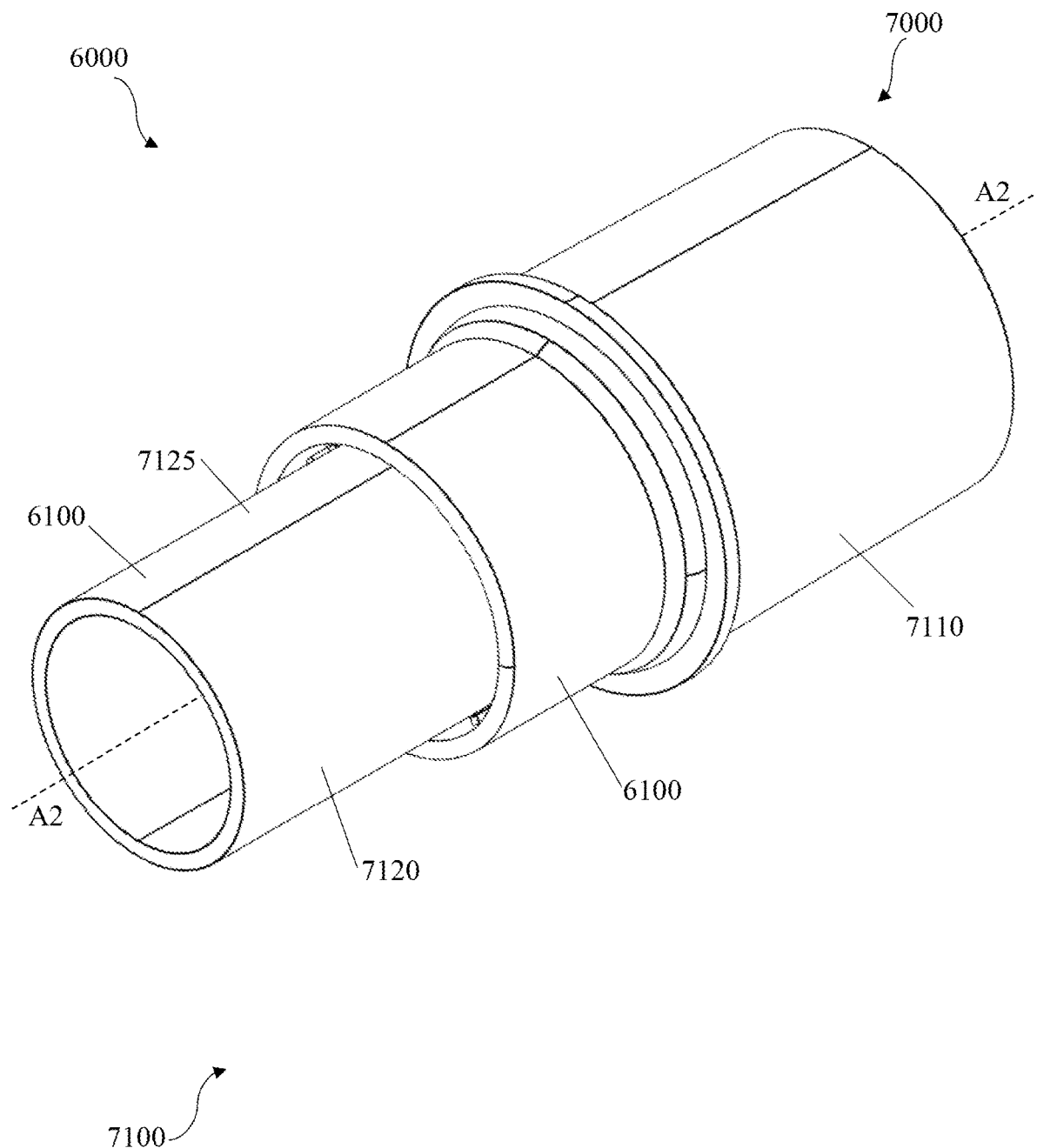

FIG. 26 shows an enlarged view of region D of the connection member of FIG. 27.

FIG. 27 shows a perspective view of a connection member according to another form of the present technology.

Figure 28:
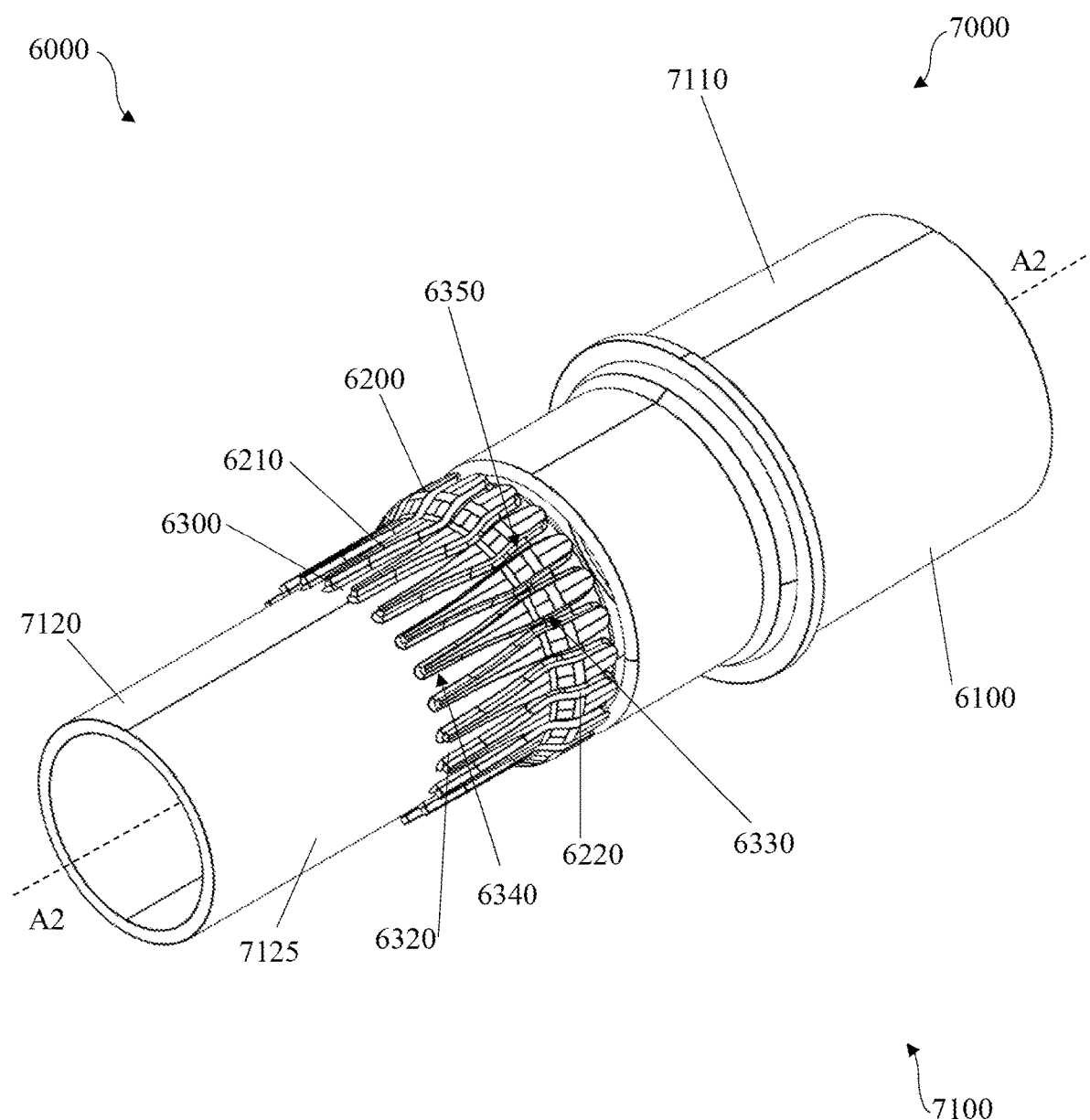

FIG. 28 shows an exploded perspective view of the connection member of FIG. 27.

Figure 29:
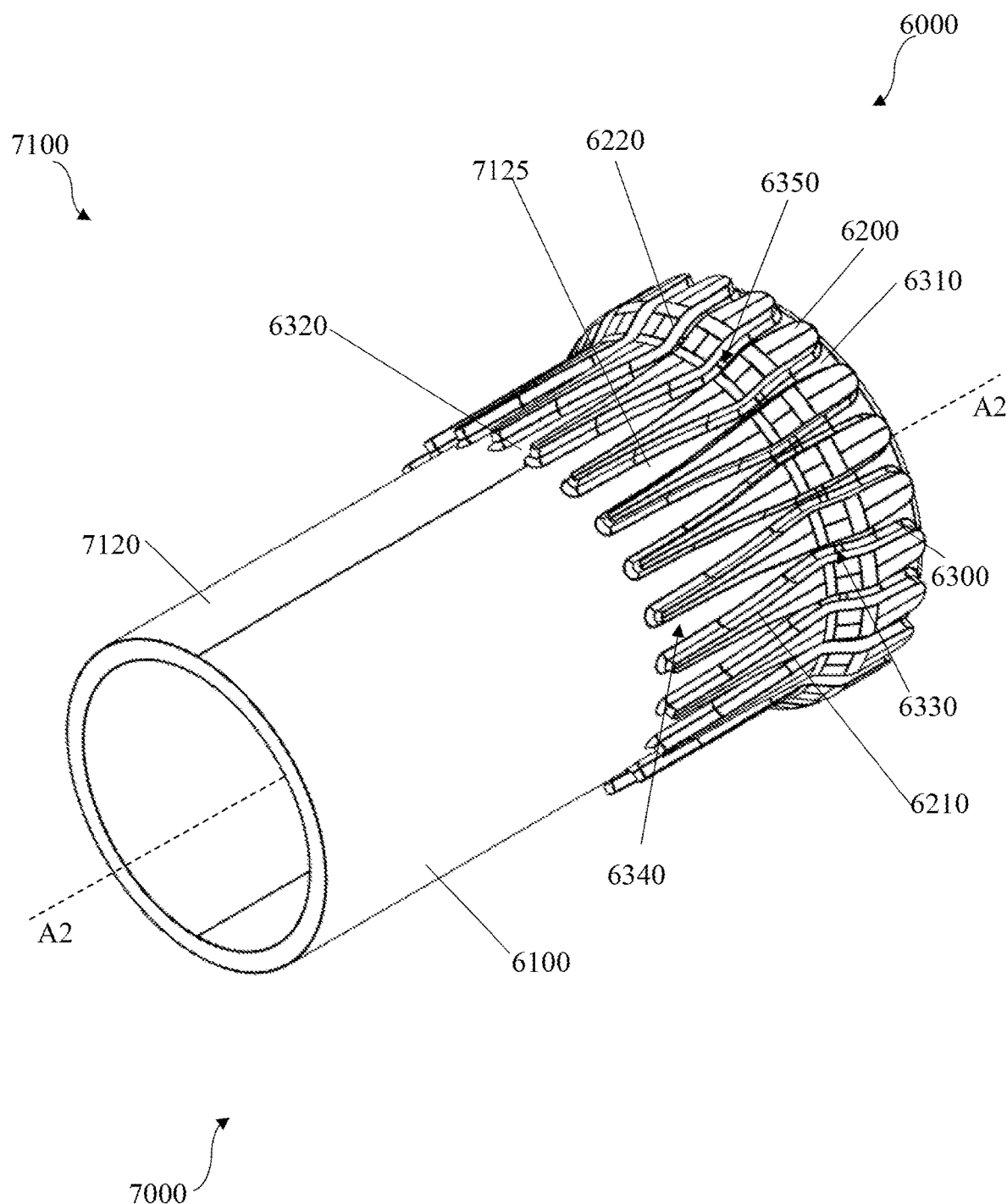

FIG. 29 shows a perspective view of part of the connection member of FIG. 27.

Figure 30:
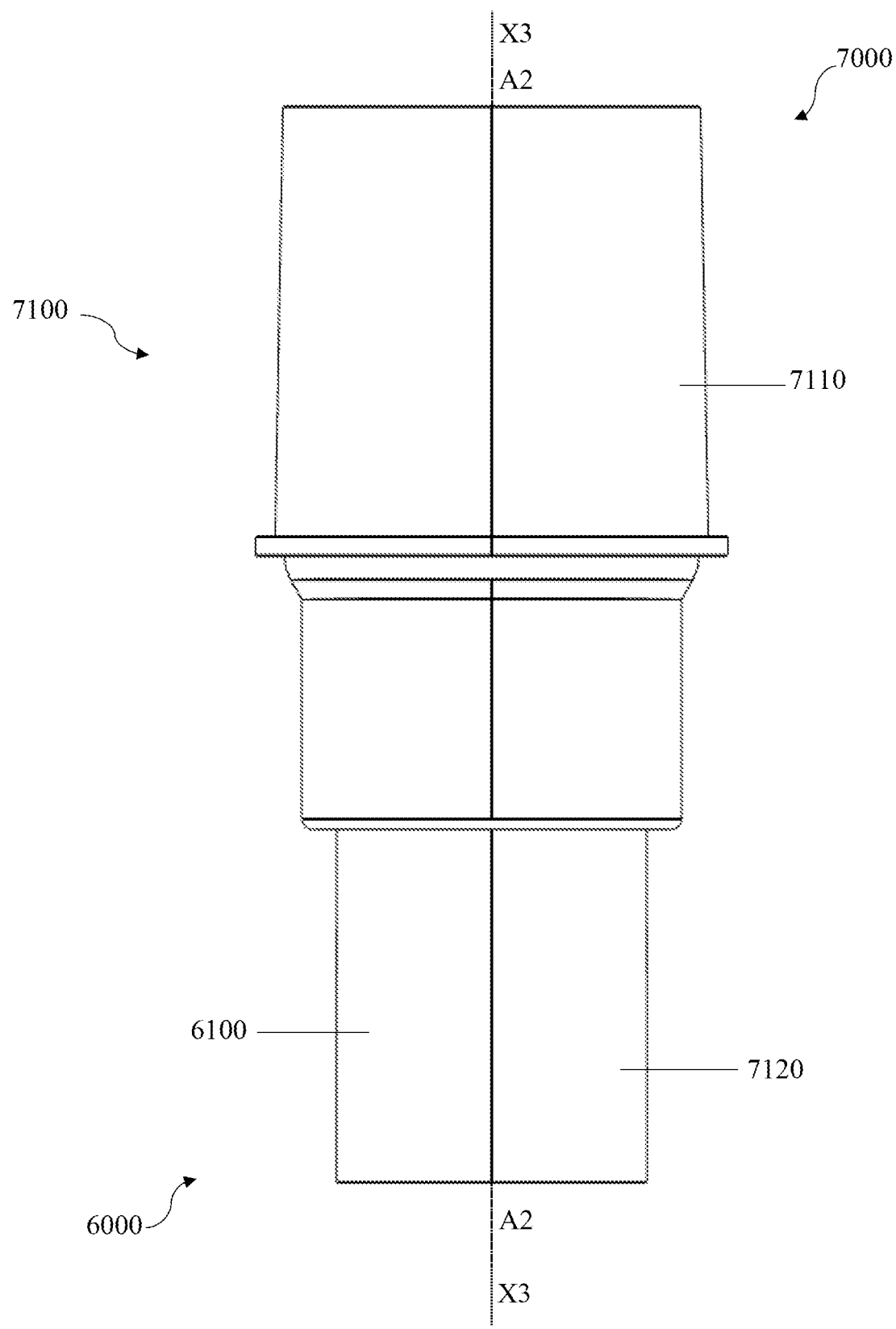

FIG. 30 shows a top view of the connection member of FIG. 27.

Figure 31:
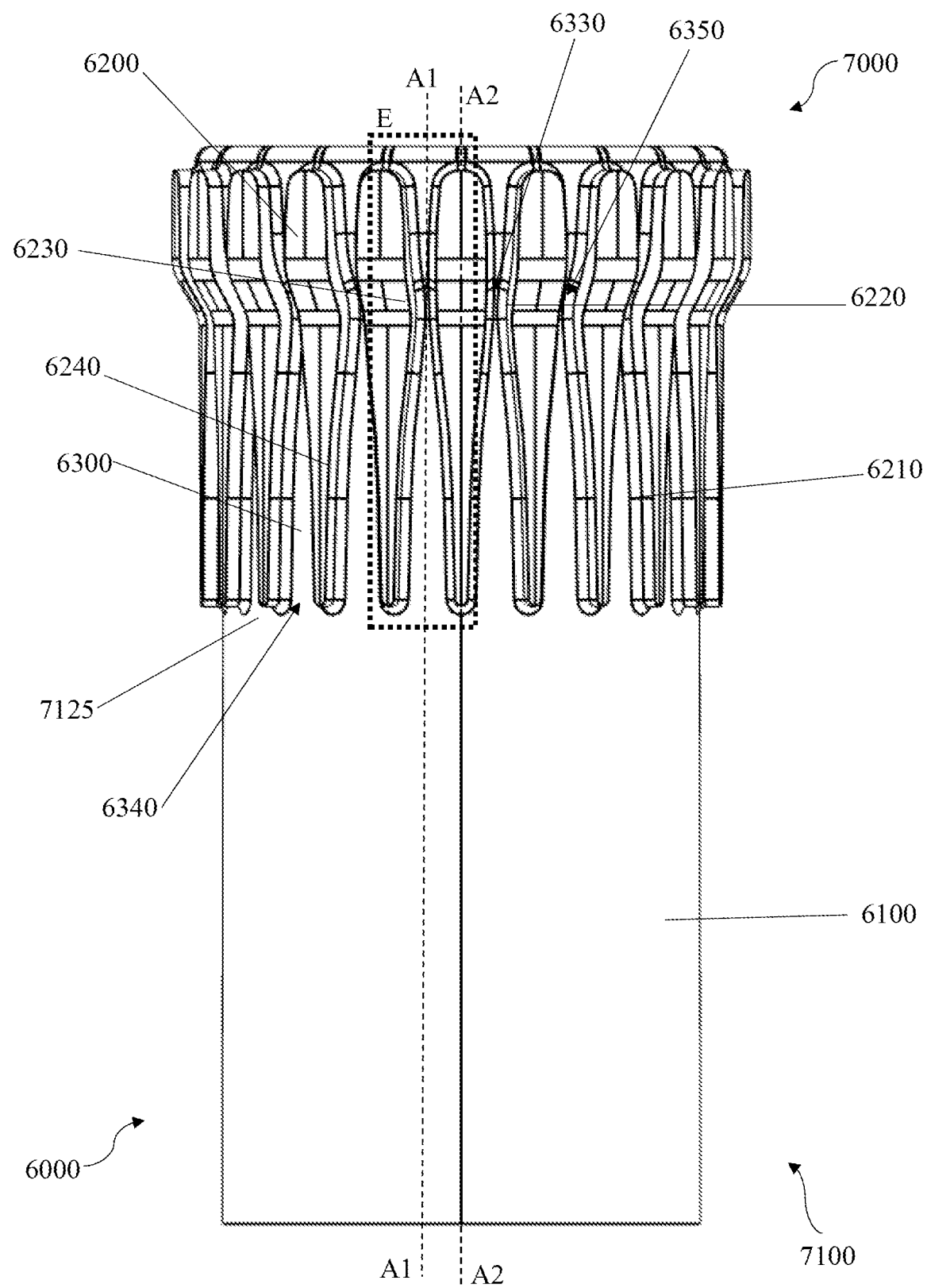

FIG. 31 shows a top view of the connection member of FIG. 27 without the outer tube portion.

Figure 32:
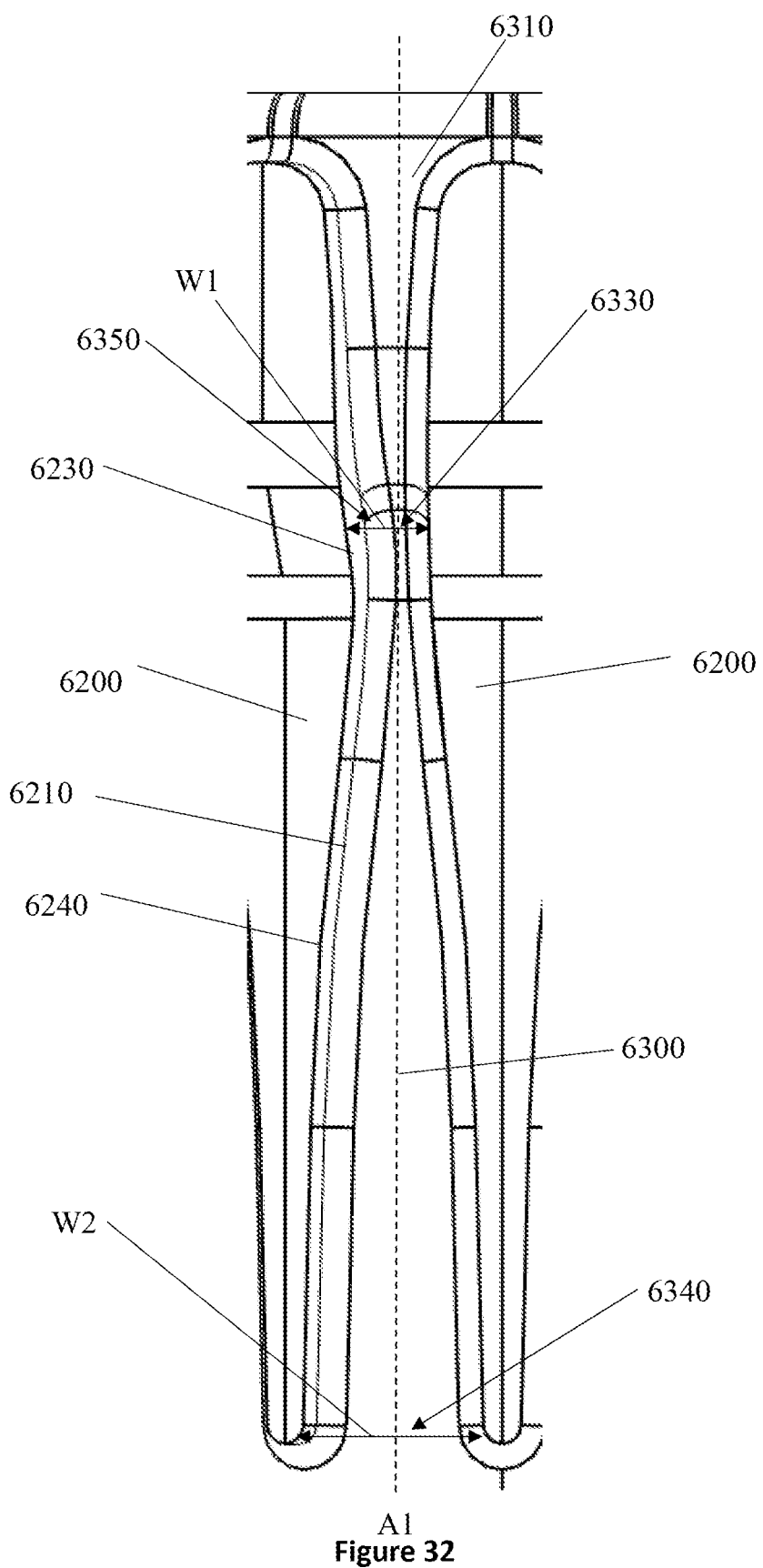

FIG. 32 shows an enlarged view of region E of the connection member of FIG. 31.

Figure 33:
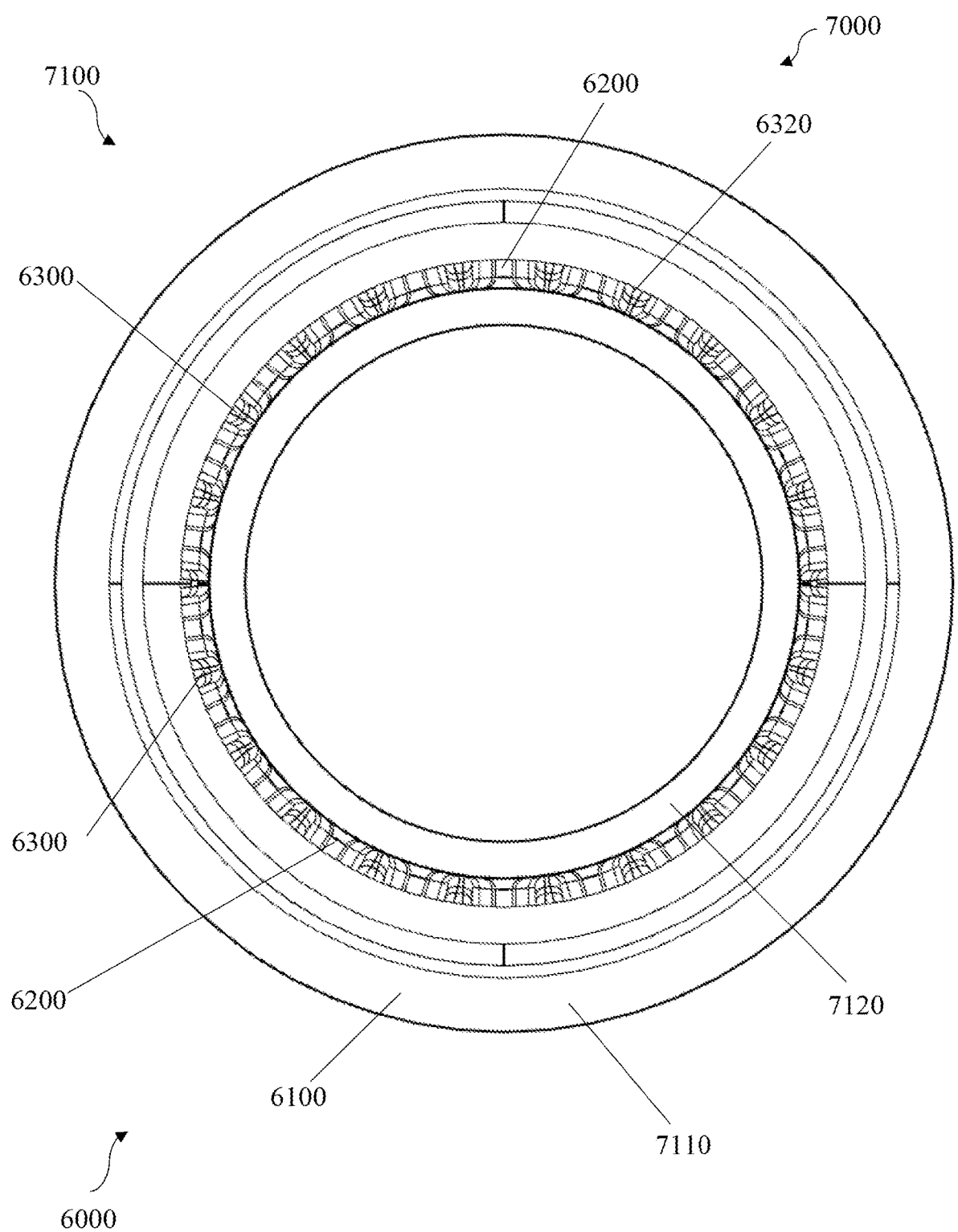

FIG. 33 shows a left side view of the connection member of FIG. 27.

Figure 34:
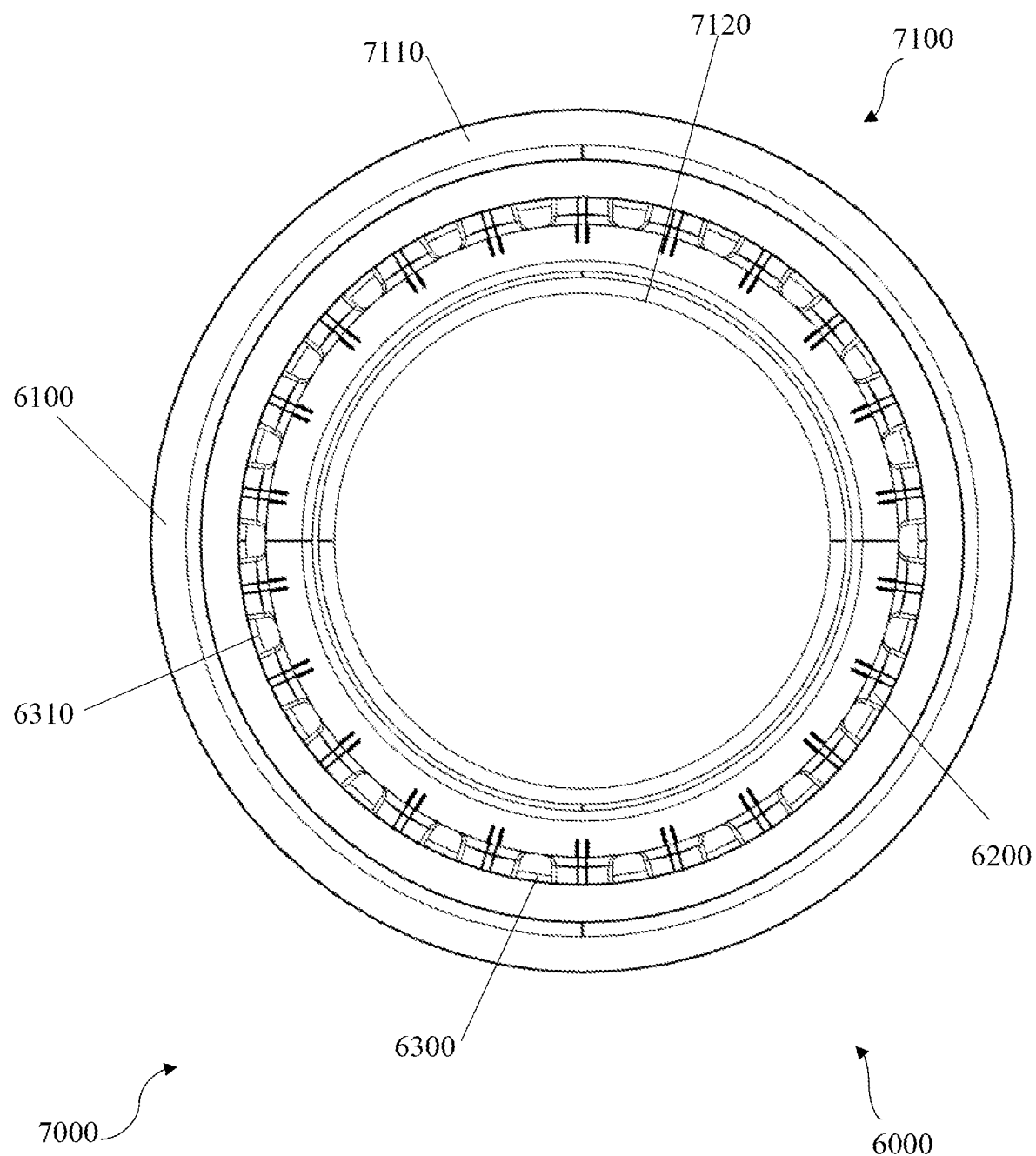

FIG. 34 shows a right side view of the connection member of FIG. 27.

Figure 35:
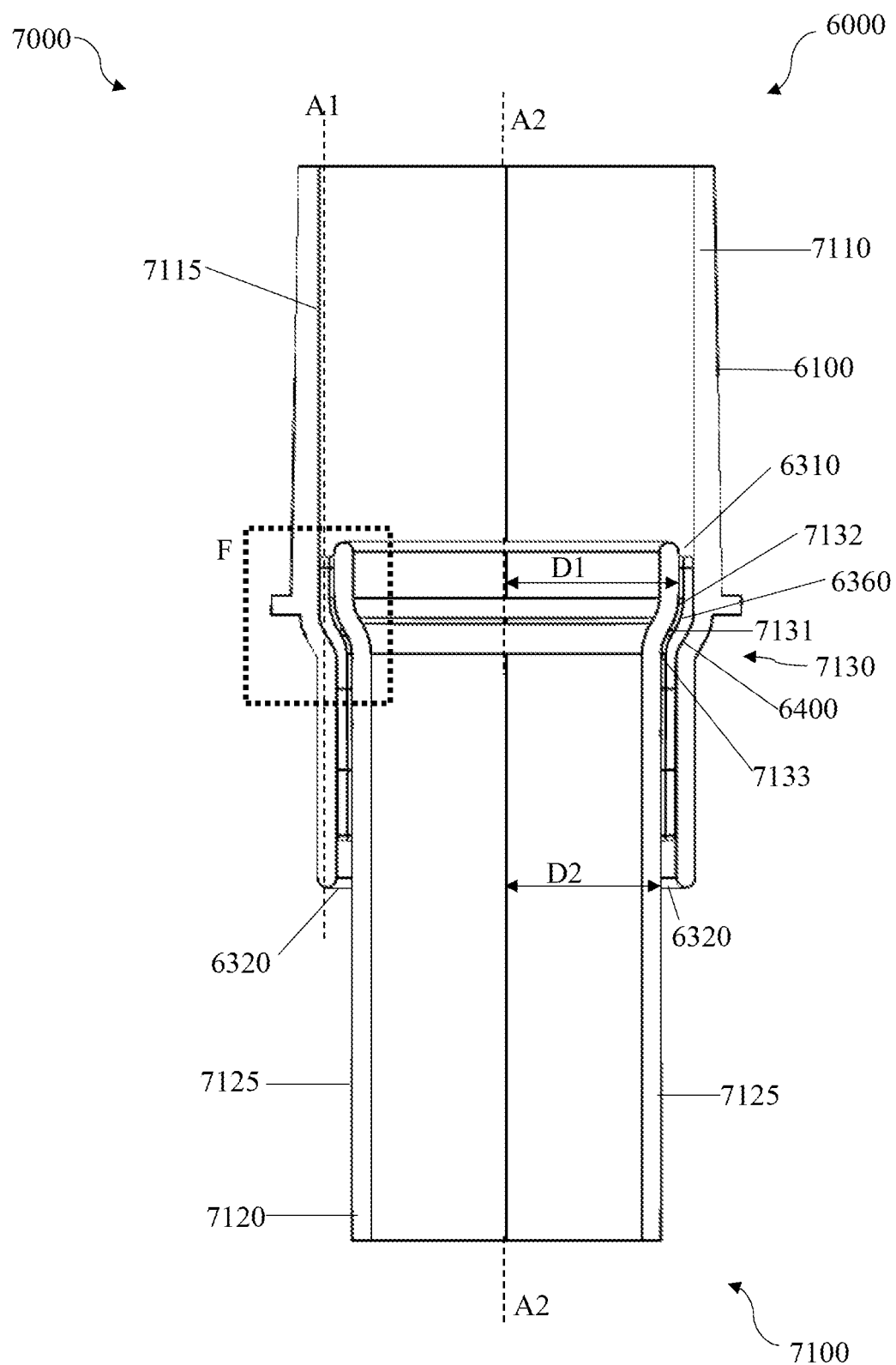

FIG. 35 shows a cross-sectional view along the line X3-X3 of FIG. 30.

Figure 36:
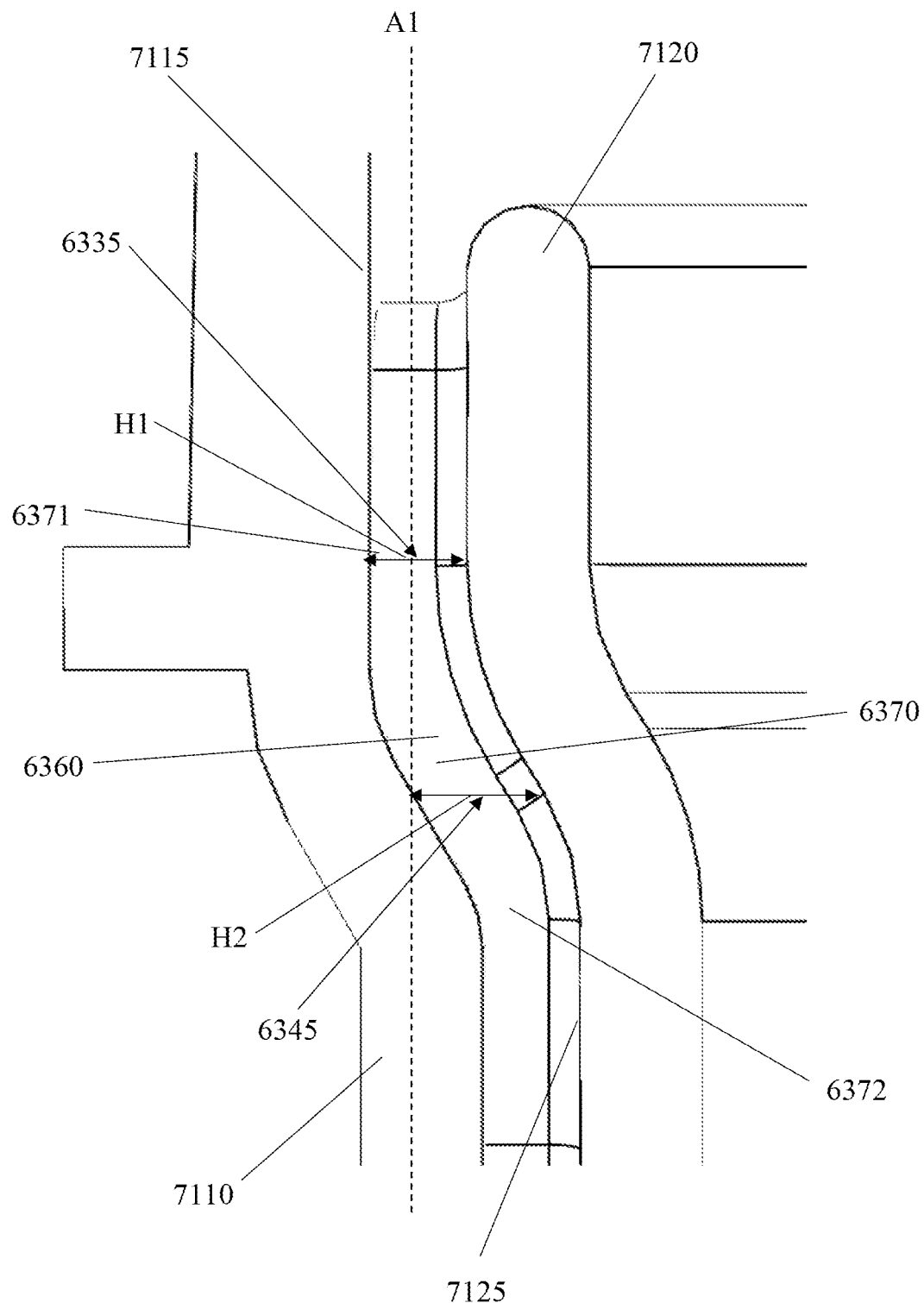

FIG. 36 shows an enlarged view of region F of the connection member of FIG. 35.

Figure 37:
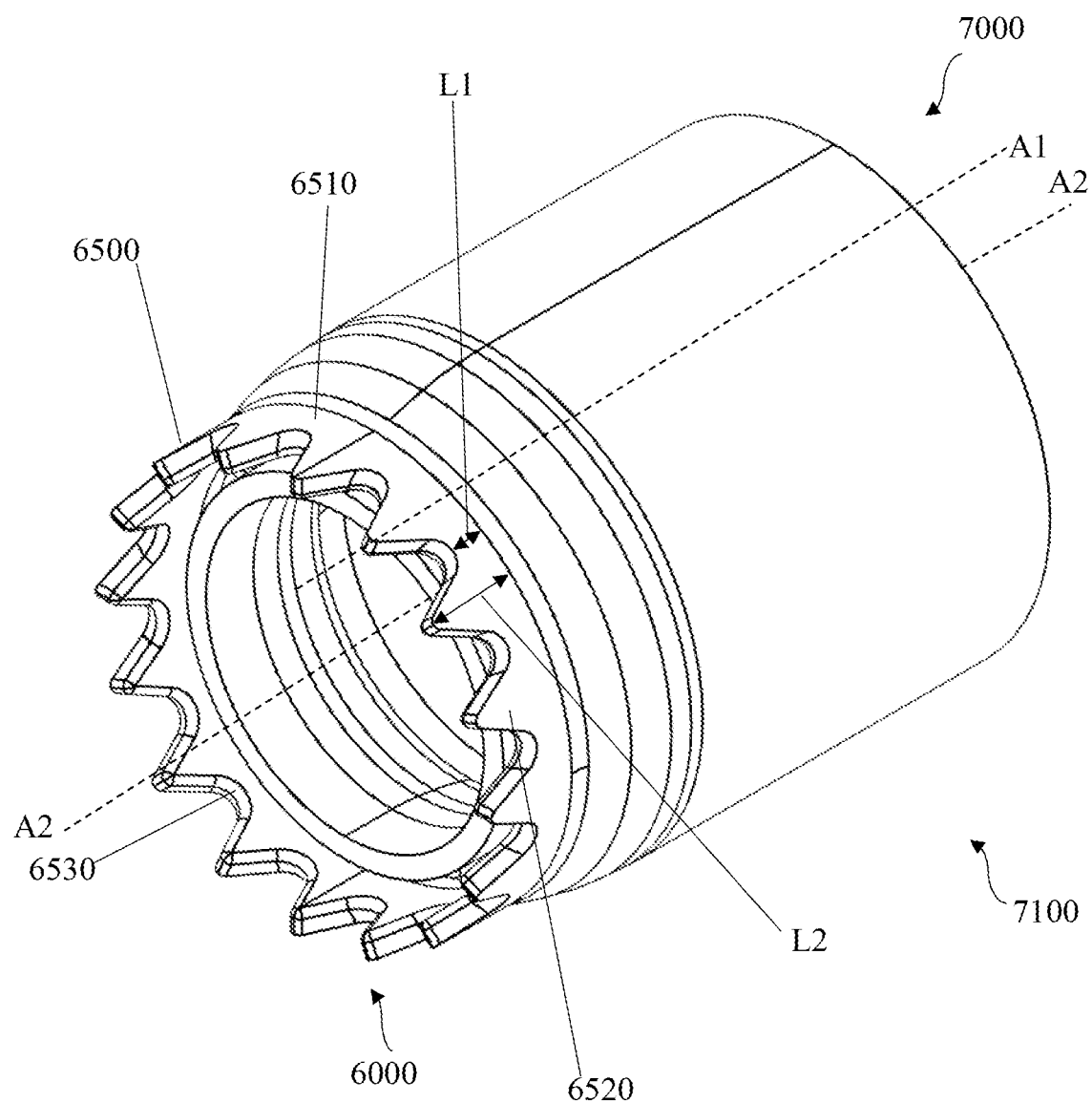

FIG. 37 shows a perspective view of a connection member according to another form of the present technology.

Figure 38:
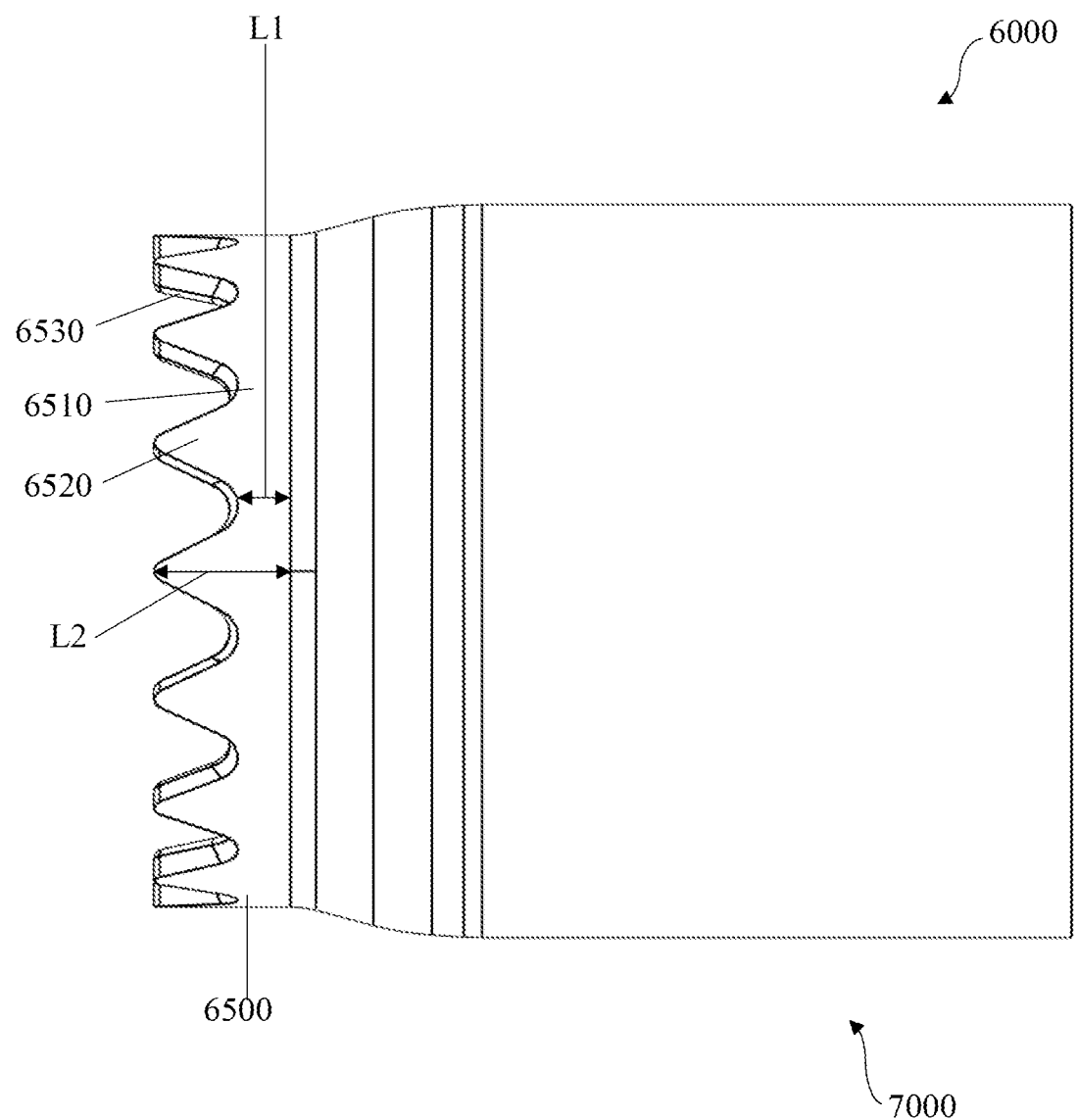

FIG. 38 shows a front view of the connection member of FIG. 37.

Figure 39:
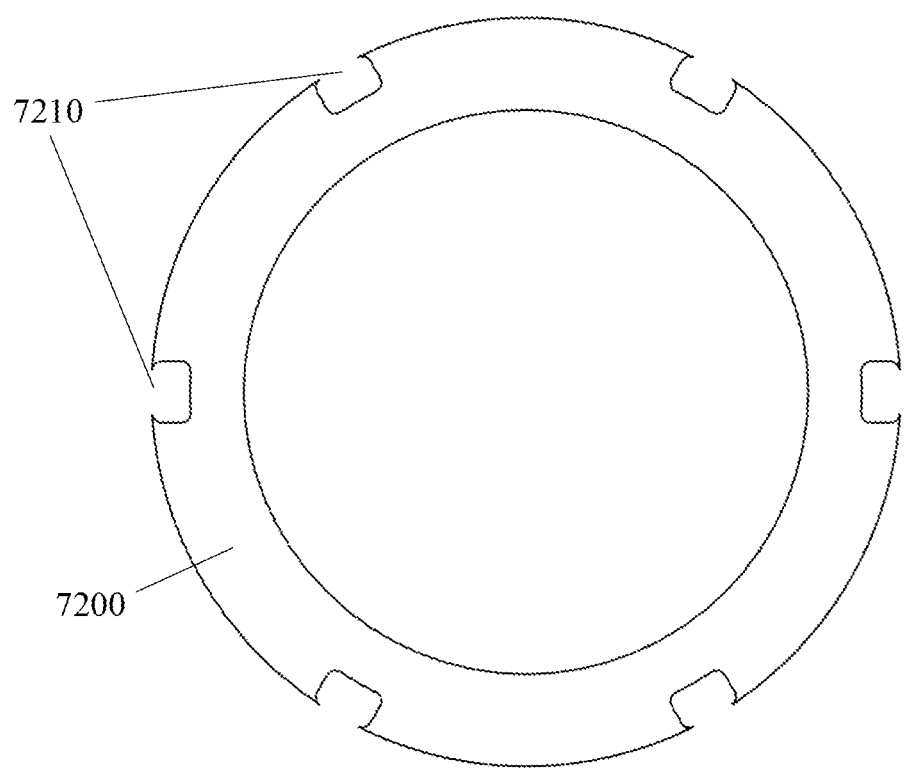

FIG. 39 shows a front view of a sealing member according to a form of the present technology.

Figure 40:
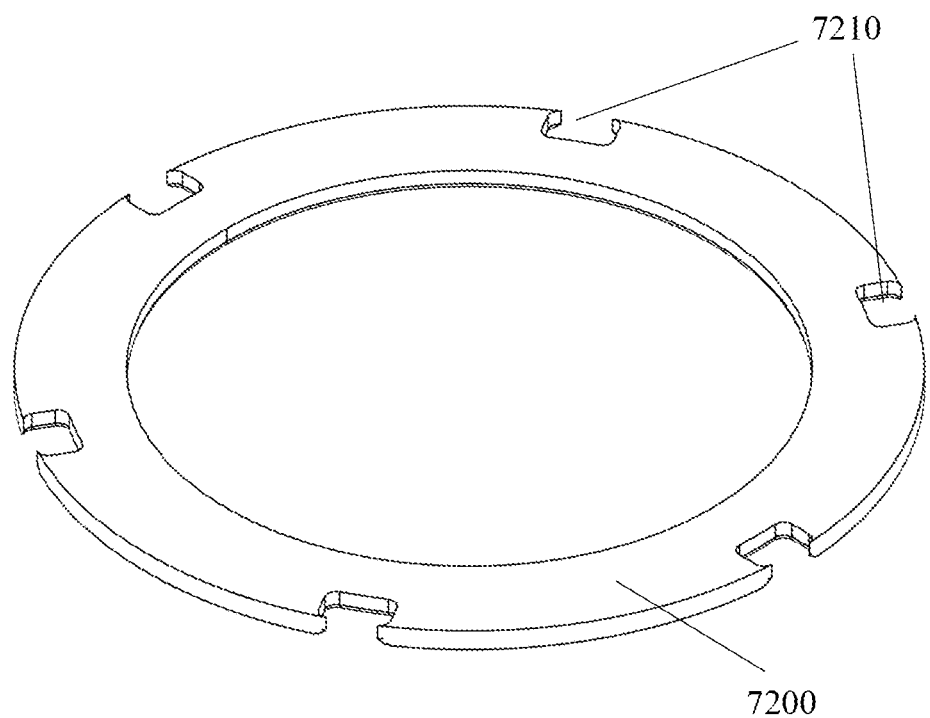

FIG. 40 shows a perspective view of the sealing member of FIG. 39.

Figure 41:
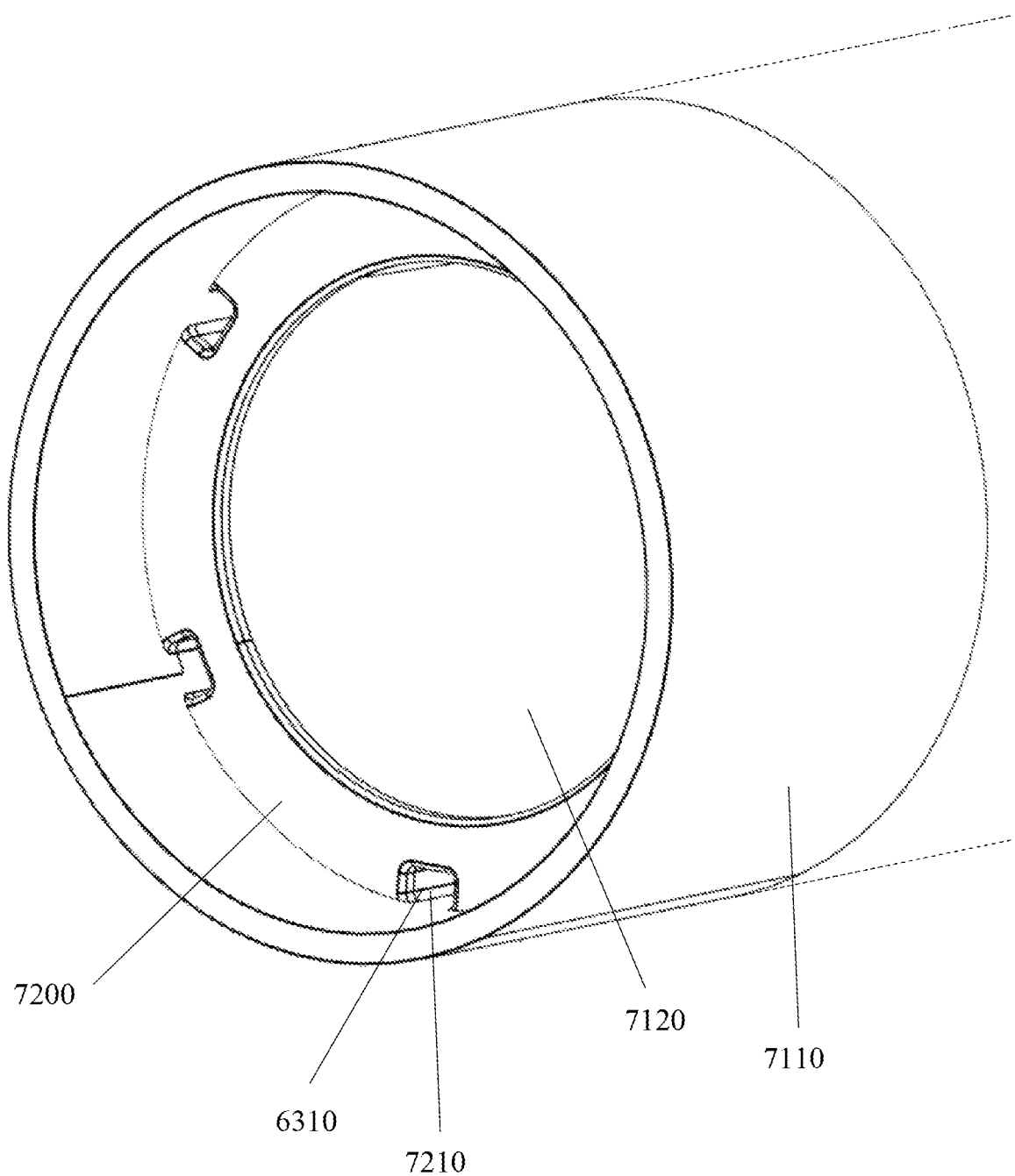

FIG. 41 shows a perspective view of an end portion of a connection member according to another form of the present technology with the sealing member of FIG. 39.

Figure 42:
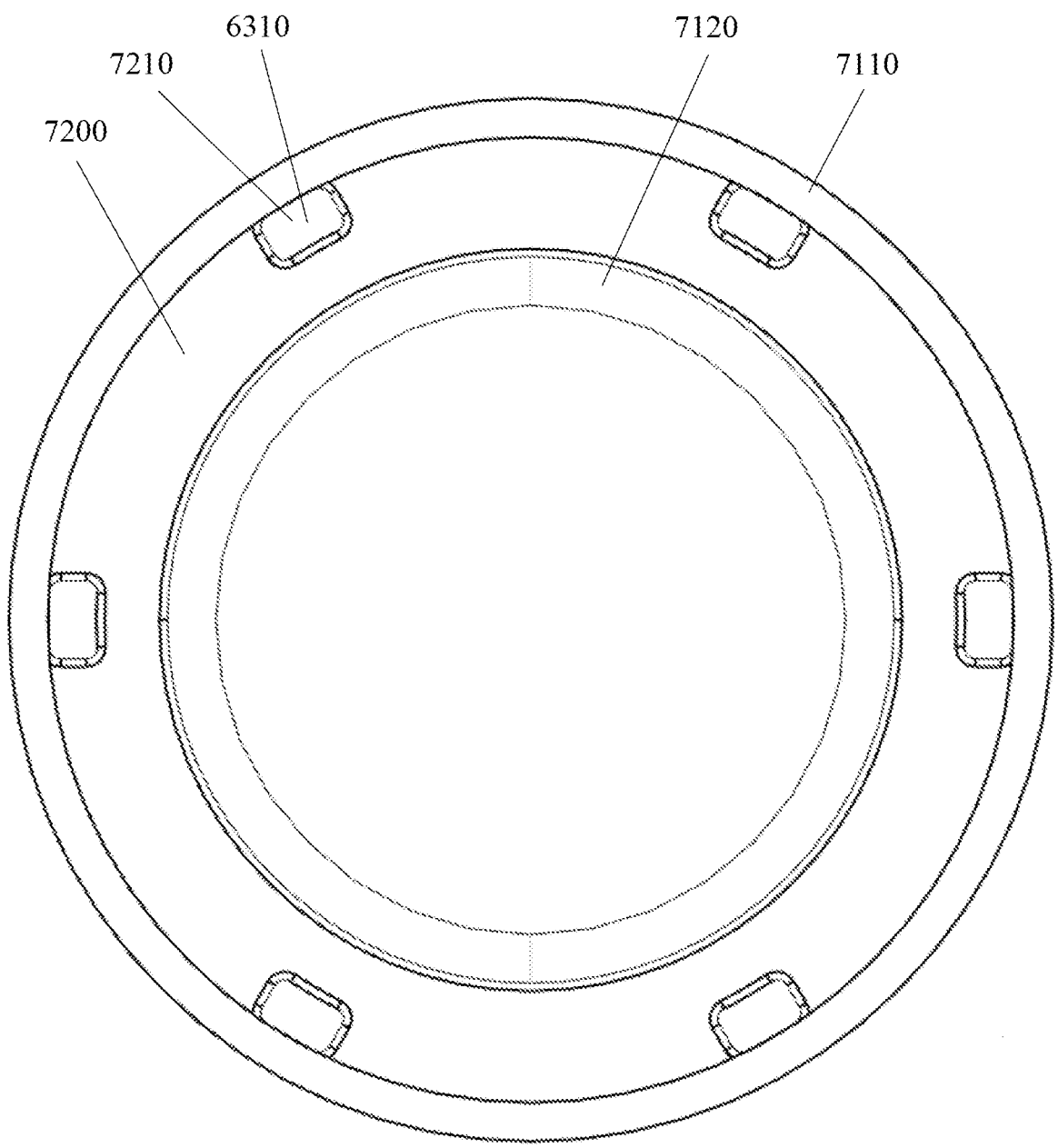

FIG. 42 shows a front view of the connection member of FIG. 41.

Figure 43:
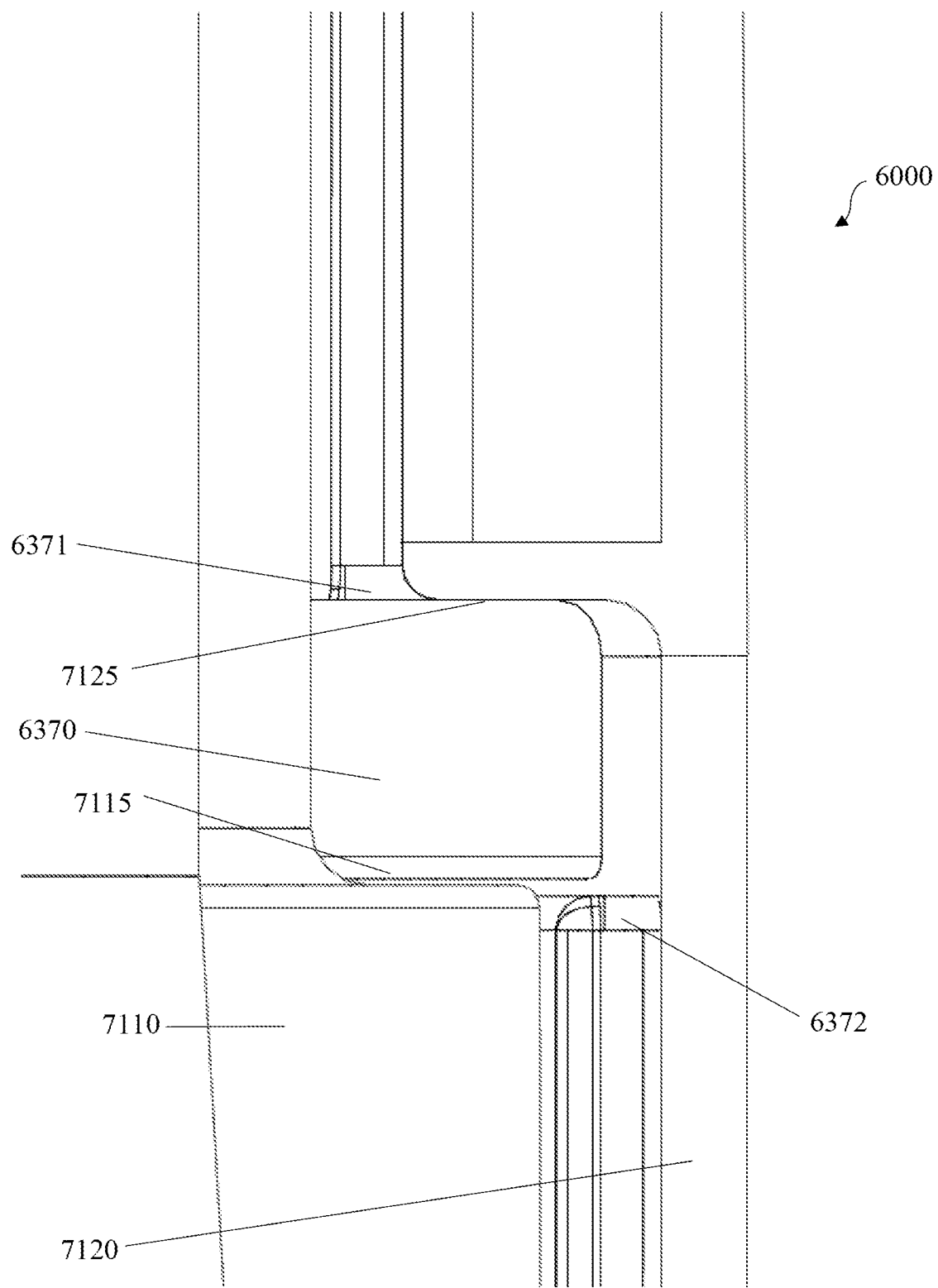

FIG. 43 shows an enlarged cross-sectional view of an alternative form of a connection member.

5 DETAILED DESCRIPTION OF EXAMPLES OF THE TECHNOLOGY

Before the present technology is described in further detail, it is to be understood that the technology is not limited to the particular examples described herein, which may vary. It is also to be understood that the terminology used in this disclosure is for the purpose of describing only the particular examples discussed herein and is not intended to be limiting.

The following description is provided in relation to various examples which may share one or more common characteristics and/or features. It is to be understood that one or more features of any one example may be combinable with one or more features of another example or other examples. In addition, any single feature or combination of features in any of the examples may constitute a further example.

5.1 Therapy

In one form, the present technology comprises a method for treating a respiratory disorder comprising applying positive pressure to the entrance of the airways of a patient 1000.

In certain examples of the present technology, a supply of air at positive pressure is provided to the nasal passages of the patient via one or both nares.

In certain examples of the present technology, mouth breathing is limited, restricted or prevented.

5.2 Respiratory Therapy Systems

In one form, the present technology comprises a respiratory therapy system for treating a respiratory disorder. The respiratory therapy system may comprise an RPT device 4000 for supplying a flow of air to the patient 1000 via an air circuit 4170 and a patient interface 3000 or 3800.

5.3 Patient Interface

A non-invasive patient interface 3000 in accordance with one aspect of the present technology comprises the following functional aspects: a seal-forming structure 3100, a plenum chamber 3200, a positioning and stabilising structure 3300, a vent 3400, one form of connection port 3600 for connection to air circuit 4170, and a forehead support 3700. In some forms a functional aspect may be provided by one or more physical components. In some forms, one physical component may provide one or more functional aspects. In use the seal-forming structure 3100 is arranged to surround an entrance to the airways of the patient so as to maintain positive pressure at the entrance(s) to the airways of the patient 1000. The sealed patient interface 3000 is therefore suitable for delivery of positive pressure therapy.

An unsealed patient interface 3800, in the form of a nasal cannula, includes nasal prongs 3810a, 3810b which can deliver air to respective nares of the patient 1000 via respective orifices in their tips. Such nasal prongs do not generally form a seal with the inner or outer skin surface of the nares. The air to the nasal prongs may be delivered by one or more air supply lumens 3820a, 3820b that are coupled with the nasal cannula 3800. The lumens 3820a, 3820b lead from the nasal cannula 3800 to a respiratory therapy device via an air circuit. The unsealed patient interface 3800 is particularly suitable for delivery of flow therapies, in which the RPT device generates the flow of air at controlled flow rates rather than controlled pressures. The "vent" at the unsealed patient interface 3800, through which excess airflow escapes to ambient, is the passage between the end of the prongs 3810a and 3810b of the cannula 3800 via the patient's nares to atmosphere.

If a patient interface is unable to comfortably deliver a minimum level of positive pressure to the airways, the patient interface may be unsuitable for respiratory pressure therapy.

The patient interface 3000 in accordance with one form of the present technology is constructed and arranged to be able to provide a supply of air at a positive pressure of at least 6 cmH$_2$O with respect to ambient.

The patient interface 3000 in accordance with one form of the present technology is constructed and arranged to be able to provide a supply of air at a positive pressure of at least 10 cmH$_2$O with respect to ambient.

The patient interface 3000 in accordance with one form of the present technology is constructed and arranged to be able to provide a supply of air at a positive pressure of at least 20 cmH$_2$O with respect to ambient.

5.3.1 Seal-Forming Structure

In one form of the present technology, a seal-forming structure 3100 provides a target seal-forming region and may additionally provide a cushioning function. The target seal-forming region is a region on the seal-forming structure 3100 where sealing may occur. The region where sealing actually occurs—the actual sealing surface—may change within a given treatment session, from day to day, and from patient to patient, depending on a range of factors including for example, where the patient interface was placed on the face, tension in the positioning and stabilising structure and the shape of a patient's face.

In one form the target seal-forming region is located on an outside surface of the seal-forming structure 3100.

In certain forms of the present technology, the seal-forming structure 3100 is constructed from a biocompatible material, e.g. silicone rubber.

A seal-forming structure 3100 in accordance with the present technology may be constructed from a soft, flexible, resilient material such as silicone.

In certain forms of the present technology, a system is provided comprising more than one a seal-forming structure 3100, each being configured to correspond to a different size and/or shape range. For example, the system may comprise one form of a seal-forming structure 3100 suitable for a large sized head, but not a small sized head and another suitable for a small sized head, but not a large sized head.

5.3.1.1 Sealing Mechanisms

In one form, the seal-forming structure includes a sealing flange utilizing a pressure assisted sealing mechanism. In use, the sealing flange can readily respond to a system positive pressure in the interior of the plenum chamber 3200 acting on its underside to urge it into tight sealing engagement with the face. The pressure assisted mechanism may act in conjunction with elastic tension in the positioning and stabilising structure.

In one form, the seal-forming structure 3100 comprises a sealing flange and a support flange. The sealing flange comprises a relatively thin member with a thickness of less than about 1 mm, for example about 0.25 mm to about 0.45 mm, which extends around the perimeter of the plenum chamber 3200. Support flange may be relatively thicker than the sealing flange. The support flange is disposed between the sealing flange and the marginal edge of the plenum chamber 3200 and extends at least part of the way around the perimeter. The support flange is or includes a spring-like element and functions to support the sealing flange from buckling in use.

In one form, the seal-forming structure may comprise a compression sealing portion or a gasket sealing portion. In use the compression sealing portion, or the gasket sealing portion is constructed and arranged to be in compression, e.g. as a result of elastic tension in the positioning and stabilising structure.

In one form, the seal-forming structure comprises a tension portion. In use, the tension portion is held in tension, e.g. by adjacent regions of the sealing flange.

In one form, the seal-forming structure comprises a region having a tacky or adhesive surface.

In certain forms of the present technology, a seal-forming structure may comprise one or more of a pressure-assisted sealing flange, a compression sealing portion, a gasket sealing portion, a tension portion, and a portion having a tacky or adhesive surface.

5.3.1.2 Nose Bridge or Nose Ridge Region

In one form, the non-invasive patient interface 3000 comprises a seal-forming structure that forms a seal in use on a nose bridge region or on a nose-ridge region of the patient's face.

In one form, the seal-forming structure includes a saddle-shaped region constructed to form a seal in use on a nose bridge region or on a nose-ridge region of the patient's face.

5.3.1.3 Upper Lip Region

In one form, the non-invasive patient interface 3000 comprises a seal-forming structure that forms a seal in use on an upper lip region (that is, the lip superior) of the patient's face.

In one form, the seal-forming structure includes a saddle-shaped region constructed to form a seal in use on an upper lip region of the patient's face.

5.3.1.4 Chin-Region

In one form the non-invasive patient interface 3000 comprises a seal-forming structure that forms a seal in use on a chin-region of the patient's face.

In one form, the seal-forming structure includes a saddle-shaped region constructed to form a seal in use on a chin-region of the patient's face.

5.3.1.5 Forehead Region

In one form, the seal-forming structure that forms a seal in use on a forehead region of the patient's face. In such a form, the plenum chamber may cover the eyes in use.

5.3.1.6 Nasal Pillows

In one form the seal-forming structure of the non-invasive patient interface 3000 comprises a pair of nasal puffs, or nasal pillows, each nasal puff or nasal pillow being constructed and arranged to form a seal with a respective naris of the nose of a patient.

Nasal pillows in accordance with an aspect of the present technology include: a frusto-cone, at least a portion of which forms a seal on an underside of the patient's nose, a stalk, a flexible region on the underside of the frusto-cone and connecting the frusto-cone to the stalk. In addition, the structure to which the nasal pillow of the present technology is connected includes a flexible region adjacent the base of the stalk. The flexible regions can act in concert to facilitate a universal joint structure that is accommodating of relative movement both displacement and angular of the frusto-cone and the structure to which the nasal pillow is connected. For example, the frusto-cone may be axially displaced towards the structure to which the stalk is connected.

5.3.2 Plenum Chamber

The plenum chamber 3200 has a perimeter that is shaped to be complementary to the surface contour of the face of an average person in the region where a seal will form in use. In use, a marginal edge of the plenum chamber 3200 is positioned in close proximity to an adjacent surface of the face. Actual contact with the face is provided by the seal-forming structure 3100. The seal-forming structure 3100 may extend in use about the entire perimeter of the plenum chamber 3200. In some forms, the plenum chamber 3200 and the seal-forming structure 3100 are formed from a single homogeneous piece of material.

In certain forms of the present technology, the plenum chamber 3200 does not cover the eyes of the patient in use. In other words, the eyes are outside the pressurised volume defined by the plenum chamber. Such forms tend to be less obtrusive and/or more comfortable for the wearer, which can improve compliance with therapy.

In certain forms of the present technology, the plenum chamber 3200 is constructed from a transparent material, e.g. a transparent polycarbonate. The use of a transparent material can reduce the obtrusiveness of the patient interface and help improve compliance with therapy. The use of a transparent material can aid a clinician to observe how the patient interface is located and functioning.

In certain forms of the present technology, the plenum chamber 3200 is constructed from a translucent material. The use of a translucent material can reduce the obtrusiveness of the patient interface and help improve compliance with therapy.

5.3.3 Positioning and Stabilising Structure

The seal-forming structure 3100 of the patient interface 3000 of the present technology may be held in sealing position in use by the positioning and stabilising structure 3300.

In one form the positioning and stabilising structure 3300 provides a retention force at least sufficient to overcome the effect of the positive pressure in the plenum chamber 3200 to lift off the face.

In one form the positioning and stabilising structure 3300 provides a retention force to overcome the effect of the gravitational force on the patient interface 3000.

In one form the positioning and stabilising structure 3300 provides a retention force as a safety margin to overcome the potential effect of disrupting forces on the patient interface 3000, such as from tube drag, or accidental interference with the patient interface.

In one form of the present technology, a positioning and stabilising structure 3300 is provided that is configured in a manner consistent with being worn by a patient while sleeping. In one example the positioning and stabilising structure 3300 has a low profile, or cross-sectional thickness, to reduce the perceived or actual bulk of the apparatus. In one example, the positioning and stabilising structure 3300 comprises at least one strap having a rectangular cross-section. In one example the positioning and stabilising structure 3300 comprises at least one flat strap.

In one form of the present technology, a positioning and stabilising structure 3300 is provided that is configured so as not to be too large and bulky to prevent the patient from lying in a supine sleeping position with a back region of the patient's head on a pillow.

In one form of the present technology, a positioning and stabilising structure 3300 is provided that is configured so as not to be too large and bulky to prevent the patient from lying in a side sleeping position with a side region of the patient's head on a pillow.

In one form of the present technology, a positioning and stabilising structure 3300 is provided with a decoupling portion located between an anterior portion of the positioning and stabilising structure 3300, and a posterior portion of the positioning and stabilising structure 3300. The decoupling portion does not resist compression and may be, e.g. a flexible or floppy strap. The decoupling portion is constructed and arranged so that when the patient lies with their head on a pillow, the presence of the decoupling portion prevents a force on the posterior portion from being transmitted along the positioning and stabilising structure 3300 and disrupting the seal.

In one form of the present technology, a positioning and stabilising structure 3300 comprises a strap constructed from a laminate of a fabric patient-contacting layer, a foam inner layer and a fabric outer layer. In one form, the foam is porous to allow moisture, (e.g., sweat), to pass through the strap. In one form, the fabric outer layer comprises loop material to engage with a hook material portion.

In certain forms of the present technology, a positioning and stabilising structure 3300 comprises a strap that is extensible, e.g. resiliently extensible. For example, the strap may be configured in use to be in tension, and to direct a force to draw a seal-forming structure into sealing contact with a portion of a patient's face. In an example the strap may be configured as a tie.

In one form of the present technology, the positioning and stabilising structure comprises a first tie, the first tie being constructed and arranged so that in use at least a portion of an inferior edge thereof passes superior to an otobasion superior of the patient's head and overlays a portion of a parietal bone without overlaying the occipital bone.

In one form of the present technology suitable for a nasal-only mask or for a full-face mask, the positioning and stabilising structure includes a second tie, the second tie being constructed and arranged so that in use at least a portion of a superior edge thereof passes inferior to an otobasion inferior of the patient's head and overlays or lies inferior to the occipital bone of the patient's head.

In one form of the present technology suitable for a nasal-only mask or for a full-face mask, the positioning and stabilising structure includes a third tie that is constructed and arranged to interconnect the first tie and the second tie to reduce a tendency of the first tie and the second tie to move apart from one another.

In certain forms of the present technology, a positioning and stabilising structure 3300 comprises a strap that is bendable and e.g. non-rigid. An advantage of this aspect is that the strap is more comfortable for a patient to lie upon while the patient is sleeping.

In certain forms of the present technology, a positioning and stabilising structure 3300 comprises a strap constructed to be breathable to allow moisture vapour to be transmitted through the strap, In certain forms of the present technology, a system is provided comprising more than one positioning and stabilizing structure 3300, each being configured to provide a retaining force to correspond to a different size and/or shape range. For example, the system may comprise one form of positioning and stabilizing structure 3300 suitable for a large sized head, but not a small sized head, and another. suitable for a small sized head, but not a large sized head.

In certain forms of the present technology, a positioning and stabilising structure 3300 comprises at least one conduit that acts as part of the positioning and stabilising structure 3300 to position and stabilise the seal-forming structure 3100 in an operative position on a patient's face and also acts to convey pressurised air to the plenum chamber 3200 from the air circuit 4170. For example, the conduit may be fluidly connected at one end to the plenum chamber 3200 and at another end to a connection port 3600 allowing for connection to the air circuit 4170. In some forms, the positioning and stabilising structure 3300 of this type may be configured so that the at least one conduit extends across the cheek region of the patient's face in use and the connection port 3600 is positioned, in use, on the patient's head superior to the patient's otobasion superior, for example on top of the patient's head. A patient interface having such a positioning and stabilising structure 3300 may be referred to as including "conduit headgear". The positioning and stabilising structure 3300 in this form of the technology may also comprise a plurality of straps to assist in securing the seal-forming structure 3100 with the patient's face. Such a positioning and stabilising structure 3300 may increase the comfort of the patient, reduce the components in front of the patient's face during use, and prevent the air circuit 4170 disrupting the patient.

5.3.4 Vent

In one form, the patient interface 3000 includes a vent 3400 constructed and arranged to allow for the washout of exhaled gases, e.g. carbon dioxide.

In certain forms the vent 3400 is configured to allow a continuous vent flow from an interior of the plenum chamber 3200 to ambient whilst the pressure within the plenum chamber is positive with respect to ambient. The vent 3400 is configured such that the vent flow rate has a magnitude sufficient to reduce rebreathing of exhaled $CO_2$ by the patient while maintaining the therapeutic pressure in the plenum chamber in use.

One form of vent 3400 in accordance with the present technology comprises a plurality of holes, for example, about 20 to about 80 holes, or about 40 to about 60 holes, or about 45 to about 55 holes.

The vent 3400 may be located in the plenum chamber 3200. Alternatively, the vent 3400 is located in a decoupling structure, e.g., a swivel.

In certain forms the vent is located in a part of the respiratory system other than the patient interface, for example the air circuit, between the air circuit and the patient interface or the positioning and stabilising structure, as described below.

Vents according to certain forms of the technology are described in more detail below.

5.3.5 Decoupling Structure(s)

In one form the patient interface 3000 includes at least one decoupling structure, for example, a swivel or a ball and socket.

5.3.6 Connection Port

Connection port 3600 allows for connection of the patient interface 3000 to the air circuit 4170.

5.3.7 Forehead Support

In one form, the patient interface 3000 includes a forehead support 3700.

5.3.8 Anti-Asphyxia Valve

In one form, the patient interface 3000 includes an anti-asphyxia valve.

5.3.9 Ports

In one form of the present technology, a patient interface 3000 includes one or more ports that allow access to the volume within the plenum chamber 3200. In one form this allows a clinician to supply supplementary oxygen. In one form, this allows for the direct measurement of a property of gases within the plenum chamber 3200, such as the pressure.

5.4 RPT Device

An RPT device 4000 in accordance with one aspect of the present technology comprises mechanical, pneumatic, and/or electrical components and is configured to execute one or more algorithms 4300, such as any of the methods, in whole or in part, described herein. The RPT device 4000 may be configured to generate a flow of air for delivery to a patient's airways, such as to treat one or more of the respiratory conditions described elsewhere in the present document.

5.5 Air Circuit

An air circuit 4170 in accordance with an aspect of the present technology is a conduit or a tube constructed and arranged to allow, in use, a flow of air to travel between two components such as RPT device 4000 and the patient interface 3000 or 3800.

In particular, the air circuit 4170 may be in fluid connection with the outlet of the pneumatic block 4020 and the patient interface. The air circuit may be referred to as an air delivery tube. In some cases, there may be separate limbs of the circuit for inhalation and exhalation. In other cases, a single limb is used.

5.6 Vent

5.6.1 Vent Overview

As noted above a vent 3400 may be provided to a part of the respiratory system to allow for the washout of exhaled gases, e.g. carbon dioxide. Venting of the exhaled gas may result in noise caused by the flow of air through the vent 3400 which can disturb the patient 1000 and/or the bed partner 1100. Furthermore, the force of the air flow exiting the vent may disrupt, or be uncomfortable for, the patient 1000 and/or bed partner 1100. Air exiting the vent directly into the surrounding ambient air may also result in flow separation, particularly at high velocities. Flow separation causes an increase in turbulence in the flow of air and therefore noise. The faster the flow of air exiting the vent, the louder the noise associated with the vent 3400. Slowing down the flow of air in the vent will therefore reduce the noise associated with the vent 3400.

In certain forms of the present technology a vent 3400 may be provided in the form of a vent structure 6000 provided to a part of the respiratory system and configured to reduce the noise produced by venting gases and/or to reduce the speed of the air flow as it exits the vent. In some forms, the vent structure 6000 may be formed from a plastics material, for example polycarbonate. In some forms the vent structure 6000 is formed from an assembly of different materials.

In certain forms, the vent structure 6000 may have the advantage of not requiring any diffuser material as is present in prior art vents to reduce jetting of the air flow. Diffuser material is an additional component to a patient interface so adds complexity in manufacture, assembly and use, and may need to be cleaned and/or replaced regularly.

5.6.2 Connection Member

In certain forms of the present technology the vent structure 6000 may be formed as part of a connection member 7000. FIGS. 7 to 38 illustrate several connection members 7000 according to different forms of the technology. The connection member 7000 is configured to connect the air circuit 4170 and the patient interface 3000. In some forms of the technology this may be an indirect connection, for instance there may be one or more additional components that connect between the connection member 7000 and the air circuit 4170 or patient interface 3000, including a length of conduit fluidly connecting the patient interface 3000 and the connection member 7000, for example. In other forms the connection member 7000 is directly connected to the air circuit 4170 and/or the patient interface 3000. In forms of the technology, the connection member 7000 creates both a physical connection and a fluid connection between the air circuit 4170 and the patient interface 3000.

In some forms of the technology the connection member 7000 may be a separate or separable component to the circuit 4170 and/or the patient interface 3000. In other forms of the technology the air circuit 4170 or the patient interface 3000 comprises the connection member 7000.

In one form the connection member 7000 may comprise a tube portion 7100 configured to fluidly connect the air circuit 4170 to the patient interface 3000. The tube portion 7100 is typically a circular hollow cylinder or assembly of components forming a generally cylindrical shape with an air path through it to convey air from the air circuit 4170 to the patient interface 3000. In other forms of the technology the tube portion may have a different cross-sectional shape, for example oval, D-shaped or polygonal.

The connection member 7000 may further comprise a vent structure 6000 comprising a vent housing 6100 and a plurality of partitions 6200 inside the vent housing 6100. The plurality of partitions 6200 form therebetween a plurality of vent slots 6300 through which exhaled air can flow. The vent slots 6300 may be partly defined by the vent housing 6100, for example parts of the vent housing 6100 may define the upper and lower walls of each vent slot 6300 while the partitions 6200 define the side walls of each vent slot 6300. The vent slots 6300 comprise a vent inlet 6310 configured to receive an air flow, for example air exhaled by the patient 1000. The vent slots 6300 also comprise a vent outlet 6320 configured to allow the air flow to exit into the surrounding ambient air. Exhaled air passing through the vent slots flows in a direction from the vent inlet 6310 to the vent outlet 6320. The parts of the vent housing 6100 forming the vent slots 6300 and the partitions 6200 may be substantially rigid and fixed in position relative to each other such that the shape of the vent slots does not change during use.

The number of vent slots 6300 in the vent structure 6000 may vary between different forms of the technology. Design features that may be varied to alter the number of vent slots 6300 include the size of the vent structure 6000, the number of partitions 6200 and the thickness of the partitions 6200 forming the vent slots 6300.

As mentioned above a vent 3400 according to forms of the technology is constructed and arranged to allow for the washout of exhaled gases, e.g. carbon dioxide from the patient interface 3000. The vent structure 6000 prevents rebreathing of the exhaled gases while maintaining the therapeutic pressure in the plenum chamber in use. The total size of the vent structure 6000 in particular the vent slots 6300 is therefore formed to be sufficient to allow for washout of the exhaled gases and also to maintain the therapeutic pressure in the plenum chamber 3200. In exemplary forms of the technology in which the vent structure 6000 is formed as part of a connection member 7000, the cross-sectional area of each vent inlet 6310 may be between 1.8 $mm^2$ and 2.5 $mm^2$, for example approximately 2.2 $mm^2$. The total cross-sectional area of the vent outlets may be between 45 $mm^2$ and 50 $mm^2$. In the form of the technology shown in FIGS. 27 to 36 there are 22 vent inlets 6310 and the total cross-sectional area of the vent inlets is approximately 48 $mm^2$. The cross-sectional area of each vent outlet 6320 may be between 2.0 $mm^2$ and 2.8 $mm^2$, for example approximately 2.4 $mm^2$. The total cross-sectional area of the vent outlets 6320 may be between 50 $mm^2$ and 55 $mm^2$. In the form of the technology shown in FIGS. 27 to 36 there are 22 vent outlets 6320 and the total cross-sectional area of the vent outlets is approximately 52 $mm^2$. Additionally, the ratio of the total cross-sectional area of the vent inlets 6310 to the total cross-sectional area of the tube portion 7100 may be in the range of 1:4-25. In the form of the technology shown in FIGS. 7 to 16 the ratio of the total cross-sectional area of the vent inlets 6310 to the total cross-sectional area of the tube portion 7100 is substantially 1:23. In the form shown in FIGS. 17 to 26 this ratio is substantially 1:18. In the form shown in FIGS. 27 to 36 this ratio is substantially 1:16.

As the air flows along the vent slots 6300 the air contacts the partitions 6200 and the vent housing 6100 and reduces in speed due to friction of the air flow with the partitions 6200 and walls of the vent housing 6100. Changes in the design of the vent structure 6000 may alter the amount of friction experienced by the air flow, and therefore the speed at which air exits the vent structure 6000.

The higher the total surface area of the vent slots 6300 that the air flow comes into contact with, the lower the speed of the air flow because of the greater frictional or drag forces when there is higher surface area. In general, the more vent slots 6300 there are the greater the overall surface area of the vent structure 6000 that contacts the air flow and therefore the greater the reduction in speed of the venting air. Therefore, forms of the technology having a relatively high number of vent slots 6300 may be more effective in reducing the speed of flow, and therefore reducing the amount of noise created by the air flow, than forms of the technology having a relatively low number of vent slots. However, forms of the technology having more vent slots 6300 may be more complex and costly to manufacture.

The longer the vent slots 6300, the greater the total surface area of the vent structure 6000 that contacts the air flow. Therefore, forms of the technology having relatively long vent slots 6300 may be more effective in reducing the speed of flow, and therefore reducing the amount of noise created by the air flow, than forms of the technology having relatively short vent slots. However, in some forms it may be advantageous for the connection member 7000 to have a relatively compact design. Also, since in some forms of the technology the connection member 7000 may be formed from a rigid material, the connection member 7000 therefore adds further rigidity to the overall rigidity of the mask system, and the longer the vent slots 6300, the greater the size of the rigid connection member 7000. Therefore, vent slots 6300 longer than a certain length will result in a connection member 7000 having a length that may make it difficult for the patient to move or position the patient interface 3000 or air circuit 4170. It will be appreciated that the "certain length" that makes the connection member 7000 too long for a patient's comfort or convenient use will depend on a variety of factors, including the patient's personal preference, the type of respiratory system the connection member 7000 is used with, and the context in which it is used. Nevertheless, it is to be understood that there may, in some circumstances, be an advantage in generally keeping the connection member 7000 relatively short. In certain forms of the technology, for example where the diameter of the air circuit 4170 is 19 mm, the connection member 7000 may be approximately 25 mm or less in length, and in some forms of the technology it may have a length of approximately 15 mm. In other forms of the technology, for example where the diameter of the air circuit 4170 is 15 mm, the connection member 7000 may have a length in the range of 10 mm to 20 mm.

In the forms of the technology shown in FIGS. 7 to 38, the tube portion 7100 of the connection member 7000 comprises an outer tube portion 7110 and an inner tube portion 7120. The outer tube portion 7110 is configured to connect to the patient interface 3000 and the inner tube portion 7120 is configured to connect to the air circuit 4170. In some forms of the technology a first end portion of the outer tube portion 7110 is configured to connect to the patient interface 3000 and a first end portion of the inner tube portion 7120 is configured to connect to the air circuit 4170.

In some forms of the technology (not illustrated), the outer tube portion 7110 may be configured to connect to the patient interface 3000 by a ball and socket arrangement or a swivel ring arrangement to allow a wide range of motion between the patient interface 3000 and the connection member 7000. This decoupling arrangement assists in hindering forces applied to the air circuit from being applied to the patient interface and disrupting the seal with the patient's face. In other forms of the technology, the first end portion of the outer tube portion 7110 may be integrally formed as part of the patient interface 3000, for instance integrally formed with the plenum chamber 3200. In other forms of the technology, the outer tube portion 7110 may be removably connected to the patient interface 3000. This connection may be achieved through a clip arrangement, a screw and thread arrangement, or a snap-fit arrangement. Similarly, in some forms of the technology the first end portion of the inner tube portion 7120 may be configured to connect to an end of the air circuit 4170 via a decoupling arrangement including a ball and socket or a swivel ring arrangement. In other forms of the technology the inner tube portion 7120 may be integrally formed with an end of the air circuit 4170. Alternatively, the inner tube portion 7120 may be removably connected by a clip arrangement, a screw and thread arrangement, or a snap-fit arrangement.

In some forms of the technology, as shown in FIGS. 7 to 36, the outer tube portion 7110 and the inner tube portion 7120 are coaxially arranged around a central longitudinal axis, A2. At least a portion of the inner tube portion 7120 is positioned inside at least a portion of the outer tube portion 7110. The outer surface 7125 of this portion of the inner tube portion 7120 is typically separated by a distance in the range of 0.5 mm to 1 mm from the inner surface 7115 of this portion of the outer tube portion 7110. In the form of the technology shown in FIGS. 7 to 36 the inner tube portion 7120 has a smaller diameter along its entire length compared to the outer tube portion 7110. Also, in the form of the technology shown in FIGS. 7 to 38, the portion of the inner tube portion 7120 positioned inside the outer tube portion 7110 is a second end portion of the inner tube portion 7120, the second end portion being opposite to the first end portion that connects to the air circuit 4170. Similarly, the portion of the outer tube portion 7110 in which the inner tube portion 7120 is positioned is a second end portion of the outer tube portion 7110, the second end portion being opposite to the first end portion that connects to the patient interface 3000. In the form of the technology shown in FIGS. 7-16 and 27-36 the first end portion of the inner tube portion 7120 extends longitudinally out from the second end portion of the outer tube portion 7110. Similarly, at the opposite end of the connection member 7000, the first end portion of the outer tube portion 7110 extends longitudinally out from the second end portion of the inner tube portion 7120.

In certain forms of the technology the vent housing 6100 comprises the outer tube portion 7110 and the inner tube portion 7120 and the partitions 6200 and vent slots 6300 are located between the outer tube portion 7110 and the inner tube portion 7120. For example, in the forms of the technology illustrated in FIGS. 7 to 38, the vent slots 6300 are arranged around an annular region between the outer tube portion 7110 and the inner tube portion 7120. The partitions 6200 may be equally spaced around the annular region between the outer tube portion 7110 and the inner tube portion 7120 so that the exhaled air vents generally evenly through the plurality of vent slots 6300. In other forms, the partitions may be distributed so that there is a higher concentration of exhaled air venting in one region of the vent compared to another, for example to urge exhaled air away from, or towards, a preferred direction. In other examples, the partitions 6200 may be formed on only one part of the tube portion 7100, for example on a side of the tube portion 7100 facing generally away from the patient in use.

In some forms of the technology the partitions 6200 are formed on, or connected to, the outer surface 7125 of the inner tube portion 7120. For example, the partitions 6200 may be integrally formed as part of the inner tube portion 7120, for example in a moulding process. In alternative forms of the technology the partitions 6200 are formed on the inner surface 7115 of the outer tube portion 7110. In alternative forms of the technology the partitions may be formed as a separate component that is positioned between the inner tube portion 7120 and the outer tube portion 7110. In certain forms of the technology, the connection member 7000 is integrally formed in one-piece, for example by a moulding process.

When used with a full-face mask, the connection member 7000 may comprise, or be connected to, an AAV. The connection member 7000 may alternatively be used with other types of masks, examples of which are described herein.

The vent structure 6000 may comprise one or more of a number of sound reducing features as described below. These sound reducing features assist in reducing the sound associated with air flowing through and exiting the vent structure 6000.

5.6.2.1 Sealing Member

In some forms of the technology the connection member 7000 further comprises a sealing member 7200 configured to form a seal to reduce any unwanted flow of air through any gaps or spaces (besides through the vent slots 6300) between the partitions 6200 and the vent housing 6100. Flow of air through such gaps or spaces may generate noise which may disturb the patient. The sealing member 7200 may form a seal at or proximate the vent inlet 6310 to hinder the flow of air through these gaps or spaces thereby preventing the generation of any additional noise. In forms of the technology where the partitions 6200 are formed as part of the inner tube portion 7120, the sealing member 7200 seals the space at the vent inlet 6310 between the partitions 6200 and the inner surface 7115 of the outer tube portion 7110. In forms of the technology where the partitions 6200 are formed as part of the outer tube portion 7110, the sealing member 7200 seals the space at the vent inlet 6310 between the partitions 6200 and the outer surface 7125 of the inner tube portion 7120.

FIGS. 39 and 40 show a sealing member according to one form of the technology. FIGS. 41 and 42 show the inlet end of a connection member 7000 according to one form of the technology. The rest of the connection member may be similar to the other forms of the technology shown.

The sealing member 7200 as shown in FIGS. 39 to 42 is substantially annular in shape, its shape and size corresponding to the annular region between the inner tube portion 7120 and the outer tube portion 7110. In these forms the sealing member 7200 is positioned upstream, when considering the flow of exhaled air, of the partitions 6200 and therefore the vent inlets 6310, e.g. the sealing member 7200 may be closer to the patient interface 3000 than the vent inlets 6310. The sealing member 7200 is also positioned between the inner tube portion 7120 and the outer tube portion 7110, such that the hole in the centre of the annular shape aligns with the hollow portion of the inner tube portion to allow the flow of air from the flow generator through the inner tube portion 7120 to reach the patient interface 3000.

The sealing member 7200 comprises a plurality of apertures 7210. The number of apertures corresponds to the number of vent slots 6300. The shape and position of the apertures 7210 may correspond to the shape and position of the vent inlets 6310. For example, the apertures 7210 shown in FIGS. 39 to 42 are equally spaced around the sealing member 7200 so they align with the inlet of the respective vent slots 6300. The flow of exhaled air from the patient follows a path through the apertures 7210 and into the vent slots 6300.

In the form of the technology shown in FIGS. 39 to 42 the apertures 7210 are formed as openings at the outer rim of the sealing member 7200 (i.e. the edge adjacent the outer tube portion 7110 when assembled). In other forms the apertures 7210 may be formed as openings at the inner rim of the sealing member 7200 (i.e. the edge adjacent the inner tube portion 7120 when assembled). In other forms the apertures 7210 may be formed as openings through the central region of the sealing member 7200.

As can be seen in FIG. 39 the apertures 7210 may have a substantially rectangular cross-sectional shape. This corresponds with the shape of the vent inlets 6310 as shown in FIG. 41. In other forms of the technology the cross-sectional shape of the apertures 7210 may have another shape for example circular, square, or triangular.

The sealing member 7200 may be formed from a flexible material, for instance a silicone or rubber. The sealing member 7200 may be friction fit or interference fit between the inner tube portion 7120 and the outer tube portion 7110. In other forms of the technology the sealing member may comprise a snap fit connection between the inner tube portion 7120 and/or the outer tube portion. In other forms of the technology the sealing member may be adhered to or integrally formed with the inner tube portion 7120 and/or the outer tube portion 7110.

5.6.2.2 Change in Cross Sectional Area Along Length of Vent Slot

In certain forms of the technology the vent structure 6000 comprises partitions 6200 which are formed such that each vent slot 6300 has a cross-sectional area at a first region 6330 of the vent slots 6300 that is smaller than a cross-sectional area at a second region 6340 of the vent slots 6300, the first region 6330 being closer to the vent inlet 6310 than the second region 6340. In some forms of the technology the first region 6330 is proximate the vent inlet 6310 and/or the second region 6340 is proximate the vent outlet 6320. For example, the partitions 6200 may be formed such that the vent inlet 6310 has a smaller cross-sectional area than the vent outlet 6320.

Each of the vent slots 6300 has a longitudinal axis along the length of the respective vent slot 6300, i.e. in the inlet-outlet direction. In FIGS. 11, 12 15, 16 21, 22, 25, 26, 31, 32, 35, 36 and 37, the longitudinal axis of one of the vent slots 6300 is labelled as A1. The longitudinal axis A1 is generally parallel to the net direction of flow of air through the vent slot 6300. In the examples shown the axis A1 is substantially parallel to the central axis A2 as described above. The first region 6330 is located at a longitudinal position upstream of the second region 6340. The vent slot 6300 expands, i.e. the cross-sectional area increases, from the first region 6330 to the second region 6340. The increase in cross-sectional area along the vent slot 6300 results in an expansion of the air flowing through the vent slot 6300 which reduces the speed of the air flow. A slower air flow through a vent slot 6300 produces less noise. Expansion of the airflow also results in some of the air flow changing direction, for example some of the air flow moves towards the walls of the vent slots 6300 thereby increasing the frictional or drag forces acting on the air flow which slows down the air flow further and further reduces noise.

In the forms of the present technology shown in FIGS. 7 to 38, the second region 6340 of each vent slot 6300 has a larger width compared to the first region 6330 of the respective vent slot 6300. In some forms of the technology the vent housing 6100 is formed such that the second region 6340 of each vent slot 6300 has a greater height compared to the first region 6330 of the respective vent slot 6300. In some forms of the technology there is both an increase in width and height of the vent slot 6300 between the first region 6330 and the second region 6340. In other forms of the technology there is only an increase in width or height of the vent slot 6300 between the first region 6330 and the second region 6340. These forms of the technology will now be described in more detail.

5.6.2.2.1 Change in Width of the Vent Slot

In some forms of the technology, as shown in FIGS. 7-36, there may be an increase in width between a first region 6330 and second region 6340 of the vent slot 6300 and an increase in height between a third region 6335 and a fourth region 6345 of the vent slot 6300, the third region 6335 being located at a longitudinal position upstream of the fourth region 6345. In FIGS. 7-26 the third region 6335 and the fourth region 6345 are both located downstream of the first region 6330 and the second region 6340. In FIGS. 27-35 the third region 6335 and the fourth region 6345 are located upstream of the first region 6330 and the second region 6340. In some forms of the technology the first region 6330 and the third region 6335 are the same region of the vent slot 6300 and the second region 6340 and the fourth region 6345 are the same region of the vent slot 6300. In the illustrated forms of the technology, the vent slots 6300 also have a greater width at the vent outlet 6320 compared to the vent inlet 6310.

As seen in FIGS. 12, 22, and 32 a width, W1, of a vent slot 6300 in the first region 6330 is smaller than a width, W2, of the vent slot 6300 in the second region 6340. The width W1 may be in the range of 0.1 mm to 0.5 mm. In some forms of the technology the width W1 may be 0.2 mm. The width W2 may in the range of 3.5 mm to 5 mm. In some forms of the technology the width W2 is 4.3 mm. The width of the vent slot 6300 as shown is a distance between adjacent partitions 6200. The width is substantially perpendicular to the plane of the inner surface of the partitions 6200 that contacts the air in the vent slots 6300. In the form of the technology as shown in the FIGS. 7-38 where the vent structure 6000 is comprised as part of a connection member 7000 that is generally cylindrical in shape, the width of each vent slot 6300 is a distance measured in a circumferential direction. Therefore, the increase in width is an increase in the size of the vent slots in a circumferential direction or a circumferential expansion.

In some forms of the present technology, for example as illustrated in FIGS. 8, 9, 11, 12, 18, 19, 21, 22, 28, 29, 31, and 32, each partition 6200 comprises an angled straight wall portion 6210 between the first region 6330 and the second region 6340. The angled straight wall portion 6210 is oriented at an angle to the longitudinal axis A1. The angled straight wall portion 6210 forms part of the face of the partition 6300 which forms one side of the vent slot 6300. The angled straight wall portion 6210 is angled outwardly in the downstream direction away from the longitudinal axis A1 so that the width of the vent slot 6300 increases from the first region 6330 to the second region 6340. In some forms of the technology the angled straight wall portion 6210 forms between half and two thirds of the length of the vent slot 6300.

In FIGS. 7-16, the angled straight wall portions 6210 of each vent slot 6300 are oriented at a 7.5° angle from the longitudinal axis. This may be referred to as the angle of attack. In alternate embodiments the angle of attack may be smaller or larger. For example, in the form of the technology shown in FIGS. 17-26, the angled straight wall portions 6210 of each vent slot 6300 are oriented at a 5° angle from the longitudinal axis A1. In some forms of the technology some or all of the vent slots 6300 of the vent structure 6000 may have different angles of attack from other vent slots 6300.

In any given application or location of the vent structure 6000 (for example in a connection member 7000 between an air circuit 4170 and patient interface 3000), it may have an overall size that, irrespective of how the configuration of the vent slots 6300 are varied in other forms of the vent structure 6000 in the same application or location, the vent structure has the same or similar overall size. For example, in the case of the vent structure 6000 forming part of a connection member 7000 as shown in FIGS. 7 to 38, the circumference of the connection member 7000 may be the same between different connection members 7000 having different configurations of vent slots 6300. In such circumstances the number of vent slots 6300 is linked to the angle of attack in each vent slot. In the form of the technology shown in FIGS. 7-16 the connection member 7000 comprises ten vent slots 6300 and the vent slots 6300 have an angle of attack of 7.5°. In the form of the technology shown in FIGS. 17-26 the connection member 7000 comprises 15 vent slots 6300 and the angle of attack is 5°. In other forms of the technology, the angle of attack may be reduced further, for example to 2.5°, which would allow an even greater number of vent slots 6300. As noted above it may be advantageous to have a greater number of vent slots 6300 as this increases the overall surface area presenting frictional drag to the air flow through the vent and reduces the noise of the air flow. Having a greater angle of attack results in a greater expansion of the air flow through the vent slot 6300 due to the greater increase in width and therefore also results in slowing the air flow, however there may be room for fewer vent slots. For a given circumferential size of connection member there is a trade-off between increasing the number of vent slots and having a suitable angle of attack. The angle of attack may be selected to allow a high level (for example, maximum) flow expansion through the vent slot without causing excessive flow detachment or separation from the walls of the vent slots, which as described above increases the noise of the air exiting the vent. Additionally, increasing the number of vent slots 6300 also increases the complexity of the design. This may result in difficulties in manufacturing the vent structure 6000 which in turn can lead to an increase to the cost of machining the vent structure 6000. An increase in the number of vent slots 6300 may also lead to an increased difficulty in cleaning the vent structure 6000 as each vent slot may accumulate dirt and there are more slots to clean and each is narrower so more difficult to clean. These various factors are considered when determining the design of the vent structure 6000, in particular the number of vent slots 6300 and the angle of attack of the vent slots.

In some forms of the present technology, as can be seen in FIGS. 11, 21, and 31, each partition 6200 comprises a parallel straight wall portion 6220 which is substantially parallel to the longitudinal axis A1. In the form of the technology shown in FIGS. 7-26 the parallel straight wall portion 6220 is proximate the vent outlet 6320 and positioned downstream from the angled straight wall portion 6210 along the length of the vent slot 6300. The parallel straight wall portion 6220 continues to slow down the flow of air by providing frictional/drag forces to the flow of air.

In some forms of the technology, as can be seen in FIGS. 11, 12, 21, 22, 31 and 32, each of the partitions 6200 further comprise a negatively curved portion 6230 between the first region 6330 and the second region 6340. The negatively curved portion 6230 is adjacent the first region 6330 and is at a longitudinal position upstream of the angled straight wall portion 6210. The negatively curved portion 6230 forms part of the face of the partition 6200 which forms one side of the vent slot 6300. The negatively curved portion 6230 has a relatively small negative curvature and essentially creates the angle by which the angled straight wall portion 6210 is oriented away from the longitudinal axis A1 of the vent slot 6300.

In some forms of the technology, as can be seen in FIGS. 11, 12, 21, 22, 31 and 32, each of the partitions 6200 further comprises a positively curved portion 6240 between the first region 6330 and the second region 6340. The positively curved portion 6240 may be adjacent the second region 6340 and is positioned downstream of the angled straight wall portion 6210. The positively curved portion 6240 forms part of the face of the partition 6300 which forms one side of the vent slot 6300. The positively curved portion 6240 has a relatively small positive curvature from one upstream longitudinal position to a downstream longitudinal position. The straight wall portion 6210 of each of the partitions 6200 is located between the negatively curved portion 6230 and the positively curved portion 6240.

In some forms of the technology (not illustrated), each of the partitions 6200 may comprise a curved portion extending between the first region 6330 and the second region 6340. The curved portion may comprise a convex portion and a concave portion joined together such that the curve is continuous. The point of inflection, i.e. where the curved portion changes from convex to concave, may be located at substantially midway between the first region 6330 and the second region 6340. The concave portion may be closer to the vent inlet 6310 and the convex portion may be closer to the vent outlet 6320. The gradient of the concave and convex portions may be similar to the negatively curved portion 6230 and the positively curved portion 6240 as described above and shown in FIGS. 11, 12, 21, 22, 31 and 32. This curved portion may be configured to reduce the noise of the air as it flows through the vent slots. The shape may improve the attachment of the air flow to the sides of the vent slots. This increases the frictional or drag forces acting on the air flow thereby reducing the speed of the air flow. If the air separates from the sides of the vent slots a low pressure region forms where this occurs. This creates turbulence which is one of the main sources of aero-acoustic noise. Shaping the vent slots 6300 to increase attachment of the air flow to the sides of the vent slots 6300 reduces this source of noise. In some forms of the technology each partition 6200 is configured with an arrangement of wall portions between the first region 6330 and the second region 6340 to give the inner face of the partition 6200 presented to the air flow an aerofoil-like shape.

As shown in FIGS. 7-38 the vent slots 6300 may have an initial decrease in width to create a bottleneck region 6350. The bottleneck region 6350 may be understood to be a region of the vent slot of narrowest width compared to other regions of the vent slot. In the form of the technology shown in FIGS. 7-38 the bottleneck region 6350 is located proximate to the vent inlet 6310. The portion of the partition 6200 forming the vent inlet 6310 may have a relatively small negative curvature. The bottleneck region 6350 assists in maintaining the required positive pressure in a component upstream of the vent structure 6000, for example the patient interface 3000. The bottleneck region 6350 may also assist in ensuring that water droplets from the patient's exhaled air does not block the vent slots 6300. The local decrease in width of the vent slot 6300 in the bottleneck region 6350 causes the air flow to accelerate through that region to maintain a constant flow through the vent slot 6300. This increase in speed of the air flow will assist in ensuring that water droplets do not accumulate in the vent slots 6300. In certain forms of the technology, the narrowest width of the vent slots 6300 is 0.7 mm. If the width is smaller than this the surface tension of the water droplets may cause the water droplets to block the vent slot 6300.

In the forms of the technology shown in FIGS. 7-38 adjacent partitions 6200 are formed so that the vent slots 6300 formed therebetween are substantially symmetrical along the central longitudinal axis of the vent slot A1. Also, in the forms of the technology shown in FIGS. 7-38, the shape and size of the partitions 6200 are all substantially the same. In alternative forms of the technology the partitions 6200 may be of different shapes or sizes.

5.6.2.2.2 Change in Height of the Vent Slot

As seen in FIGS. 16, 26, and 36, in certain forms of the technology, a height, H1, in the third region 6335 of each vent slot 6300 is smaller than a height, H2, in a fourth region 6345 of each vent slot 6300 where the fourth region 6345 is located downstream of the third region 6335. The height H1 may be in the range 0.5 mm to 1.5 mm. In some forms of the technology the height H1 may be 1 mm. The height H2 may be in the range 0.8 mm to 1.5 mm. In some forms of the technology the height H2 may be 1.2 mm. The height of the vent slot 6300 may be understood to be a distance between walls of the vent slot 6300 in a direction perpendicular to the width and the longitudinal axis A1 of the vent slot 6300. The height of the vent slot 6300 may span from one part of the vent housing 6100 to another, for example as mentioned above in some forms of the technology the vent housing 6100 may define upper and lower walls of each vent slot 6300. In the form of the technology shown in the FIGS. 7-38, where the vent structure 6000 is comprised as part of a connection member 7000 that is generally cylindrical in shape, the height of each vent slot 6300 is a distance in the radial direction and the increase in height amounts to a radial expansion of the vent slot 6300 or an expansion of the vent slot in the radial direction. This results in an expansion of the air flow which slows down the flow of air as described above.

In some forms of the technology, as seen in FIGS. 16, 26, and 36, each vent slot 6300 comprises an expanding height portion 6360 having an upstream end and a downstream end. The upstream end of the expanding height portion has a lesser height than the downstream end of the expanding height portion 6360. The distance between the upstream end and the downstream end of the expanding height portion 6360 may be small compared to the distance between the vent inlet 6310 and the vent outlet 6320. The relatively small distance between the upstream end and the downstream end results in a rapid change in the height which results in a rapid expansion of the air flow moving through the vent slot. This leads to a quick and effective reduction in the speed of the air flow and therefore the noise that flow generates. The expanding height portion 6360 is preferably located at or proximate a region of minimum width of the respective vent slot 6300. For example, in the form of the technology shown in FIGS. 27-36 the expanding height portion 6360 is at the same location or proximate to the bottleneck region 6350.

In some forms of the technology, as shown in FIGS. 7-36, the increase in height of the vent slot 6300, through the expanding height portion 6360 or otherwise, is due a divergence between the outer surface 7125 of the inner tube portion 7120 and the inner surface 7115 of the outer tube portion 7110 along the length of the vent slot 6300. This divergence may be achieved in a number of ways, including through a change, in the longitudinal direction, in the distance between the outer surface 7125 of the inner tube portion 7120 and the central longitudinal axis, A2, of the inner tube portion 7120 between the third region 6335 and the fourth region 6345, or a change in the distance between the inner surface 7115 of the outer tube portion 7110 and the central axis, A2, between the third region 6335 and the fourth region 6345, or a combination of changes to these distances. For example, as can be seen in FIGS. 16, 26, and 36 there is a decrease in diameter of the inner tube portion 7120 between the third region 6335 and the fourth region 6345. Additionally, there is a decrease in diameter of the outer tube portion 7110, between the third region 6335 and the fourth region 6345. The decrease in diameter of the inner surface 7115 of the outer tube portion 7110 less than the decrease in diameter of the outer surface 7125 of the inner tube portion 7120 between the third region 6335 and the fourth region 6345, which results in an increase in height of the vent slot 6300 along the vent slot. In the form of the technology shown in FIGS. 16 and 26 the outer surface 7125 of the inner tube portion 7120 in the expanding height portion 6360 is sloped at a constant angle with respect to the central axis A2. The inner surface 7115 of the outer tube portion 7110 in the expanding height portion 6360 has a negative curvature from the upstream end to the downstream end.

The inner surface 7115 of the outer tube portion 7110 may reduce in diameter along the vent slot 6300 in order to form part of a deflector 6400, as described below.

In alternative forms (not illustrated) the increase in height along the vent slot 6300 is achieved by increasing the diameter of the inner surface 7115 of the outer tube portion 7110 between the third region 6335 and fourth region 6345 whilst the inner tube portion 7120 remains unchanged. In alternative forms the increase in height along the vent slot 6300 is achieved by decreasing the diameter of the outer surface 7125 of the outer tube portion 7120 between the third region 6335 and the fourth region 6345 whilst the outer tube portion 7120 remains unchanged. In alternative forms, as described above and shown in FIGS. 16, 26, and 36, the change in height is achieved by a combination of a change in the inner tube portion 7120 and the outer tube portion 7110. In other forms of the technology, the increase in height of the vent slot is due to some other change in the shape of the vent housing 6100 which causes the vent slot to increase in height. For example, the outer surface 7125 of the inner tube portion 7120 may have a positive curvature with a gradient that forms an increase in height between the third region 6335 and the fourth region 6345. In other forms both the inner surface 7115 of the outer tube portion 7110 and the outer surface 7125 of the inner tube portion 7120 may be sloped at a constant angle with respect to the central axis A2, the inner surface 7115 having a shallower gradient than that of the outer surface 7125 to form an increase in height between the third region 6335 and the fourth region 6345.

In some forms of the technology, as shown in FIGS. 16, 26, and 36, after the expanding height portion 6360 the vent slot 6300 decreases in height until its height is the same as the initial height of the vent slot 6300. It will be appreciated how this decrease in height of the vent slot 6300 may be achieved using any one or more of the different ways to vary the height of the vent slot 6300 along its length discussed above in the context of an increase in the height of the vent slot 6300. In some forms, the vent slots 6300 have substantially the same height at the vent outlet 6320 compared to the vent inlet 6310. In such forms, the fourth region 6345 is not located at or closely proximate to the vent outlet 6320, i.e. there is a portion of the vent slot 6300 between the fourth region 6345 and the vent outlet 6320.

5.6.2.2.3 Acoustic Attenuation Chamber

In the forms of the technology shown in FIGS. 7-36, the vent structure 6000 is formed such that each vent slot 6300 comprises a chamber 6370 arranged to, in use, reflect sound waves and attenuate the sound of a flow of air through the respective vent slot 6300. In other forms of the technology (not shown), the vent structure 6000 may be formed such that each vent slot 6300 comprises more than one chamber 6370. In some forms two chambers 6370 may reduce the noise associated with air flowing through the vent more than one chamber. The two chambers may be longitudinally separated in the vent slot 6300 by a portion of the slot having a smaller height than each chamber.

The chamber 6370 may be formed as an enlarged region of the vent slot 6300, for example a region having a greater height and/or width than adjacent regions of the vent slot 6300. For example, in the forms of the technology shown in FIGS. 7-36, the chamber 6370 is formed at or proximate fourth region 6345, where the vent slot 6300 has an increased height compared to another region of the vent slot. Also in these forms the expanding height portion 6360 of the vent slot 6300 may form part of the chamber 6370. In the forms of the technology shown in FIGS. 7-36, the chamber 6370 is formed partially by the deflector 6400 as described below.

The chamber 6370 may be a form of acoustic attenuation chamber. The acoustic attenuation chamber reduces the noise of the air flow. In use, acoustic waves created by the air flowing through the vent slot reflect off the walls of the chamber 6370 and can interfere with other acoustic waves. For example, the acoustic chamber 6370 in the exemplary forms of the technology illustrated has an upper wall at an angle of approximately 150 to 200 from the axis of the tube portion A2. Interference of the acoustic waves reflected off this wall with the source of the acoustic waves (for example those generated on the lower wall) may result in the cancellation of some of the acoustic waves at certain wavelengths or frequencies. This will assist in reducing the noise of the air flow in the vent structure 6000.

In the forms of the technology shown in FIGS. 16, 26, and 36 at least a part of the chamber 6370, or walls forming part thereof, is formed to have a concave shape. This shape may increase the amount of interference of the acoustic waves and promote greater acoustic attenuation compared to a non-concave form.

An increased steepness of the walls of the chamber 6370 (i.e. the angle of the walls of the chamber 6370 relative to central axis A2) results in a more drastic change in the direction of the air flow compared to forms of the technology with shallower such angles. This enhances the acoustic attenuation effects of the chamber and reduces the flow velocity. In some forms of the technology, this may be achieved by providing a relatively steep outer surface 7125 of the inner tube portion 7120 and/or a relatively steep inner surface 7115 or the outer tube portion 7110. The need to balance this consideration against the advantages of a compact design may limit the steepness that the walls of the chamber 6370 are given in practice.

In the form of the technology shown in FIG. 43, an alternative form of an acoustic attenuation chamber is shown with a vent slot 6300 having a chamber 6370 with a substantially square cross-section, the square having rounded corners. This shape increases the steepness of the walls of the chamber 6370 compared to those in the forms of the technology discussed above. A portion of the outer surface 7125 and the inner surface 7115 are perpendicular to the central axis A2. This results in a more drastic change in the direction of the air flow with the air flow turning 90° in two places within the chamber 6370 and assists in reducing the velocity of the air flow.

In some forms of the technology the inlet 6371 to the chamber 6370 is offset from the outlet 6372 to the chamber 6370. The offset between the inlet 6371 and the outlet 6372 results in a vent slot 6300 that is not straight, i.e. one longitudinal section of the vent slot 6300 has an axis that is offset from the axis of another longitudinal section of the vent slot 6300. This assists in preventing noise generated upstream of the chamber 6370 propagating downstream of the chamber 6370. If the inlet 6371 and the outlet 6372 are offset any acoustic waves travelling through the vent slots 6300 are more likely to encounter at least a portion of a wall of the vent slot 6300 which may result in interference of the acoustic waves as discussed above and therefore a reduction in noise.

In the forms of the technology shown in FIGS. 7-36, and 59 the inlet 6371 is radially offset from the outlet 6372. For example, as shown in FIGS. 16, 26, 36, and 59 the outlet 6372 may be closer to the central axis A2 than the inlet 6371. In other forms of the technology the outlet 6372 may be further from the central axis A2 than the inlet 6371. In other forms of the technology (not illustrated) the inlet 6371 to the chamber 6370 may be circumferentially offset from the outlet 6372 to the chamber 6370. In other forms of the technology (not illustrated) the inlet 6371 to the chamber 6370 may be both circumferentially and radially offset from the outlet to the chamber 6370. This configuration may further reduce the velocity of the air flow as it increases further the chance of the sound waves contacting a portion of the wall of the vent slot 6300. Having the inlet 6371 of the chamber 6370 radially offset from the outlet 6372 of the chamber 6370 may be easier to tool than having it circumferentially offset.

In the form of the technology shown in FIGS. 23-30, the chamber 6370 is located at or proximate the longitudinal position along the vent slot 6300 where the vent slot 6300 has the smallest width, i.e. the bottleneck region 6350. In these forms, this position is proximate the vent inlet 6310. In the forms of the technology shown in FIGS. 7-26, the chamber 6370 is located close to the vent outlet 6320. Locating the chamber 6370 closer to the vent inlet 6310 has, in some forms, been found to result in an increased noise reduction compared to forms of the technology where the chamber is located at a longitudinal position along the vent slot 6300 further from the vent inlet 6310. Such a location may position the chamber 6370 proximate the location of maximum air flow velocity through the vent slot 6300. As the chamber 6370 significantly changes the direction of air flow in the direction perpendicular to the flow, locating the chamber 6370 at or proximate this point may significantly reduce the velocity of the air flow. Locating the chamber 6370 closer to the vent inlet 6310 and having an increase in the width of the vent slot 6300 in a region of the vent slot 6300 after the chamber 6370 may reduce flow separation, i.e. the air flow is better attached downstream of the chamber 6370. A reduction in flow separation reduces the noise associated with the air flow through the vent as described above. Locating the chamber 6370 closer to the vent inlet 6310 decreases the velocity of the air flow prior to the increase in width of the vent slot 6300. A slower flow of air may result in better flow attachment to the side walls of the vent slot 6300 when the flow expands. As discussed herein, this further reduces the speed of the air flow due to the increased frictional forces acting on the flow of air.

In FIGS. 27-36 the chamber 6370 is followed by a section of the vent slot 6300 which increases in width as described above. In other forms of the technology, downstream of the chamber 6370 the vent slot 6300 has a constant width and height. This section of the vent slot 6300 slows down the speed of the air flow further and decreases the extent of flow separation at the vent outlet 6320. This section may be formed by a parallel straight wall portion 6220 as described above.

5.6.2.3 Deflector

In certain forms of the technology the vent structure 6000 comprises a plurality of deflectors 6400 configured to deflect the flow of air through each vent slot 6300 towards a part of the vent housing 6100 and/or another component in the respiratory system. In the forms of the technology shown in FIGS. 7-36, each vent slot 6300 has a respective deflector 6400 to deflect the flow through that respective vent slot 6300.

The deflector 6400 in each vent slot 6300 may be a wall of the vent slot 6300, or a separate component positioned in the path of the air flow through the vent slot 6300, positioned and arranged at an angle to the general direction of the air flow through the vent to cause the air flow to change direction when it contacts the deflector 6400. The deflector 6400 acts as a brake to slow down the flow through friction caused by the flow contacting the deflector 6400.

Each deflector 6400 is positioned and arranged to cause the exiting air flow to flow against a component downstream of the deflector 6400 and, in some forms of the technology, a component downstream of the vent outlet 6320. That downstream component may be another part of the vent structure 6000 or another part of the respiratory system. If the air exiting the vent outlet 6320 is directed towards another component, that component will apply frictional or drag forces to the flow of air, reducing the speed of the flow of air, and therefore the level of noise it creates. Directing the flow of air exiting the vent outlet 6320 towards a component that is, for example part of the vent structure 6000 or respiratory system, will also reduce jets of air being directed towards, and therefore disturbing, the patient 1000 or the bed partner 1100. Additionally, a reduction in the speed of the air flow will also reduce the disruptions to the patient 1000 or bed partner 1100.

The plurality of deflectors 6400 may be provided to, for example formed on or connected to, an inner surface 6110 of the vent housing 6100. In the form of the technology shown in FIGS. 7-38 the inner surface 7115 of the outer tube portion 7110 has a positive curvature which forms the deflector 6400 by presenting a surface in the path of the flow of air that is at an angle to the general direction of air flow towards the surface. The inner surface 7115 of the outer tube portion 7110 curves in a direction radially inwardly, i.e. towards the central axis A2. As the flow of air contacts, the deflector it also changes in direction radially inwardly towards the central axis A2. In some forms of the technology the curve of the inner surface 7115 of the outer tube portion 7110 may have a larger positive curvature compared to the forms of the technology shown in the Figures, i.e. the curve may have a steeper portion, to change the direction of the flow more rapidly or further upstream. The deflector 6400 may have an angle with respect to the longitudinal axis of the vent slot, A1, of between 5-10°.

In the form of the technology shown in FIGS. 15 and 25, the deflectors 6400 are formed by the inwardly curving inner surface 7115 of the outer tube portion 7110. This part of the inner surface 7115 of the outer tube portion 7110 may also form part of the expanding height portion 6360 and the acoustic attenuation chamber 6370 as described above. That is, the same part of the vent structure 6000 may serve multiple purposes.

In the form of the technology shown in FIGS. 27-36, each deflector 6400 is located at a longitudinal position within one of the vent slots 6300 where the respective vent slot 6300 has minimum width, i.e. the deflector 6400 is located at the bottleneck region 6350. For example, each deflector 6400 may be positioned at a position along the length of each vent slot 6300 proximate the vent inlet 6310.

In the form of the technology shown in FIGS. 17 to 26 the downstream component that the air flow is deflected towards is the outer surface 7125 of the inner tube portion 7120 downstream of the deflector 6400 and/or the air circuit 4170 connected to the inner tube portion 7120 in use (not shown in the figures). The deflectors 6400 in this example may act to direct air towards the air circuit 4170 because they are located proximate the vent outlet 6320. In the form of the technology shown in FIGS. 7-16, the downstream component that the air flow is deflected towards is a portion of the connection member 7000, in this example the outer surface 7125 of the inner tube portion 7120, that is located downstream of the vent outlet 6320. The deflectors 6400 in this example may act to direct air towards these components because the deflectors 6400 are located adjacent the vent outlet 6320 and a portion of the inner tube portion 7120 extends from the vent outlet 6320. In the form of the technology shown in FIGS. 27-36, the downstream component that the air is deflected towards is the outer surface 7125 of the inner tube portion 7120 within the vent slot 6300. The deflectors 6400 are located at a longitudinal position in the vent slot 6300 closer to the vent inlet 6310 than the vent outlet 6320, for example approximately one-third along the length of the vent slots 6300. In other forms of the technology (not illustrated), the deflector may be configured to deflect the air flow towards the partitions 6200 forming the vent slots 6300 or the inner surface 7115 of the outer tube portion 7110.

In the form of the technology shown in FIGS. 7-36 the connection member 7000 comprises a step down region 7130 formed in a region of the tube portion 7100. In the step down region 7130 the diameter of the connection member 7000 decreases from one part of the connection member 7000 to a longitudinally adjacent part of the connection member 7000. In the form of technology shown in these figures, the distance between the central axis, A2, and both the inner surface 7115 of the outer tube portion 7110 and the outer surface 7125 of the inner tube portion 7120 decreases between longitudinally adjacent parts of the connection member 7000. For example, in the forms of the technology shown in FIGS. 15, 25, and 35 the vent structure 6000 is formed such that a radial distance, D1, of the outer surface 7125 of the inner tube portion 7120 at the vent inlet 6310 from the central axis A2 is greater than a radial distance, D2, of the outer surface 7125 of the inner tube portion 7120 from the central axis A2 at the vent outlet 6320. The distance, D2, may be varied to suit the diameter of the air circuit 4170. The distance, D1, may be in the range of 0.3-0.7 mm greater than the distance D2. In some forms of the technology the distance D1 may be 0.5 mm greater than the distance D2. The step down region 7130 may comprise the same region of the connection member 7000, or be comprised of the same components, as form the expanding height portion 6360 and the acoustic attenuation chamber 6370, as described above, and may contribute to forming these features.

The step down region 7130 may be formed by the outer surface 7125 of the inner tube portion 7120 comprising a radially inward step 7131 having an upstream end 7132 and a downstream end 7133, wherein the upstream end 7132 of the radially inwards step 7131 is at a greater radial distance from the central axis than the downstream end 7133 of the radially inward step 7131. In the forms of the technology shown in FIGS. 7-36 the radially inward step also contributes to forming an acoustic attenuation chamber 6370 (as described above) between the upstream end 7132 and the downstream end 7133. The radially inward step may also contribute to an offset between the inlet 6371 and the outlet 7372 of the acoustic attenuation chamber 6370 (as discussed above). In the forms of the technology shown in FIGS. 7-36 the radially inward step contributes to forming the expanding height portion 63600. As described above this is formed by a region of the outer surface 7125 of the inner tube portion 7120 sloped at a constant angle with respect to the central axis A2 and a region of the inner surface 7115 of the outer tube portion 7110 with a negative curvature.

In certain forms of the technology, such as shown in FIGS. 7-36, the step down region 7130 also comprises the deflector 6400 where the inner surface 7115 of the outer tube portion 7110 curves towards the central axis A2.

As noted above, in the form of the technology shown in FIGS. 27-36 the step down region 7130 is located where the width of the vent slots 6300 is smallest, i.e. at the bottleneck region 6350. In other forms of the technology, as shown in FIGS. 7-26, the step down 7130 may be located at another longitudinal position along the tube portion 7100, for example where the width of the vent slot 6300 is widest.

The step down region 7130 may form, or contribute to forming, a number of the sound reducing features already described, including any one or more of the expanding height portion 6360, the acoustic attenuation chamber 6370 and the deflector 6400.

In the forms of the technology shown in FIGS. 25 and 35 the walls of the inner tube portion 7120 and the outer tube portion 7110 have substantially a constant thickness along the length of the connection member 7000. As a result, at the step down region 7130 there is both a decrease in diameter of the inner and outer surfaces of the outer tube portion 7110 and the inner tube portion 7120.

In the form of the technology shown in FIG. 15, at the step down region 7130 there is a decrease in diameter of the inner tube portion 7120 but the diameter of the inner surface of the inner tube portion 7120 remains constant along the length of the connection member 7000. This may deter turbulence in the air passing through the inner tube portion 7120 from the air circuit 4170 to the patient interface 3000.

In other forms of the technology the outer surface of the outer tube portion 7110 may maintain a constant diameter along the length of the connection member 7000.

In other words, any bend or change in orientation of the vent slots 6300 may, in some forms of the technology, also be associated with corresponding bends or changes in direction of the outer and inner surfaces of the respective tube portions forming the vents slots 6300 while, in other forms of the technology, the bends or changes in orientation of the vent slots 6300 are internal features only and the outer surfaces of the respective tube portions have a constant diameter along their length, or have some other shape or configuration that is not sympathetic to the shape of the vent slots 6300. Generally speaking, thicker walls of components such as tube portions results in greater weight. A lighter tube portion 7100 will result in a lighter connection member 7000. A lighter connection member 7000 may be more comfortable for the patient 1000 and may be cheaper to manufacture if it has less material.

In some forms of the technology the deflectors 6400 result in the air flow exiting the vent flowing in adjacent the outer surface of the air circuit 4170 and in a direction that is along (i.e. parallel to) the outer surface of the air circuit 4170. This may either be because the deflectors are located adjacent the air circuit 4170 or because the outer surface of the connection member 7000 or inner tube portion 7120 is aligned with the outer surface of the air circuit 4170. The air circuit 4170 may be formed from a flexible tube that can bend during use. In some forms the Coanda effect may act to assist in ensuring that the air flow attaches to the air circuit even if the tube is bent. If there is a bend in the tube the air flowing along the outer curve of the bend will continue to follow the tube under the Coanda effect rather than continuing along a straight path in a direction away from the tube. This effect provides a number of advantages. It helps to avoid air flowing towards the patient 1000 or bed partner 1100 as the flow of air exiting the vent 3400 tends to stay attached to the outer surface of the air circuit 4170. The attachment of the flow to the outer surface of the air circuit 4170 where it is subject to friction from the air circuit 4170 also helps to further slow down the flow of air, reducing noise.

5.6.2.4 Projecting Portion

In one form of the technology shown in FIGS. 37 and 38, the vent structure 6000 further comprises a projecting portion 6500 structured and arranged to inhibit generation of shear layer instabilities in air flowing out of the vent outlet 6320. The projecting portion 6500 extends outwardly from the vent outlet 6320 so that the projecting portion 6500 presents a surface to the path of air flowing out of the vent outlet 6320. More particularly, the projecting portion 6500 extends outwardly from a part of the connection member that forms, or is adjacent to, the vent outlet 6320. As the flow of air exits the vent outlet 6320 the mixing between the warmer air exiting the vent and the colder ambient air causes shear layer instabilities, or turbulent mixing. The projecting portion 6500 assists in hindering air exiting the vent outlet 6320 from mixing directly with the ambient air. This reduces the shear layer instabilities and therefore the noise caused by air exiting the vent outlet 6320. The projecting portion 6500 may be more effective where the ambient air is cold and the difference in temperature between the air exiting the vent outlet 6320 and the ambient air is greater.

In the example shown in FIGS. 37 and 38 the projecting portion 6500 comprises an annular projection extending from the outer tube portion 7110, for example from the second end portion of the outer tube portion 7110 (the second end portion being opposite to the first end portion that connects to the patient interface 3000). In the example shown the projecting portion 6500 extends around the entire circumference of an end portion of the outer tube portion 7110. In some forms of the technology (not illustrated) there may be several projection portions 6500 which extend from different regions of the outer tube portion 7110, rather than a single annular projection.

In the forms of the technology shown in FIGS. 37 and 38 the projecting portion extends in a direction substantially parallel to the longitudinal axis, A1, of an adjacent vent slot 6300 (not shown). In these forms, the projecting portion 6500 comprises one or more first portions 6510 extending at a first length, L1, from the vent outlet 6320 and one or more second portions 6520 extending at a second length, L2, from the vent outlet 6320, the first length, L1, being less than the second length, L2. For example, as is the case with the form of projecting portion 6500 illustrated, a distal end of the projecting portion 6500 comprises a wave-shaped profile when viewed from a direction perpendicular to the plane in which the projecting portion 6500 extends from the vent outlet 6320. In certain forms, the wave-shaped profile is a sinusoidal wave which is particularly effective for reducing turbulent mixing of cold ambient air and the warmer air exiting the vents to reduce shear layer instabilities.

In the form of the technology shown in FIGS. 37 and 38, the projecting portion 6500 also comprises a negatively curved edge 6530 adjacent the exiting air flow. The negatively curved edge 6530 is formed at the distal end of the projecting portion 6500 on its inner edge, i.e. between the side of the projecting portion 6500 facing radially inwards towards the flow of air exiting the vent outlet 6320 and the end face of the projecting portion 6500. This creates a surface adjacent the air flow that is curved or rounded, e.g. in the form of a fillet edge. The negatively curved edge 6530 may act to further reduce shear layer instabilities. The negatively curved edge 6530 may reduce the flow separation of the warmer air exiting the vent that expands or flows in a direction perpendicular to the axis A2, thereby preventing mixing of the warmer air with the colder ambient air.

In other forms of the technology, the shape of the projecting portion 6500, including the size and shape of the wave-shaped profile, may be different. In some examples the wave shapes may be shallower or deeper, i.e. the difference between the first length, L1, and the second length, L2, may be greater or less than that shown in FIGS. 37 and 38. In other examples, the profile may be formed from a shape that instead of being wave-shaped is a series of triangular, square, or rectangular shapes formed by the projecting portion 6500 extending various lengths from the outer tube portion 7110.

5.6.2.5 Noise Reduction Testing

Testing of the form of the technology shown in FIGS. 7-16 has shown that the illustrated vent structure results in air flow slowing down to a speed of 6 m/s within a distance of 55 mm downstream of the vent outlet 6320 when used with a respiratory system with a patient undergoing CPAP therapy under typical conditions. The illustrated design also demonstrated a decay in acoustic power which decreases to 1e-12 W (the lowest sound level a person with good hearing can discern) within 80 mm downstream of the vent outlet 6320.

5.6.2.6 Alternative Forms of Providing the Vent Structure to the Connection Member The forms of the technology illustrated in FIGS. 7-38 are all connection members having an overall cylindrical symmetry. In other forms of the technology (not illustrated) the connection member 7000 and the vent structure 6000 may have a different configuration to that shown in the figures. In some examples, the tube portion 7100 of the connection member 7000 may be formed as a single hollow cylindrical shape and the vent structure 6000 may be provided to a region of the outer surface of the tube portion 7100 where that region does not span the entire outer circumference of the tube portion 7100. That is, the vent structure 6000 may, in some forms, be provided to one side of the tube portion 7100. In such examples, the plurality of partitions 6200 may be arranged generally in a part-cylindrical geometry or they may be arranged in a planar geometry. In such forms, the vent housing 6100 may be partly formed by the outer surface of the tube portion 7100 and may comprise a vent covering to enclose the plurality of partitions 6200 that form the vent slots 6300.

In some examples the axis A1 of the vent slots 6300 may not be parallel to the longitudinal central axis A2 of the connection member 7000. For example, the vent slots 6300 may be oriented on the tube portion 7100 to direct the flow of air exiting the vent outlet 6320 in a certain direction that, during typical use of the connection member 7000, may be likely to be away from the patient 1000 or bed partner 1100.

5.6.3 Patient Interface

The preceding sections describe forms of the technology where the vent 3400 in the respiratory system is formed in, or as part of, a connection member 7000 connecting the air circuit 4170 to the patient interface 3000. In other forms of the technology, the vent 3400 may be comprised as part of another part of the respiratory system. When comprised in other parts of the respiratory system, the vent 3400 may include many of the same, or similar features to those described above. While the following paragraphs describe some features of exemplary vents 3400 formed as part of a patient interface 3000 and a positioning and stabilising structure 3300, it will be understood that any one or more of the features of a vent 3400 described above in the context of a connection member 7000 may be part of a vent 3400 forming part of a patient interface 3000 or a positioning and stabilising structure 3300, where suitable.

In some forms of the technology, a patient interface 3000 comprising a plenum chamber 3200 and a seal-forming structure 3100 as described above may further comprise a vent structure 6000. The vent structure 6000 allows a continuous flow of gases exhaled by the patient 1000 from an interior of the plenum chamber to ambient. The vent structure 6000 is sized and shaped to maintain the therapeutic pressure in the plenum chamber 3200 in use. The vent structure 6000 may comprise a vent housing 6100 and a plurality of partitions 6200 forming a plurality of vent slots 6300. In these forms, the vent structure 6000 may be structured and arranged in a form that is specifically adapted to the geometry of the patient interface 3000. The vent structure 6000 may comprise at least one of the noise reduction features, i.e. the increase in cross-sectional area, the deflector, or the projecting portion, as described above.

In some forms of the technology the vent structure 6000 is provided to a portion of the plenum chamber 3200, for example a portion that is on an anterior side of the plenum chamber 3200 when the patient interface 3000 is donned by a patient 1000. The vent structure 6000 may comprise a vent housing 6100 provided to the surface of the plenum chamber 3200 and vent slots 6300 that are arranged side-by-side and adopt a similar geometry to the surface of the plenum chamber 3200 proximate the vent structure 6000. The outer surface of the plenum chamber 3200 may form part of the vent housing 6100. The vent housing 6100 and the vent slots 6300 may be configured to follow the general shape, i.e. curvature, of the plenum chamber 3200. In some forms of the technology the vent structure 6000 may be provided to a central region of the plenum chamber 3200 and in alternative embodiments it may be located in a peripheral region of the plenum chamber 3200.

It has previously been described that the vent structure 6000 may comprise a plurality of deflectors 6400 configured to deflect the flow of air through each vent slot 6300 towards a part of the vent housing 6100 and/or another component in the respiratory system. In forms of the technology where the vent structure 6000 forms part of the patient interface 3000, the downstream component that the air flow is deflected towards may be part of the plenum chamber 3200, part of the air circuit 4170 or part of a component connecting the air circuit 4170 to a connection port 3600 in the patient interface 3000, for example an elbow.

5.6.4 Conduit Headgear

In some forms of the technology, a positioning and stabilising structure 3300 is configured to provide a force to hold a seal-forming structure 3100 in a therapeutically effective position on a patient's head in use. The positioning and stabilising structure 3300 comprises at least one gas delivery tube being constructed and arranged to contact at least a region of the patient's head superior to an otobasion superior of the patient's head. An end of the at least one gas delivery tube is configured to fluidly connect to a plenum chamber 3200. The positioning and stabilising structure 3300 further comprises a connection port to receive a flow of air from an air circuit 4170 and to deliver the flow of air to the entrance of the patient's airways via the seal-forming structure 3100, wherein the connection port is provided to a portion of the gas delivery tube superior to the otobasion superior of the patient's head. The positioning and stabilising structure 3300 further comprises a vent structure 6000 comprising a vent housing 6100 and a plurality of partitions 6200 forming a plurality of vent slots 6300. The vent structure 6000 preferably comprises at least one of the noise reduction features described above, i.e. the increase in cross-sectional area, the deflector, or the projecting portion, adapted into a form that is suitable within the overall arrangement and geometry of a vent structure in a positioning and stabilising structure 3300.

In certain forms, the vent structure 6000 may be comprised as part of a gas delivery tube in a positioning and stabilising structure 3300 and have a similar configuration to the connection member 7000 described above. In such forms, the outer tube portion 7110 and the inner tube portion 7120 may be configured to connect to upstream and downstream portions of the gas delivery tube respectively. In some forms of the technology the vent slots 6300 may be provided to a side of the connection member 7000 that faces away from the patient's face in use and a side of the connection member 7000 facing towards the patient's face in use has no vent slots 6300. In alternative forms of the technology, the vent structure 6000 may be provided to a region of the outer surface of the gas delivery tube.

The vent outlet 6320 may have a corresponding outlet in the positioning and stabilising structure 3300 to allow the flow of air to exit into the surrounding ambient air. In some forms of the technology, the outlet in the positioning and stabilising structure may be a hole or a plurality of holes in the region where the vent outlet 6320 is located. In other forms of the technology, the outlet in the positioning and stabilising structure may be a region with a reduced thickness, for example with only a thin layer of material, where the vent outlet 6320 is located.

In some forms of the technology the vent structure 6000 may be provided to a portion of the gas delivery tube that is positioned over the cheek region of the patient's face in use. This may reduce the amount of deadspace in the system by reducing the distance between the vent structure 6000 and the patient's mouth/nose where the air is exhaled compared to forms of the technology in which the vent structure 6000 is provided to a portion of the gas delivery tube further from the patient's mouth/nose, for example a portion positioned superior to the otobasion superior in use.

It has previously been described that the vent structure 6000 may comprise a plurality of deflectors 6400 configured to deflect the flow of air through each vent slot 6300 towards a part of the vent housing 6100 and/or another component in the respiratory system. In forms of the technology where the vent structure 6000 forms part of a positioning and stabilising structure 3300, as described above, the downstream component that the air flow is deflected towards may be another part of the positioning and stabilising structure 3300, for example a part of the gas delivery tube that is positioned in use superior to the vent structure 6000.

5.6.5 Split Venting

In some forms of the technology in addition to the vent 3400 constructed and arranged to allow for the washout of exhaled gases there may be a further second vent (not illustrated) configured to vent air received from the RPT device 4000 before the air is received by the patient 1000. The second vent may be configured and arranged to reduce the flow rate of air from the RPT device 4000 that is received by the patient 1000 whilst maintaining the pressure of the flow of air to the patient 1000. The second vent may be at a different location in the respiratory therapy system to vent 3400.

In some forms of the technology the second vent may be located along the air circuit 4170. In forms in which both the vent 3400 and the second vent are located along the air circuit 4170, the second vent may be provided to the air circuit 4170 at a different location to vent 3400, for example the second vent may be located on the air circuit 4170 at a distance closer to the RPT device 4000 than vent 3400.

In some forms of the technology the second vent may be in the form of a vent structure 6000 according to any of the forms of technology as described above. In some forms of the technology the vent structure may be in the form of a connection member 7000 as described above. The connection member 7000 may be provided to the air circuit 4170 such that the connection member 7000 is connected at respective ends to upstream and downstream sections of the air circuit 4170. The air circuit 4170 and the connection member 7000 may be connected in a similar manner as described above.

5.7 Humidifier 5.7.1 Humidifier Overview

In one form of the present technology there is provided a humidifier 5000 (e.g. as shown in FIG. 5A) to change the absolute humidity of air or gas for delivery to a patient relative to ambient air. Typically, the humidifier 5000 is used to increase the absolute humidity and increase the temperature of the flow of air (relative to ambient air) before delivery to the patient's airways.

The humidifier 5000 may comprise a humidifier reservoir 5110, a humidifier inlet 5002 to receive a flow of air, and a humidifier outlet 5004 to deliver a humidified flow of air. In some forms, as shown in FIG. 5A and FIG. 5B, an inlet and an outlet of the humidifier reservoir 5110 may be the humidifier inlet 5002 and the humidifier outlet 5004 respectively. The humidifier 5000 may further comprise a humidifier base 5006, which may be adapted to receive the humidifier reservoir 5110 and comprise a heating element 5240.

5.8 Breathing Waveforms

FIG. 6A shows a model typical breath waveform of a person while sleeping. The horizontal axis is time, and the vertical axis is respiratory flow rate. While the parameter values may vary, a typical breath may have the following approximate values: tidal volume Vt 0.5 L, inhalation time Ti 1.6 s, peak inspiratory flow rate Qpeak 0.4 L/s, exhalation time Te 2.4 s, peak expiratory flow rate Qpeak −0.5 L/s. The total duration of the breath, Ttot, is about 4 s. The person typically breathes at a rate of about 15 breaths per minute (BPM), with Ventilation Vent about 7.5 L/min. A typical duty cycle, the ratio of Ti to Ttot, is about 40%.

5.9 Respiratory Therapy Modes

Various respiratory therapy modes may be implemented by the disclosed respiratory therapy system.

5.10 Glossary

For the purposes of the present technology disclosure, in certain forms of the present technology, one or more of the following definitions may apply. In other forms of the present technology, alternative definitions may apply.

5.10.1 General

Air: In certain forms of the present technology, air may be taken to mean atmospheric air, and in other forms of the present technology air may be taken to mean some other combination of breathable gases, e.g. atmospheric air enriched with oxygen.

Ambient: In certain forms of the present technology, the term ambient will be taken to mean (i) external of the treatment system or patient, and (ii) immediately surrounding the treatment system or patient.

For example, ambient humidity with respect to a humidifier may be the humidity of air immediately surrounding the humidifier, e.g. the humidity in the room where a patient is sleeping. Such ambient humidity may be different to the humidity outside the room where a patient is sleeping.

In another example, ambient pressure may be the pressure immediately surrounding or external to the body.

In certain forms, ambient (e.g., acoustic) noise may be considered to be the background noise level in the room where a patient is located, other than for example, noise generated by an RPT device or emanating from a mask or patient interface. Ambient noise may be generated by sources outside the room.

Automatic Positive Airway Pressure (APAP) therapy: CPAP therapy in which the treatment pressure is automatically adjustable, e.g. from breath to breath, between minimum and maximum limits, depending on the presence or absence of indications of SDB events.

Continuous Positive Airway Pressure (CPAP) therapy: Respiratory pressure therapy in which the treatment pressure is approximately constant through a respiratory cycle of a patient. In some forms, the pressure at the entrance to the airways will be slightly higher during exhalation, and slightly lower during inhalation. In some forms, the pressure will vary between different respiratory cycles of the patient, for example, being increased in response to detection of indications of partial upper airway obstruction and decreased in the absence of indications of partial upper airway obstruction.

Flow rate: The volume (or mass) of air delivered per unit time. Flow rate may refer to an instantaneous quantity. In some cases, a reference to flow rate will be a reference to a scalar quantity, namely a quantity having magnitude only. In other cases, a reference to flow rate will be a reference to a vector quantity, namely a quantity having both magnitude and direction. Flow rate may be given the symbol Q. 'Flow rate' is sometimes shortened to simply 'flow' or 'airflow'.

Flow therapy: Respiratory therapy comprising the delivery of a flow of air to an entrance to the airways at a controlled flow rate referred to as the treatment flow rate that is typically positive throughout the patient's breathing cycle.

Humidifier: The word humidifier will be taken to mean a humidifying apparatus constructed and arranged or configured with a physical structure to be capable of providing a therapeutically beneficial amount of water ($H_2O$) vapour to a flow of air to ameliorate a medical respiratory condition of a patient.

Leak: The word leak will be taken to be an unintended flow of air. In one example, leak may occur as the result of an incomplete seal between a mask and a patient's face. In another example leak may occur in a swivel elbow to the ambient.

Noise, conducted (acoustic): Conducted noise in the present document refers to noise which is carried to the patient by the pneumatic path, such as the air circuit and the patient interface as well as the air therein. In one form, conducted noise may be quantified by measuring sound pressure levels at the end of an air circuit.

Noise, radiated (acoustic): Radiated noise in the present document refers to noise which is carried to the patient by the ambient air. In one form, radiated noise may be quantified by measuring sound power/pressure levels of the object in question according to ISO 3744.

Noise, vent (acoustic): Vent noise in the present document refers to noise which is generated by the flow of air through any vents such as vent holes of the patient interface.

Patient: A person, whether or not they are suffering from a respiratory condition.

Pressure: Force per unit area. Pressure may be expressed in a range of units, including $cmH_2O$, g-f/cm$^2$ and hectopascal. 1 $cmH_2O$ is equal to 1 g-f/cm$^2$ and is approximately 0.98 hectopascal (1 hectopascal=100 Pa=100 N/m$^2$=1 millibar ~0.001 atm). In this specification, unless otherwise stated, pressure is given in units of $cmH_2O$.

The pressure in the patient interface is given the symbol Pm, while the treatment pressure, which represents a target value to be achieved by the interface pressure Pm at the current instant of time, is given the symbol Pt.

Respiratory Pressure Therapy (RPT): The application of a supply of air to an entrance to the airways at a treatment pressure that is typically positive with respect to atmosphere.

Ventilator: A mechanical device that provides pressure support to a patient to perform some or all of the work of breathing.

5.10.1.1 Materials

Silicone or Silicone Elastomer: A synthetic rubber. In this specification, a reference to silicone is a reference to liquid silicone rubber (LSR) or a compression moulded silicone rubber (CMSR). One form of commercially available LSR is SILASTIC (included in the range of products sold under this trademark), manufactured by Dow Corning. Another manufacturer of LSR is Wacker. Unless otherwise specified to the contrary, an exemplary form of LSR has a Shore A (or Type A) indentation hardness in the range of about 35 to about 45 as measured using ASTM D2240.

Polycarbonate: a thermoplastic polymer of Bisphenol-A Carbonate.

5.10.2 Respiratory Cycle

Apnea: According to some definitions, an apnea is said to have occurred when flow falls below a predetermined threshold for a duration, e.g. 10 seconds. An obstructive apnea will be said to have occurred when, despite patient effort, some obstruction of the airway does not allow air to flow. A central apnea will be said to have occurred when an apnea is detected that is due to a reduction in breathing effort, or the absence of breathing effort, despite the airway being patent. A mixed apnea occurs when a reduction or absence of breathing effort coincides with an obstructed airway.

Breathing rate: The rate of spontaneous respiration of a patient, usually measured in breaths per minute.

Duty cycle: The ratio of inhalation time, Ti to total breath time, Ttot.

Effort (breathing): The work done by a spontaneously breathing person attempting to breathe.

Expiratory portion of a breathing cycle: The period from the start of expiratory flow to the start of inspiratory flow.

Flow limitation: Flow limitation will be taken to be the state of affairs in a patient's respiration where an increase in effort by the patient does not give rise to a corresponding increase in flow. Where flow limitation occurs during an inspiratory portion of the breathing cycle it may be described as inspiratory flow limitation. Where flow limitation occurs during an expiratory portion of the breathing cycle it may be described as expiratory flow limitation.

Types of flow limited inspiratory waveforms:
(i) Flattened: Having a rise followed by a relatively flat portion, followed by a fall.
(ii) M-shaped: Having two local peaks, one at the leading edge, and one at the trailing edge, and a relatively flat portion between the two peaks.
(iii) Chair-shaped: Having a single local peak, the peak being at the leading edge, followed by a relatively flat portion.
(iv) Reverse-chair shaped: Having a relatively flat portion followed by single local peak, the peak being at the trailing edge.

Hypopnea: According to some definitions, a hypopnea is taken to be a reduction in flow, but not a cessation of flow. In one form, a hypopnea may be said to have occurred when there is a reduction in flow below a threshold rate for a duration. A central hypopnea will be said to have occurred when a hypopnea is detected that is due to a reduction in breathing effort. In one form in adults, either of the following may be regarded as being hypopneas:
(i) a 30% reduction in patient breathing for at least 10 seconds plus an associated 4% desaturation; or
(ii) a reduction in patient breathing (but less than 50%) for at least 10 seconds, with an associated desaturation of at least 3% or an arousal.

Hyperpnea: An increase in flow to a level higher than normal.

Inspiratory portion of a breathing cycle: The period from the start of inspiratory flow to the start of expiratory flow will be taken to be the inspiratory portion of a breathing cycle.

Patency (airway): The degree of the airway being open, or the extent to which the airway is open. A patent airway is open. Airway patency may be quantified, for example with a value of one (1) being patent, and a value of zero (0), being closed (obstructed).

Positive End-Expiratory Pressure (PEEP): The pressure above atmosphere in the lungs that exists at the end of expiration.

Peak flow rate (Qpeak): The maximum value of flow rate during the inspiratory portion of the respiratory flow waveform.

Respiratory flow rate, patient airflow rate, respiratory airflow rate (Qr): These terms may be understood to refer to the RPT device's estimate of respiratory flow rate, as opposed to "true respiratory flow rate" or "true respiratory flow rate", which is the actual respiratory flow rate experienced by the patient, usually expressed in litres per minute.

Tidal volume (Vt): The volume of air inhaled or exhaled during normal breathing, when extra effort is not applied. In principle the inspiratory volume Vi (the volume of air inhaled) is equal to the expiratory volume Ve (the volume of air exhaled), and therefore a single tidal volume Vt may be defined as equal to either quantity. In practice the tidal volume Vt is estimated as some combination, e.g. the mean, of the inspiratory volume Vi and the expiratory volume Ve.

(inhalation) Time (Ti): The duration of the inspiratory portion of the respiratory flow rate waveform.

(exhalation) Time (Te): The duration of the expiratory portion of the respiratory flow rate waveform.

(total) Time (Ttot): The total duration between the start of one inspiratory portion of a respiratory flow rate waveform and the start of the following inspiratory portion of the respiratory flow rate waveform.

Typical recent ventilation: The value of ventilation around which recent values of ventilation Vent over some predetermined timescale tend to cluster, that is, a measure of the central tendency of the recent values of ventilation.

Upper airway obstruction (UAO): includes both partial and total upper airway obstruction. This may be associated with a state of flow limitation, in which the flow rate increases only slightly or may even decrease as the pressure difference across the upper airway increases (Starling resistor behaviour).

Ventilation (Vent): A measure of a rate of gas being exchanged by the patient's respiratory system. Measures of ventilation may include one or both of inspiratory and expiratory flow, per unit time. When expressed as a volume per minute, this quantity is often referred to as "minute ventilation". Minute ventilation is sometimes given simply as a volume, understood to be the volume per minute.

5.10.3 Anatomy 5.10.3.1 Anatomy of the Face

Ala: the external outer wall or "wing" of each nostril (plural: alar)

Alar angle:

Alare: The most lateral point on the nasal ala.

Alar curvature (or alar crest) point: The most posterior point in the curved base line of each ala, found in the crease formed by the union of the ala with the cheek.

Auricle: The whole external visible part of the ear.

(nose) Bony framework: The bony framework of the nose comprises the nasal bones, the frontal process of the maxillae and the nasal part of the frontal bone.

(nose) Cartilaginous framework: The cartilaginous framework of the nose comprises the septal, lateral, major and minor cartilages.

Columella: the strip of skin that separates the nares and which runs from the pronasale to the upper lip.

Columella angle: The angle between the line drawn through the midpoint of the nostril aperture and a line drawn perpendicular to the Frankfort horizontal while intersecting subnasale.

Frankfort horizontal plane: A line extending from the most inferior point of the orbital margin to the left tragion. The tragion is the deepest point in the notch superior to the tragus of the auricle.

Glabella: Located on the soft tissue, the most prominent point in the midsagittal plane of the forehead.

Lateral nasal cartilage: A generally triangular plate of cartilage. Its superior margin is attached to the nasal bone and frontal process of the maxilla, and its inferior margin is connected to the greater alar cartilage.

Lip, lower (labrale inferius):

Lip, upper (labrale superius):

Greater alar cartilage: A plate of cartilage lying below the lateral nasal cartilage. It is curved around the anterior part of the naris. Its posterior end is connected to the frontal process of the maxilla by a tough fibrous membrane containing three or four minor cartilages of the ala.

Nares (Nostrils): Approximately ellipsoidal apertures forming the entrance to the nasal cavity. The singular form of nares is naris (nostril). The nares are separated by the nasal septum.

Naso-labial sulcus or Naso-labial fold: The skin fold or groove that runs from each side of the nose to the corners of the mouth, separating the cheeks from the upper lip.

Naso-labial angle: The angle between the columella and the upper lip, while intersecting subnasale.

Otobasion inferior: The lowest point of attachment of the auricle to the skin of the face.

Otobasion superior: The highest point of attachment of the auricle to the skin of the face.

Pronasale: the most protruded point or tip of the nose, which can be identified in lateral view of the rest of the portion of the head.

Philtrum: the midline groove that runs from lower border of the nasal septum to the top of the lip in the upper lip region.

Pogonion: Located on the soft tissue, the most anterior midpoint of the chin.

Ridge (nasal): The nasal ridge is the midline prominence of the nose, extending from the Sellion to the Pronasale.

Sagittal plane: A vertical plane that passes from anterior (front) to posterior (rear). The midsagittal plane is a sagittal plane that divides the body into right and left halves.

Sellion: Located on the soft tissue, the most concave point overlying the area of the frontonasal suture.

Septal cartilage (nasal): The nasal septal cartilage forms part of the septum and divides the front part of the nasal cavity.

Subalare: The point at the lower margin of the alar base, where the alar base joins with the skin of the superior (upper) lip.

Subnasal point: Located on the soft tissue, the point at which the columella merges with the upper lip in the midsagittal plane.

Supramenton: The point of greatest concavity in the midline of the lower lip between labrale inferius and soft tissue pogonion 5.10.3.2 Anatomy of the Skull Frontal bone: The frontal bone includes a large vertical portion, the squama *frontalis*, corresponding to the region known as the forehead.

Mandible: The mandible forms the lower jaw. The mental protuberance is the bony protuberance of the jaw that forms the chin.

Maxilla: The maxilla forms the upper jaw and is located above the mandible and below the orbits. The frontal process of the maxilla projects upwards by the side of the nose, and forms part of its lateral boundary.

Nasal bones: The nasal bones are two small oblong bones, varying in size and form in different individuals; they are placed side by side at the middle and upper part of the face, and form, by their junction, the "bridge" of the nose.

Nasion: The intersection of the frontal bone and the two nasal bones, a depressed area directly between the eyes and superior to the bridge of the nose.

Occipital bone: The occipital bone is situated at the back and lower part of the cranium. It includes an oval aperture, the foramen magnum, through which the cranial cavity communicates with the vertebral canal. The curved plate behind the foramen magnum is the squama occipitalis.

Orbit: The bony cavity in the skull to contain the eyeball.

Parietal bones: The parietal bones are the bones that, when joined together, form the roof and sides of the cranium.

Temporal bones: The temporal bones are situated on the bases and sides of the skull and support that part of the face known as the temple.

Zygomatic bones: The face includes two zygomatic bones, located in the upper and lateral parts of the face and forming the prominence of the cheek.

5.10.3.3 Anatomy of the Respiratory System

Diaphragm: A sheet of muscle that extends across the bottom of the rib cage. The diaphragm separates the thoracic cavity, containing the heart, lungs and ribs, from the abdominal cavity. As the diaphragm contracts the volume of the thoracic cavity increases and air is drawn into the lungs.

Larynx: The larynx, or voice box houses the vocal folds and connects the inferior part of the pharynx (hypopharynx) with the trachea.

Lungs: The organs of respiration in humans. The conducting zone of the lungs contains the trachea, the bronchi, the bronchioles, and the terminal bronchioles. The respiratory zone contains the respiratory bronchioles, the alveolar ducts, and the alveoli.

Nasal cavity: The nasal cavity (or nasal fossa) is a large air filled space above and behind the nose in the middle of the face. The nasal cavity is divided in two by a vertical fin called the nasal septum. On the sides of the nasal cavity are three horizontal outgrowths called nasal conchae (singular "concha") or turbinates. To the front of the nasal cavity is the nose, while the back blends, via the choanae, into the nasopharynx.

Pharynx: The part of the throat situated immediately inferior to (below) the nasal cavity, and superior to the oesophagus and larynx. The pharynx is conventionally divided into three sections: the nasopharynx (epipharynx) (the nasal part of the pharynx), the oropharynx (mesopharynx) (the oral part of the pharynx), and the laryngopharynx (hypopharynx).

5.10.4 Patient Interface

Anti-asphyxia valve (AAV): The component or sub-assembly of a mask system that, by opening to atmosphere in a failsafe manner, reduces the risk of excessive $CO_2$ rebreathing by a patient.

Elbow: An elbow is an example of a structure that directs an axis of flow of air travelling therethrough to change direction through an angle. In one form, the angle may be approximately 90 degrees. In another form, the angle may be more, or less than 90 degrees. The elbow may have an approximately circular cross-section. In another form the elbow may have an oval or a rectangular cross-section. In certain forms an elbow may be rotatable with respect to a mating component, e.g. about 360 degrees. In certain forms an elbow may be removable from a mating component, e.g. via a snap connection. In certain forms, an elbow may be assembled to a mating component via a one-time snap during manufacture, but not removable by a patient.

Frame: Frame will be taken to mean a mask structure that bears the load of tension between two or more points of connection with a headgear. A mask frame may be a non-airtight load bearing structure in the mask. However, some forms of mask frame may also be air-tight.

Headgear: Headgear will be taken to mean a form of positioning and stabilizing structure designed for use on a head. For example, the headgear may comprise a collection of one or more struts, ties and stiffeners configured to locate and retain a patient interface in position on a patient's face for delivery of respiratory therapy. Some ties are formed of a soft, flexible, elastic material such as a laminated composite of foam and fabric.

Membrane: Membrane will be taken to mean a typically thin element that has, preferably, substantially no resistance to bending, but has resistance to being stretched.

Plenum chamber: a mask plenum chamber will be taken to mean a portion of a patient interface having walls at least partially enclosing a volume of space, the volume having air therein pressurised above atmospheric pressure in use. A shell may form part of the walls of a mask plenum chamber.

Seal: May be a noun form ("a seal") which refers to a structure, or a verb form ("to seal") which refers to the effect. Two elements may be constructed and/or arranged to 'seal' or to effect 'sealing' therebetween without requiring a separate 'seal' element per se.

Shell: A shell will be taken to mean a curved, relatively thin structure having bending, tensile and compressive stiffness. For example, a curved structural wall of a mask may be a shell. In some forms, a shell may be faceted. In some forms a shell may be airtight. In some forms a shell may not be airtight.

Stiffener: A stiffener will be taken to mean a structural component designed to increase the bending resistance of another component in at least one direction.

Strut: A strut will be taken to be a structural component designed to increase the compression resistance of another component in at least one direction.

Swivel (noun): A subassembly of components configured to rotate about a common axis, preferably independently, preferably under low torque. In one form, the swivel may be constructed to rotate through an angle of at least 360 degrees. In another form, the swivel may be constructed to rotate through an angle less than 360 degrees. When used in the context of an air delivery conduit, the sub-assembly of components preferably comprises a matched pair of cylindrical conduits. There may be little or no leak flow of air from the swivel in use.

Tie (noun): A structure designed to resist tension.

Vent: (noun): A structure that allows a flow of air from an interior of the mask, or conduit, to ambient air for clinically effective washout of exhaled gases. For example, a clinically effective washout may involve a flow rate of about 10 litres per minute to about 100 litres per minute, depending on the mask design and treatment pressure.

5.10.5 Shape of Structures

Products in accordance with the present technology may comprise one or more three-dimensional mechanical structures, for example a mask cushion or an impeller. The three-dimensional structures may be bounded by two-dimensional surfaces. These surfaces may be distinguished using a label to describe an associated surface orientation, location, function, or some other characteristic. For example, a structure may comprise one or more of an anterior surface, a posterior surface, an interior surface and an exterior surface. In another example, a seal-forming structure may comprise a face-contacting (e.g. outer) surface, and a separate non-face-contacting (e.g. underside or inner) surface. In another example, a structure may comprise a first surface and a second surface.

To facilitate describing the shape of the three-dimensional structures and the surfaces, we first consider a cross-section through a surface of the structure at a point, p. See FIG. 3B to FIG. 3F, which illustrate examples of cross-sections at point p on a surface, and the resulting plane curves. FIGS. 3B to 3F also illustrate an outward normal vector at p. The outward normal vector at p points away from the surface. In some examples we describe the surface from the point of view of an imaginary small person standing upright on the surface.

5.10.5.1 Curvature in One Dimension

The curvature of a plane curve at p may be described as having a sign (e.g. positive, negative) and a magnitude (e.g. 1/radius of a circle that just touches the curve at p).

Positive curvature: If the curve at p turns towards the outward normal, the curvature at that point will be taken to be positive (if the imaginary small person leaves the point p they must walk uphill). See FIG. 3B (relatively large positive curvature compared to FIG. 3C) and FIG. 3C (relatively small positive curvature compared to FIG. 3B). Such curves are often referred to as concave.

Zero curvature: If the curve at p is a straight line, the curvature will be taken to be zero (if the imaginary small person leaves the point p, they can walk on a level, neither up nor down). See FIG. 3D.

Negative curvature: If the curve at p turns away from the outward normal, the curvature in that direction at that point will be taken to be negative (if the imaginary small person leaves the point p they must walk downhill). See FIG. 3E (relatively small negative curvature compared to FIG. 3F) and FIG. 3F (relatively large negative curvature compared to FIG. 3E). Such curves are often referred to as convex.

5.10.5.2 Curvature of Two Dimensional Surfaces

A description of the shape at a given point on a two-dimensional surface in accordance with the present technology may include multiple normal cross-sections. The multiple cross-sections may cut the surface in a plane that includes the outward normal (a "normal plane"), and each cross-section may be taken in a different direction. Each cross-section results in a plane curve with a corresponding curvature. The different curvatures at that point may have the same sign, or a different sign. Each of the curvatures at that point has a magnitude, e.g. relatively small. The plane curves in FIGS. 3B to 3F could be examples of such multiple cross-sections at a particular point.

Principal curvatures and directions: The directions of the normal planes where the curvature of the curve takes its maximum and minimum values are called the principal directions. In the examples of FIG. 3B to FIG. 3F, the maximum curvature occurs in FIG. 3B, and the minimum occurs in FIG. 3F, hence FIG. 3B and FIG. 3F are cross sections in the principal directions. The principal curvatures at p are the curvatures in the principal directions.

Region of a surface: A connected set of points on a surface. The set of points in a region may have similar characteristics, e.g. curvatures or signs.

Saddle region: A region where at each point, the principal curvatures have opposite signs, that is, one is positive, and the other is negative (depending on the direction to which the imaginary person turns, they may walk uphill or downhill).

Dome region: A region where at each point the principal curvatures have the same sign, e.g. both positive (a "concave dome") or both negative (a "convex dome").

Cylindrical region: A region where one principal curvature is zero (or, for example, zero within manufacturing tolerances) and the other principal curvature is non-zero.

Planar region: A region of a surface where both of the principal curvatures are zero (or, for example, zero within manufacturing tolerances).

Edge of a surface: A boundary or limit of a surface or region.

Path: In certain forms of the present technology, 'path' will be taken to mean a path in the mathematical-topological sense, e.g. a continuous space curve from f(0) to f(1) on a surface. In certain forms of the present technology, a 'path' may be described as a route or course, including e.g. a set of points on a surface. (The path for the imaginary person is where they walk on the surface and is analogous to a garden path).

Path length: In certain forms of the present technology, 'path length' will be taken to mean the distance along the surface from f(0) to f(1), that is, the distance along the path on the surface. There may be more than one path between two points on a surface and such paths may have different path lengths. (The path length for the imaginary person would be the distance they have to walk on the surface along the path).

Straight-line distance: The straight-line distance is the distance between two points on a surface, but without regard to the surface. On planar regions, there would be a path on the surface having the same path length as the straight-line distance between two points on the surface. On non-planar surfaces, there may be no paths having the same path length as the straight-line distance between two points. (For the imaginary person, the straight-line distance would correspond to the distance 'as the crow flies'.)

5.10.5.3 Space Curves

Space curves: Unlike a plane curve, a space curve does not necessarily lie in any particular plane. A space curve may be closed, that is, having no endpoints. A space curve may be considered to be a one-dimensional piece of three-dimensional space. An imaginary person walking on a strand of the DNA helix walks along a space curve. A typical human left ear comprises a helix, which is a left-hand helix, see FIG. 3Q. A typical human right ear comprises a helix, which is a right-hand helix, see FIG. 3R. FIG. 3S shows a right-hand helix. The edge of a structure, e.g. the edge of a membrane or impeller, may follow a space curve. In general, a space curve may be described by a curvature and a torsion at each point on the space curve. Torsion is a measure of how the curve turns out of a plane. Torsion has a sign and a magnitude. The torsion at a point on a space curve may be characterised with reference to the tangent, normal and binormal vectors at that point.

Tangent unit vector (or unit tangent vector): For each point on a curve, a vector at the point specifies a direction from that point, as well as a magnitude. A tangent unit vector is a unit vector pointing in the same direction as the curve at that point. If an imaginary person were flying along the curve and fell off her vehicle at a particular point, the direction of the tangent vector is the direction she would be travelling.

Unit normal vector: As the imaginary person moves along the curve, this tangent vector itself changes. The unit vector pointing in the same direction that the tangent vector is changing is called the unit principal normal vector. It is perpendicular to the tangent vector.

Binormal unit vector: The binormal unit vector is perpendicular to both the tangent vector and the principal normal vector. Its direction may be determined by a right-hand rule (see e.g. FIG. 3P), or alternatively by a left-hand rule (FIG. 3O).

Osculating plane: The plane containing the unit tangent vector and the unit principal normal vector. See FIGS. 3O and 3P.

Torsion of a space curve: The torsion at a point of a space curve is the magnitude of the rate of change of the binormal unit vector at that point. It measures how much the curve deviates from the osculating plane. A space curve which lies in a plane has zero torsion. A space curve which deviates a relatively small amount from the osculating plane will have a relatively small magnitude of torsion (e.g. a gently sloping helical path). A space curve which deviates a relatively large amount from the osculating plane will have a relatively large magnitude of torsion (e.g. a steeply sloping helical path). With reference to FIG. 3S, since T2>T1, the magnitude of the torsion near the top coils of the helix of FIG. 3S is greater than the magnitude of the torsion of the bottom coils of the helix of FIG. 3S With reference to the right-hand rule of FIG. 3P, a space curve turning towards the direction of the right-hand binormal may be considered as having a right-hand positive torsion (e.g. a right-hand helix as shown in FIG. 3S). A space curve turning away from the direction of the right-hand binormal may be considered as having a right-hand negative torsion (e.g. a left-hand helix).

Equivalently, and with reference to a left-hand rule (see FIG. 3O), a space curve turning towards the direction of the left-hand binormal may be considered as having a left-hand positive torsion (e.g. a left-hand helix). Hence left-hand positive is equivalent to right-hand negative. See FIG. 3T.

5.10.5.4 Holes

A surface may have a one-dimensional hole, e.g. a hole bounded by a plane curve or by a space curve. Thin structures (e.g. a membrane) with a hole, may be described as having a one-dimensional hole. See for example the one dimensional hole in the surface of structure shown in FIG. 3I, bounded by a plane curve.

A structure may have a two-dimensional hole, e.g. a hole bounded by a surface. For example, an inflatable tyre has a two dimensional hole bounded by the interior surface of the tyre. In another example, a bladder with a cavity for air or gel could have a two-dimensional hole. See for example the cushion of FIG. 3L and the example cross-sections therethrough in FIG. 3M and FIG. 3N, with the interior surface bounding a two dimensional hole indicated. In a yet another example, a conduit may comprise a one-dimension hole (e.g. at its entrance or at its exit), and a two-dimension hole bounded by the inside surface of the conduit. See also the two dimensional hole through the structure shown in FIG. 3K, bounded by a surface as shown.

5.11 Other Remarks

A portion of the disclosure of this patent document contains material which is subject to copyright protection. The copyright owner has no objection to the facsimile reproduction by anyone of the patent document or the patent disclosure, as it appears in Patent Office patent files or records, but otherwise reserves all copyright rights whatsoever.

Unless the context clearly dictates otherwise and where a range of values is provided, it is understood that each intervening value, to the tenth of the unit of the lower limit, between the upper and lower limit of that range, and any other stated or intervening value in that stated range is encompassed within the technology. The upper and lower limits of these intervening ranges, which may be independently included in the intervening ranges, are also encompassed within the technology, subject to any specifically excluded limit in the stated range. Where the stated range includes one or both of the limits, ranges excluding either or both of those included limits are also included in the technology.

Furthermore, where a value or values are stated herein as being implemented as part of the technology, it is understood that such values may be approximated, unless otherwise stated, and such values may be utilized to any suitable significant digit to the extent that a practical technical implementation may permit or require it.

Unless defined otherwise, all technical and scientific terms used herein have the same meaning as commonly understood by one of ordinary skill in the art to which this technology belongs. Although any methods and materials similar or equivalent to those described herein can also be used in the practice or testing of the present technology, a limited number of the exemplary methods and materials are described herein.

When a particular material is identified as being used to construct a component, obvious alternative materials with similar properties may be used as a substitute. Furthermore, unless specified to the contrary, any and all components herein described are understood to be capable of being manufactured and, as such, may be manufactured together or separately.

It must be noted that as used herein and in the appended claims, the singular forms "a", "an", and "the" include their plural equivalents, unless the context clearly dictates otherwise.

All publications mentioned herein are incorporated herein by reference in their entirety to disclose and describe the methods and/or materials which are the subject of those publications. The publications discussed herein are provided solely for their disclosure prior to the filing date of the present application. Nothing herein is to be construed as an admission that the present technology is not entitled to antedate such publication by virtue of prior invention. Further, the dates of publication provided may be different from the actual publication dates, which may need to be independently confirmed.

The terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

The subject headings used in the detailed description are included only for the ease of reference of the reader and should not be used to limit the subject matter found throughout the disclosure or the claims. The subject headings should not be used in construing the scope of the claims or the claim limitations.

Although the technology herein has been described with reference to particular examples, it is to be understood that these examples are merely illustrative of the principles and applications of the technology. In some instances, the terminology and symbols may imply specific details that are not required to practice the technology. For example, although the terms "first" and "second" may be used, unless otherwise specified, they are not intended to indicate any order but may be utilised to distinguish between distinct elements. Furthermore, although process steps in the methodologies may be described or illustrated in an order, such an ordering is not required. Those skilled in the art will recognize that such ordering may be modified and/or aspects thereof may be conducted concurrently or even synchronously.

It is therefore to be understood that numerous modifications may be made to the illustrative examples and that other arrangements may be devised without departing from the spirit and scope of the technology.

5.12 Reference Signs List

1000 Patient
    1100 Bed partner
    3000 Patient interface
    3100 Seal-forming structure
    3200 Plenum chamber
    3210 Chord
    3220 Superior point 3230 Inferior point
3300 Positioning and stabilising structure
3400 Vent
3600 Connection port
3700 Forehead support
3800 Cannula
3810a Nasal prongs
3810b Nasal prongs
3820a Lumens
3820b Lumens
4000 RPT device
4010 External housing
4012 Upper portion
4014 Lower portion
4015 Panel(s)
4016 Chassis
4018 Handle
4020 Pneumatic block
4100 Pneumatic components
4110 Air filters
4112 Inlet air filter
4114 Outlet air filter
4120 Muffler
4122 Inlet muffler
4124 Outlet muffler
4140 Pressure generator
4142 Blower
4144 Brushless DC motor
4160 Anti-spill back valve
4170 Air circuit
4180 Supplemental oxygen
4200 Electrical components
4202 Printed Circuit Board Assembly (PCBA)
4210 Power Supply
4220 Input devices
4270 Transducers
5000 Humidifier
5002 Humidifier inlet
5004 Humidifier outlet
5006 Humidifier base
5110 Reservoir
5120 Conductive portion
5130 Humidifier reservoir dock
5135 Locking lever
5150 Water level indicator
5240 Heating element
6000 Vent structure
6100 Vent housing
6200 Partitions
6210 Angled straight wall portion
6220 Parallel straight wall portion
6230 Negatively curved portion
6240 Positively curved portion
6300 Vent slots
6310 Vent inlet
6320 Vent outlet
6330 First region
6335 Third region
6340 Second region
6345 Fourth region
6350 Bottleneck region
6360 Expanding height portion
6370 Chamber
6371 Inlet
6372 Outlet
6400 Deflector
6500 Projecting portion
6510 First portion
6520 Second portion
6530 Negatively curved edge
7000 Connection member
7100 Tube portion
7110 Outer tube portion
7115 Inner surface
7120 Inner tube portion
7125 Outer surface
7130 Step down region
7131 Radially inwards step
7132 Upstream end
7133 Downstream end
7200 Sealing member
7210 Apertures

The invention claimed is:

1. A connection member configured to directly or indirectly connect an air circuit to a patient interface of a respiratory pressure therapy system for directing a flow of air at a therapeutic pressure of at least 6 $cmH_2O$ above ambient air pressure from the air circuit to the patient interface to treat a patient for a respiratory disorder, the connection member comprising:
a tube portion configured to fluidly connect the air circuit to the patient interface; and
a vent structure comprising:
a vent housing; and
a plurality of partitions inside the vent housing, the plurality of partitions forming therebetween a plurality of vent slots, wherein each vent slot of the plurality of vent slots comprises:
a vent inlet configured to receive a vent air flow; and
a vent outlet configured to allow the vent air flow to exit into the surrounding ambient air,
wherein the plurality of partitions are formed such that each vent slot of the plurality of vent slots has a cross-sectional area at a first region of the respective vent slot that is smaller than a cross-sectional area at a second region of the respective vent slot, wherein the first region is closer to the vent inlet than the second region;
wherein each partition of the plurality of partitions comprises a negatively curved portion between the first region and the second region; and
wherein each partition of the plurality of partitions comprises a positively curved portion between the first region and the second region.

2. The connection member of claim 1, wherein the vent housing and the plurality of partitions are substantially rigid such that the plurality of vent slots are fixed in shape during use.

3. The connection member of claim 1, wherein each partition of the plurality of partitions comprises an angled straight wall portion between the first region and the second region, the angled straight wall portion being oriented at an angle to a longitudinal axis along a length of a corresponding one of the plurality of vent slots.

4. The connection member of claim 3, wherein the angled straight wall portion of each partition of the plurality of partitions is located between the negatively curved portion and the positively curved portion.

5. The connection member of claim 1, wherein each partition of the plurality of partitions comprises a parallel straight wall portion proximate the vent outlet, the parallel straight wall portion being substantially parallel to a longitudinal axis along a length of a corresponding one of the plurality of vent slots.

6. The connection member of claim 1, wherein the vent housing is formed such that the second region of each vent slot of the plurality of vent slots has a greater height compared to the first region of the respective vent slot.

7. The connection member of claim 1, wherein each vent slot of the plurality of vent slots comprises an expanding height portion having an upstream end and a downstream end, wherein the upstream end of the expanding height portion has a lesser height than the downstream end of the expanding height portion, and wherein the expanding height portion is located at or proximate a region of minimum width of the respective vent slot.

8. The connection member of claim 1, wherein the vent structure further comprises a plurality of deflectors configured to deflect the vent air flow through each vent slot of the plurality of vent slots towards a part of the vent housing and/or another component in the respiratory pressure therapy system.

9. The connection member of claim 8, wherein each of the plurality of deflectors is formed on an inner surface of the vent housing.

10. The connection member of claim 8, wherein each deflector of the plurality of deflectors is located at a longitudinal position within a corresponding one of the plurality of vent slots where the corresponding vent slot has minimum width.

11. The connection member of claim 8, wherein each deflector of the plurality of deflectors is positioned to cause the vent air flow to flow against a component downstream of the vent outlet.

12. The connection member of claim 1, wherein the vent structure further comprises a projecting portion structured and arranged to inhibit generation of shear layer instabilities, the projecting portion extending outwardly from the vent outlet.

13. The connection member of claim 12, wherein the projecting portion extends in a direction substantially parallel to a longitudinal axis of one of the plurality of vent slots.

14. The connection member of claim 12, wherein the projecting portion comprises one or more first portions extending at a first length from the vent outlet and one or more second portions extending at a second length from the vent outlet, the first length being less than the second length.

15. The connection member of claim 14, wherein a distal end of the projecting portion is configured to have a wave-shaped profile when viewed from a direction perpendicular to a plane in which the projecting portion extends from the vent outlet.

16. The connection member of claim 12, wherein the projecting portion comprises a negatively curved edge adjacent the vent air flow.

17. An air circuit configured to fluidly connect a respiratory therapy device to the patient interface, the air circuit comprising the connection member of claim 1.

18. A patient interface comprising:
a plenum chamber pressurisable to the therapeutic pressure, said plenum chamber including a plenum chamber inlet port sized and structured to receive the flow of air at the therapeutic pressure for breathing by the patient;
a seal-forming structure constructed and arranged to form a seal with a region of a patient's face surrounding an entrance to a patient's airways, said seal-forming structure having a hole therein such that the flow of air at said therapeutic pressure is delivered to at least an entrance to a patient's nares, the seal-forming structure constructed and arranged to maintain said therapeutic pressure in the plenum chamber throughout a patient's respiratory cycle in use; and
a connection member as claimed in claim 1, the vent structure to allow the vent air flow to travel from an interior of the plenum chamber to ambient, said vent structure being sized and shaped to maintain the therapeutic pressure in the plenum chamber in use;
wherein the patient interface is configured to allow the patient to breathe from ambient through a patient's mouth in the absence of a flow of pressurised air through the plenum chamber inlet port, or the patient interface is configured to leave the patient's mouth uncovered.

19. The patient interface of claim 18, wherein the vent structure is comprised as part of, or is provided to, the plenum chamber.

20. A positioning and stabilising structure configured to provide a force to hold a seal-forming structure in a therapeutically effective position on a patient's head in use, the positioning and stabilising structure comprising:
at least one gas delivery tube being constructed and arranged to contact at least a region of the patient's head superior to an otobasion superior of the patient's head, wherein an end of the at least one gas delivery tube is configured to fluidly connect to a plenum chamber,
a connection port to receive the flow of air at the therapeutic pressure from the air circuit and to deliver the flow of air to an entrance of the patient's airways via the seal-forming structure, wherein the connection port is provided to a portion of the gas delivery tube superior to the otobasion superior of the patient's head; and
a connection member as claimed in claim 1.

* * * * *